US009614923B2

(12) United States Patent
Lin et al.

(10) Patent No.: US 9,614,923 B2
(45) Date of Patent: Apr. 4, 2017

(54) METHOD AND DEVICE FOR CONTROLLING PERIPHERAL DEVICES VIA A SOCIAL NETWORKING PLATFORM

(71) Applicant: Tencent Technology (Shenzhen) Company Limited, Shenzhen (CN)

(72) Inventors: Xiangyao Lin, Shenzhen (CN); Liangliang Fan, Shenzhen (CN); Jinhai Liu, Shenzhen (CN); Chenglin Liu, Shenzhen (CN); Yaobo Hua, Shenzhen (CN); Shihai Cheng, Shenzhen (CN); Kai Liu, Shenzhen (CN); Rungui Ye, Shenzhen (CN); Zhijie Zhou, Shenzhen (CN); Can Liu, Shenzhen (CN); Nongfei Pan, Shenzhen (CN); Zhan Shu, Shenzhen (CN); Danqing Sun, Shenzhen (CN); Anqi Ren, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 181 days.

(21) Appl. No.: 14/495,733

(22) Filed: Sep. 24, 2014

(65) Prior Publication Data
US 2015/0264543 A1    Sep. 17, 2015

Related U.S. Application Data

(63) Continuation of application No. PCT/CN2014/073302, filed on Mar. 12, 2014.

(51) Int. Cl.
H04W 4/20    (2009.01)
H04L 29/08    (2006.01)
(Continued)

(52) U.S. Cl.
CPC .............. *H04L 67/26* (2013.01); *H04L 67/10* (2013.01); *H04L 67/104* (2013.01);
(Continued)

(58) Field of Classification Search
None
See application file for complete search history.

(56) References Cited

U.S. PATENT DOCUMENTS 6,363,477 B1    3/2002    Fletcher et al.
6,606,326 B1    8/2003    Herring
(Continued)

FOREIGN PATENT DOCUMENTS

CN    102750113 A    10/2012
KR    2010101274 A    9/2012

OTHER PUBLICATIONS

Tencent Technology, ISR, PCT/CN2014/073302, Nov. 28, 2014, 3 pgs.
(Continued)

*Primary Examiner* — Anh-Vu Ly
*Assistant Examiner* — Hector Reyes Ortiz
(74) *Attorney, Agent, or Firm* — Morgan, Lewis & Bockius LLP

(57) ABSTRACT

A method and device for transmitting data between a peripheral device and a user device via a Bluetooth Low Energy connection, comprising: at the peripheral device: transmitting data to the user device in a simulated data stream, the transmitting comprising: identifying a first Bluetooth characteristic for writing data, the first Bluetooth characteristic having been exposed by the peripheral device to the user device; dividing a data packet into a sequence of data frames plus zero or one remainder, each data frame having a respective size equal to a predetermined data size of the identified first Bluetooth characteristic; and for each of the
(Continued)

sequence of data frames: writing the data frame to a respective value for the identified first Bluetooth characteristic; and pushing the identified first Bluetooth characteristic for reading by the user device.

20 Claims, 53 Drawing Sheets

(51) Int. Cl.
*H04W 4/00* (2009.01)
*H04M 1/725* (2006.01)
*H04W 76/02* (2009.01)
*H04W 84/18* (2009.01)

(52) U.S. Cl.
CPC ........ *H04L 69/324* (2013.01); *H04M 1/7253* (2013.01); *H04M 1/72522* (2013.01); *H04W 4/008* (2013.01); *H04W 4/206* (2013.01); *H04W 76/023* (2013.01); *H04M 2250/02* (2013.01); *H04M 2250/52* (2013.01); *H04W 84/18* (2013.01)

(56) References Cited

U.S. PATENT DOCUMENTS

| | | |
|---|---|---|
| 6,681,364 B1 | 1/2004 | Calvignac et al. |
| 7,024,593 B1 | 4/2006 | Budd et al. |
| 7,382,787 B1 | 6/2008 | Barnes et al. |
| 8,744,803 B2 | 6/2014 | Park et al. |
| 8,805,646 B2 | 8/2014 | Messenger et al. |
| 8,943,187 B1 | 1/2015 | Saylor |
| 9,043,486 B2 | 5/2015 | Bailey |
| 9,124,630 B1 | 9/2015 | Saylor et al. |
| 2007/0069889 A1 | 3/2007 | Tuck |
| 2010/0134247 A1 | 6/2010 | Tuck et al. |
| 2011/0223893 A1* | 9/2011 | Lau .......... G10L 15/22 455/414.1 |
| 2012/0204233 A1* | 8/2012 | Rubio .......... H04L 67/16 726/4 |
| 2013/0090169 A1* | 4/2013 | Liu .......... H04L 29/08576 463/42 |
| 2014/0105396 A1 | 4/2014 | Engelien-Lopes |
| 2015/0088596 A1 | 3/2015 | Civil et al. |

OTHER PUBLICATIONS

Tencent Technology, Written Opinion, PCT/CN2014/073302, Nov. 28, 2014, 7 pgs.

Tencent Technology, IPRP, PCT/CN2014/073302, Sep. 13, 2016, 8 pgs.

\* cited by examiner

1400

```
┌─────────────────────────────────────────────────────────────────────────┐
│ Register with a server of the social network platform as the support    │
│ service provider for the peripheral device                              │──── 1402
└─────────────────────────────────────────────────────────────────────────┘
                                      │
                                      ▼
┌─────────────────────────────────────────────────────────────────────────┐
│ Initiate a communication event to send an instruction to the peripheral │
│ device, initiating the communication event including:                   │
│     Generate a push request data packet for the instruction, wherein    │──── 1404
│ the push request data packet identifies the peripheral device as a      │
│ target of the instruction; and                                          │
│     sending the push request data packet to the peripheral device via   │
│ the server of the social networking platform and a user device coupled  │
│ to the peripheral device                                                │
└─────────────────────────────────────────────────────────────────────────┘
                                      │
                                      ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ Receive a request data packet from the peripheral device via the user   │
│ device coupled to the peripheral device and the server of the social    │──── 1406
│ networking platform                                                     │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                      │
                                      ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ In response to receiving the request data packet from the peripheral    │
│ device, send a response data packet to the peripheral device via the    │──── 1408
│ server of the social networking platform and the user device coupled to │
│ the peripheral device                                                   │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘

┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ The push request data packet, the request data packet, and the response │──── 1410
│ data packet have a fixed-length packet header, and a variable-length    │
│ packet body                                                             │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘

┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ The fixed-length packet header includes a predetermined command         │──── 1412
│ identifier and a respective packet sequence number                      │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘

┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│ The response data packet includes a first packet sequence number that   │
│ matches a second packet sequence number included in the request data    │──── 1414
│ packet, and the push request data packet includes a third packet        │
│ sequence number different from the first and the second packet sequence │
│ number                                                                  │
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘

```
┌─────────────────────────────────────────────────────────────────────────┐
│  The predetermined command identifier corresponds to a command for accessing a  │
│           respective function of a social network platform                      │───1416
└─────────────────────────────────────────────────────────────────────────┘

┌─────────────────────────────────────────────────────────────────────────┐
│   The command is for accessing a user authentication function of the social network │
│  platform, and the packet body specifying a type of user identity assigned to the peripheral │
│                    device on the social network platform                       │───1418
└─────────────────────────────────────────────────────────────────────────┘

┌─────────────────────────────────────────────────────────────────────────┐
│     The command is for accessing a contact listing for the peripheral device on the social │
│  network platform, and the packet body specifying at least one contact representing a user, │───1420
│              a support service provider, or another peripheral device          │
└─────────────────────────────────────────────────────────────────────────┘

┌─────────────────────────────────────────────────────────────────────────┐
│   The command is for accessing a messaging function on the social network platform, and │
│   the packet body specifying a message targeting at least one contact representing a user, │───1422
│              a support service provider, or another peripheral device          │
└─────────────────────────────────────────────────────────────────────────┘

┌─────────────────────────────────────────────────────────────────────────┐
│   The command is for accessing a messaging function on the social network platform, and │
│   the packet body specifying a message originated from at least one contact representing a │───1424
│              user, a support service provider, or another peripheral device    │
└─────────────────────────────────────────────────────────────────────────┘

┌─────────────────────────────────────────────────────────────────────────┐
│   The command is for accessing a messaging function on the social network platform, and │
│  the packet body specifying a message targeting at least one contact representing a user, a │───1426
│                   support service provider, or another peripheral device       │
└─────────────────────────────────────────────────────────────────────────┘

┌─────────────────────────────────────────────────────────────────────────┐
│ The command is for accessing a group chat function on the social network platform, and the │
│    packet body specifying a group chat session between the peripheral device and two or │───1428
│  more respective social network contacts of the peripheral device, including two or more of a │
│    plurality of users, a support service provider, and a plurality of other peripheral devices │
└─────────────────────────────────────────────────────────────────────────┘

┌─────────────────────────────────────────────────────────────────────────┐
│  The command is for accessing a conversation log function on the social network platform, │
│          and the packet body specifying a conversation log for a chat session between the │
│     peripheral device and one or more respective social network contacts of the peripheral │───1430
│      device, including one or more of a plurality of users, a support service provider, and a │
│                       plurality of other peripheral devices                    │
└─────────────────────────────────────────────────────────────────────────┘
```

Figure 14B

METHOD AND DEVICE FOR CONTROLLING PERIPHERAL DEVICES VIA A SOCIAL NETWORKING PLATFORM

RELATED APPLICATION

This application is a continuation application of PCT Patent Application No. PCT/CN2014/073302, entitled "METHOD AND DEVICE FOR CONTROLLING PERIPHERAL DEVICES VIA A SOCIAL NETWORKING PLATFORM" filed Mar. 12, 2014, which is incorporated by reference in their entirety.

FIELD OF THE INVENTION

The present disclosure relates to the field of Internet technologies, and in particular, to a method and device for controlling peripheral devices via a social networking platform.

BACKGROUND OF THE INVENTION

With the development of the Internet, people become increasing reliant on various electronic devices for various tasks in their daily lives. Many light weight and simple devices and gadgets, such as smart watches, health monitors, music players, climate controls, smart coffee makers, vehicle charging stations, navigation systems, sports equipment, set-top boxes, etc., are increasing taking over the functions of more complex and heavy duty equipment and systems, as well as the general-purpose computing devices (e.g., a general desktop computer, or laptop computer).

Many electronic devices and gadgets have smart chips and internal logic that allow them to be controlled through software-driven user interfaces provided on the devices. With the development of mobile network-enabled devices, such as smart phones and tablet devices, people are able to perform more tasks without location constraints. Many electronic devices and gadgets can become peripheral devices of a main user device (e.g., a smart phone or tablet device) and be controlled via respective proprietary software (e.g., a proprietary app for each peripheral device) installed on the main user device.

In a thriving market for these light weight and specialized gadgets, different manufacturers provide analogous products with their own designs of user interfaces and controls. Currently, there are no unified standards for the product designs, and the communication and information sharing between different types of products and/or similar products of different manufacturers. It is therefore challenging for users to explore and learn the different user interfaces and functions of different products they purchase. It is even more difficult for the users to share information created or gathered in their own gadgets with others who may or may not possess the same types of devices.

Today, many users are active participants of one or more social networking platforms. A social networking platform provides the means to connect people using instant messages, message boards, one-on-one conversations, or group chats, between social network contacts and people in different social network groups or online communities. A user accesses his/her own social network account via a social networking client application installed on his or her user device (e.g., a smart phone or tablet device). Users of the social networking client application have become accustom to the controls of establishing contacts, and sending and reading messages over a social networking platform. So far, the functions of the social networking client application are limited to communications between human users. Peripheral devices, such as a built-in camera, or microphone, can be used within the social networking client application as a means to capture user input (e.g., voice or image input) that forms the content of a message to be delivered to another user, but it is impractical for the provider of the social networking client application to expand support for controlling other types of peripheral devices due to development complexity, costs, and huge design variations among the different peripheral devices.

SUMMARY

The present disclosure describes a method and device for controlling peripheral devices via a social networking platform. As stated above in the background, social networking has becoming increasingly prevalent in today's world. Many people are already very familiar with the operations and controls of the social networking client applications for one or more social networking platforms. Enabling access and control of peripheral devices over social network messages (e.g., instant messages in a natural language) sent and received over a social networking platform help users to avoid learning many proprietary user interfaces for different peripheral devices and making the communication with the peripheral devices more natural and intuitive. Furthermore, simple unified user interface controls can be provided for peripheral devices made by different manufacturers, allowing users to easily share information across peripheral devices of different manufactures and device types.

In the present disclosure, various embodiments illustrate the inter-relationships between different parties involved in providing access and controls of peripheral devices via a social networking platform, including servers of manufacturers or support service providers for the peripheral devices, the server(s) of the social networking platform, the user devices, the users, and the peripheral devices to be controlled via the social networking platform. Furthermore, communication scenarios, user interfaces, process flows, and device discovery and communication protocols between different parties involved in the social networking platform are disclosed. Manufacturers of the peripheral device can adhere to the protocols established by the social networking platform for device registration, device discovery, communication of instructions and responses, presentation of information, etc. to share the load for providing the necessary backend support and services from the server of the social networking platform and the social networking client application executing on the main user devices.

In some embodiments, a method registering a peripheral device on a social networking platform includes: at a user device having one or more processors and memory: executing a social networking client application of the social networking platform on the user device; through the social networking client application, receiving an input identifying a peripheral device; and in response to receiving the input identifying the peripheral device: sending a request to establish a social networking identity for the peripheral device; and upon successful establishment of the social networking identity for the peripheral device, presenting the peripheral device as a social network contact of the user account in a user interface of the social networking client application. In some embodiments, receiving the input identifying the peripheral device further includes scanning, via a barcode scanner, a barcode associated with the peripheral device.

In some embodiments, a method for registering a peripheral device on a social networking platform includes: at a user device having one or more processors and memory: executing a social networking client application of the social networking platform on the user device; through the social networking client application, receiving an input identifying a support service provider for a respective type of peripheral devices; and in response to receiving the input identifying the support service provider for the respective type of peripheral devices: registering a public social network identity of the support service provider as a contact of a user account currently associated with the user device; and searching within a surrounding region of the user device to locate a peripheral device of the respective type of peripheral device. In some embodiments, receiving the input identifying the support service provider for the respective type of peripheral devices further includes scanning, via a barcode scanner, a barcode associated with the support service provider for the respective type of peripheral devices.

In some embodiments, a method for providing access and control of a peripheral device through a support service provider thereof over a social networking platform includes: at a server of the social networking platform: receiving a servicer registration request from the support service provider, the servicer registration request specifying a type of peripheral devices to be serviced by the support service provider; establishing a public social network identity for the support service provider based on the registration request; receiving a first owner registration request from a first user, the first owner registration request specifying a first peripheral device controlled by the first user; upon a determination that the first peripheral device is of the type of peripheral devices specified in the servicer registration request, establishing a social network relationship between the public social network identity of the support service provider and the first user; and providing first respective communication messages targeting the first peripheral device and second respective communication messages originated from the first peripheral device as respective instant messages in a conversation interface of a chat session between the respective social network identity of the first user and the public contact identity of the support service provider.

In some embodiments, a method for providing access and control of a peripheral device over a social networking platform includes: at a server of the social networking platform: registering the peripheral device coupled to a first user device as a respective social network contact of a user account associated with the first user device; and providing user access to the peripheral device via a social networking client application executing at the first user device, wherein the social networking client application recognizes the peripheral device as the respective social network contact of the user account associated with the first user device.

In some embodiments, a method for providing access and control of a peripheral device through a support service provider thereof over a social networking platform includes: at a server of the social networking platform: receiving a servicer registration request from the support service provider, the servicer registration request specifying a type of peripheral devices to be serviced by the support service provider; establishing a public social network identity for the support service provider based on the servicer registration request; receiving a first owner registration request from a first user, the first owner registration request specifying a first peripheral device controlled by the first user; and upon a determination that the first peripheral device is of the type of peripheral devices specified in the servicer registration request: creating a respective social network identity for the first peripheral device on the social networking platform; and establishing a social network relationship between the public social network identity of the support service provider, the first user, and the respective social network identity of the first peripheral device. In some embodiments, the method further include: establishing a respective group chat session between the public social network identity of the support service provider, the first user, and the respective social network identity of the first peripheral device.

In some embodiments, a method for providing communication between peripheral devices over a social networking platform include: at a server of the social networking platform: registering a first peripheral device and a second peripheral device coupled to a first user device as respective social network contacts of a user account associated with the first user device; enabling communication between the first peripheral device and the second peripheral device via a social networking client application executing at the first user device; and in a group chat interface of the social networking client application, presenting a group conversation between a user of the user account and the respective social network contacts representing the first and the second peripheral devices, wherein the group conversation includes one or more instant messages corresponding to content of the communication between the first peripheral device and the second peripheral device.

In some embodiments, the method for connecting a peripheral device to a user device via a Bluetooth protocol includes: initiating an broadcasting process, including: broadcasting a device discovery message, the device discovery message comprising a predetermined identifier designated for a social networking service associated with a social networking application executing on the user device; receiving, from the user device, a connection request corresponding to the device discovery message; and in response to receiving the connection request from the user device, establishing a Bluetooth connection to the user device. In some embodiments, the method further includes: during the broadcasting process: broadcasting the device discovery message within each of a series of first transmission timeslots during an initial broadcasting period; and if no connection request responding to the device discovery message is received during the initial broadcasting period, broadcasting the device discovery message within each of a series of second transmission timeslots during a subsequent broadcasting period after the initial broadcasting period, wherein each first transmission time slot is shorter than each second transmission time slot.

In some embodiments, a method for connecting a peripheral device to a user device via a Bluetooth protocol includes: at the user device: initiating a device scan process, including: detecting a device discovery message from the peripheral device; and determining whether the device discovery message includes a predetermined identifier designated for a social networking service associated with a social networking application executing on the user device; and upon determining that the device discovery message includes the predetermined identifier designated for the social networking service associated with a social networking application executing on the user device, sending, to the peripheral device, a connection request corresponding to the device discovery message; and establishing a Bluetooth connection to the peripheral device.

In some embodiments, a method for transmitting data between a peripheral device and a user device via a Bluetooth Low Energy connection, includes: at the peripheral device: transmitting data to the user device in a simulated data stream, the transmitting including: identifying a first Bluetooth characteristic for writing data, the first Bluetooth characteristic having been exposed by the peripheral device to the user device in a current connection event; dividing a data packet that is to be transmitted to the user device into a sequence of data frames plus zero or one remainder, each data frame having a respective size equal to a predetermined data size of the identified first Bluetooth characteristic, and the remainder having a respective size smaller than the predetermined data size of the identified first Bluetooth characteristic; and for each of the sequence of data frames: writing the data frame to a respective value for the identified first Bluetooth characteristic; and pushing the identified first Bluetooth characteristic for reading by the user device. In some embodiments, the method of claim further include: padding the reminder to obtain a padded remainder have a respective size equal to the predetermined size of the identified first Bluetooth characteristic; writing the padded reminder to the respective value for the identified first Bluetooth characteristic; and pushing the identified first Bluetooth characteristic for reading by the user device. In some embodiments, pushing the identified first Bluetooth characteristic for reading by the user device further includes: requesting the user device to read an updated value of the identified first Bluetooth characteristic through an indication operation. In some embodiments, the method further includes: for each of the sequence of data frames: receiving a respective confirmation for reading of the identified first Bluetooth characteristic from the user device, wherein the writing and the pushing of a next data frame in the sequence of data frames is performed in response to receiving the respective confirmation until no more data frame or remainder in the data packet remains to be transmitted.

In some embodiments, a method for transmitting data between a peripheral device and a user device via a Bluetooth Low Energy protocol, including: at the user device: transmitting data to the peripheral device in a simulated data stream, the transmitting including: identifying a first Bluetooth characteristic for sending data to the peripheral device, the first Bluetooth characteristic having been exposed by the peripheral device to the user device in the current connection event; dividing a first data packet that is to be transmitted to the peripheral device into a sequence of data frames plus zero or one remainder, each data frame having a respective size equal to a predetermined data size of the identified first Bluetooth characteristic, and the remainder having a respective size smaller than the predetermined data size of the identified first Bluetooth characteristic; and for each of the sequence of data frames, sending a respective write request to writing the data frame to a respective value of the identified first Bluetooth characteristic. In some embodiments, the method further includes: padding the reminder to obtain a padded remainder have a respective size equal to the predetermined data size of the identified first Bluetooth characteristic; and sending a respective write request to write the padded remainder to the respective value of the identified first Bluetooth characteristic.

In some embodiments, a method of communicating with a peripheral device over a social networking platform, includes: at a server of a support service provider for a type of peripheral devices including the peripheral device: registering with a server of the social network platform as the support service provider for the peripheral device; initiating a communication event to send an instruction to the peripheral device, initiating the communication event including: generating a push request data packet for the instruction, wherein the push request data packet identifies the peripheral device as a target of the instruction; and sending the push request data packet to the peripheral device via the server of the social networking platform and a user device coupled to the peripheral device. In some embodiments, the method further includes: receiving a request data packet from the peripheral device via the user device coupled to the peripheral device and the server of the social networking platform; and in response to receiving the request data packet from the peripheral device, sending a response data packet to the peripheral device via the server of the social networking platform and the user device coupled to the peripheral device.

In some embodiments, a method of communicating with a peripheral device over a social networking platform, including: at a server of the social network platform: registering the peripheral device as an associated peripheral device of a user device coupled to the peripheral device; receiving a first push request data packet from a support service provider for a type of peripheral devices including the peripheral device, wherein the first push request data packet identifies the peripheral device as a target of the first push request data packet; and in response to receiving the first push request data packet, forwarding the first push request data packet to the peripheral device via the user device coupled to the peripheral device.

In some embodiments, a method of communicating with a peripheral device over a social networking platform, including: at a user device coupled to the peripheral device: registering the peripheral device as an associated peripheral device of the user device with a server of the social networking platform; receiving a push request data packet from the server of the social networking platform, wherein the push request data packet identifies the peripheral device as a target of the push request data packet; and forwarding the push request data packet to the peripheral device.

In some embodiments, an electronic device (e.g., a server of a support service provider, a server of the social networking platform, a peripheral device, or a user device) includes one or more processors and memory storing one or more programs for execution by the one or more processors, the one or more programs including instructions for performing the operations of the methods described herein. In some embodiments, a non-transitory computer readable storage medium storing one or more programs, the one or more programs comprising instructions, which, when executed by an electronic device (e.g., a server of a support service provider, a server of the social networking platform, a peripheral device, or a user device) each with one or more processors, cause the electronic device to perform the operations of the methods described herein.

In some embodiments, as would be apparent to a person of ordinary skills in the art, the operations performed by one device (e.g., a user device) may complement or correspond to the operations performed by another device (e.g., a server) and may be controlled by instructions received from the other device or cause actions by the other device. In addition, the data and information needed by one device to perform the methods described herein may be provided by another device. In various places of the present disclosure, when description of the functions of one device is provided, descriptions of at least some apparent corresponding actions of another device may be omitted for purpose of brevity;

however, such omitted description would be apparent to a person of ordinary skills in the art and require no creative efforts to be produced by a person of ordinary skills in the art.

Various advantages of the present invention would be apparent in light of the descriptions below.

BRIEF DESCRIPTION OF THE DRAWINGS

FIGS. 14A-14B are flow charts for an exemplary process for transmitting messages for access and controlling a peripheral device over a social networking platform in accordance with some embodiments.

Like reference numerals refer to corresponding parts throughout the several views of the drawings.

DESCRIPTION OF EMBODIMENTS

Figure 1A:
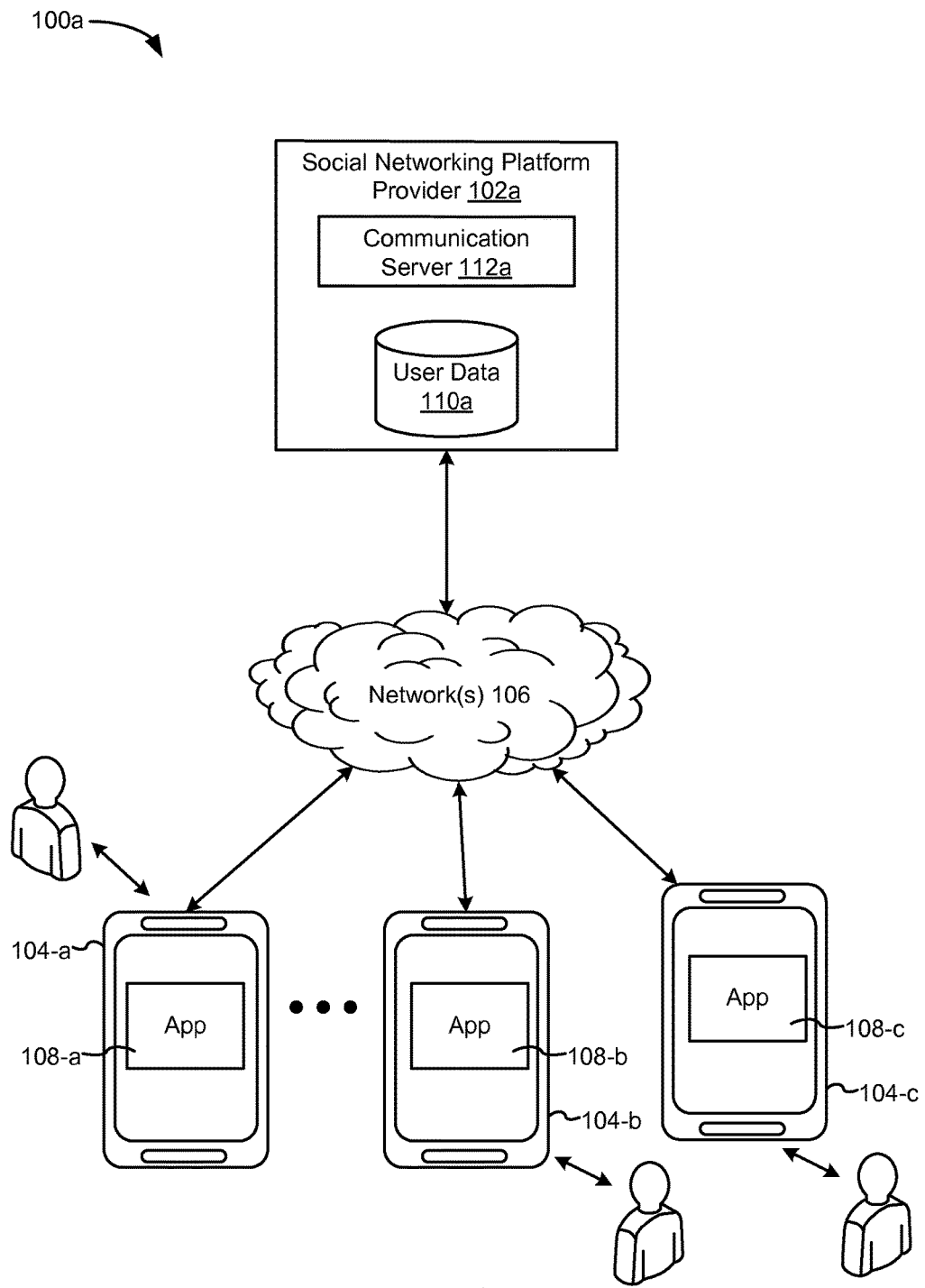
FIG. 1A is a block diagram of an exemplary operating environment for a conventional social networking platform in accordance with some embodiments.

A social networking platform provides the network architecture and software that connect people via relationships and/or common interests. On a social networking platform, each user is associated with a respective social network identity by which the user can be identified by other users of the social networking platform. On a social networking platform, relationships between different users can be formed by mutual agreements of the users involved. When two users agree to form a social networking relationship with each other, they become social network contacts of each other. A group of users may opt to form a social networking relationship with one another, and thus forming a social networking group. Each member of the group is a social network contact of every other member of the group. Sometimes, a user or organization may establish a public social network identity and allows the public (e.g., any user on the social networking platform) to communicate with it on the social networking platform without a mutual agreement exchange. Sometimes, a user may choose to subscribe to the messages or publications of the public social network identity (e.g., "follow" the public social network identity), and thus becoming a social network contact of the public social network identity. The owner of the public social network identity may also treat each user that subscribes to its messages or publications as one of its social network contacts on the social networking platform.

Each user and each public social network identity on the social networking platform has an associated list of social network contacts (or contacts) with which it/he/she can communicate with through instant messages over the social networking platform. For example, users within a social networking group may communicate with one another using the software interfaces provided by the provider of the social networking platform. In addition, each user may also communicate with another user using the software interfaces provided by the provider of the social networking platform.

In some embodiments, the software interfaces provided by the provider of the social networking platform may be a web interface or a software interface. For example, the users may log onto a web portal of the social networking platform, and send and receive messages from other users of the social networking platform through the web portal. Alternatively, users may download and install a social networking client application on their respective user devices (e.g., a computer, a smart phone, a tablet device), and use the interfaces provided by the social networking client application to interact with others on the social networking platform. The messages may be in various formats, e.g., text, image, photo, speech, video, emoticons, etc.

Sometimes, a social networking platform allows a user to initiate one-to-one chat sessions or group chat sessions with one or more social network contacts of the user. During the chat sessions, each user involved in the chat may send and receive instant messages of various formats (e.g., text, speech, image, etc.) to and from other users involved in the chat session.

FIG. 1A is a block diagram of an exemplary operating environment 100a for a conventional social networking platform in accordance with some embodiments.

As shown in FIG. 1A, a social networking platform provider 102a provides a communication server 112a. The communication server 112a provides social networking services (e.g., user registration, creation of messages, transmission of messages, creation of chat sessions, online posting, and other online social interactions) to a multitude of users operating their respective user devices 104 (e.g., user devices 104a-c) via one or more networks 106.

In some embodiments, each user interacts with another user by connecting to the communication server 112a using a social networking client application 108 (e.g., social networking client application 108a-c) executing on the users' respective user devices 104. The communication server 112a identifies the users in the social network by their respective social network identities, such as usernames, nicknames, or account identifiers. Typically, each user is associated with a group of one or more other users in the social network in one or more social network groups. For example, a user may create or join different social network groups based on his or her relationships and/or common interests with other members of each of the groups. In some embodiments, the server of the social networking platform maintains a knowledge base (e.g., user database 110a) of different characteristics (e.g., real name, contact information, interest, social economic status, online activity history, etc.) of the users, and their inter-connections and group memberships (e.g., group lists and contact lists).

In some embodiments, the social network server provides one or more social networking services to its users. The user may invoke a particular service by interacting with a user interface provided on the social networking client application 108 (e.g., social networking client application 108a-c) of the communication server 112a. For example, a user may open a chat program, and initiate one or more one-on-one or group chat sessions with one or more social contacts (e.g., contacts in the user's contact list, or social network groups) by sending a text or voice message. In some embodiments, other forms of messages (e.g., images, videos, links, icons, animations, etc.) may also be sent from one user to one or more other users via the social networking platform provided by the social network sever.

As shown in FIG. 1A, each user may interact with other users using a respective social networking client application 108 (e.g., social networking client application 108a-c). In some embodiments, the social networking client application provides user interface elements (e.g., text boxes, buttons, windows, message display areas, etc.) for the user to invoke a particular social network service, such as posting content to an online message board, sending a text or voice message to a specific user or group of users, initiating a voice or video chat session with another user, opening a group chat session, etc.

Examples of the user devices 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, or a combination of any two or more of these data processing devices or other data processing devices.

Examples of one or more networks 106 include local area networks ("LAN") and wide area networks ("WAN") such as the Internet. One or more networks 106 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, WiFi, voice over Internet Protocol (VoIP), Wi-MAX, or any other suitable communication protocol.

Communication Server 112a is implemented on one or more standalone data processing apparatuses or a distributed network of computers. In some embodiments, communication server 112a also employs various virtual devices and/or services of third party service providers (e.g., third-party cloud service providers) to provide the underlying computing resources and/or infrastructure resources of communication server 112a.

In a conventional social networking platform, each user device 104 may optionally include one or more internal peripheral device modules or be connected to one or more peripheral devices (e.g., navigation systems, health monitors, climate controls, smart sports equipment, Bluetooth headsets, smart watches, etc.) via wired or wireless connections. In most cases, each of these peripheral devices is controlled by a respective software application provided by a respective manufacturer of the peripheral device, and the social networking client application 108 does not communicate with these peripheral devices. Sometimes, the provider of the social networking client application implements functions in the social networking client application that operate some peripheral devices (e.g., a camera, a speaker, a microphone, a touch panel, a keyboard, a mouse, a touch screen) of the user device. But the functions are limited to using these peripheral devices as a means to obtain user input (e.g., image, voice, text, touch, mouse movement, etc.) to control the operation of the client application (e.g., navigate around the user interface, invoking a control in the user interface, or compose an instant message) or delivery of outputs of the client application (e.g., voice, sound, user interfaces, etc.) to the user. In these conventional systems, there is no direct communication between the user and the peripheral devices over the social networking platform. It is also impractical for the provider of the social networking client application to expand support for controlling other types of peripheral devices due to development complexity, costs, and huge design variations among the different peripheral devices.

As people become increasingly reliant on various electronic peripheral devices (e.g., smart watches, health monitors, music players, climate controls, smart coffee makers, charging stations, navigation systems, sports equipment, set-top boxes, etc.) for various tasks in their daily lives, they are also burdened by the varied user interfaces (i.e., the different user interfaces of the proprietary software applications designed specifically by the manufacturers of the different peripheral devices) that they have to master to control these different types of peripheral devices. Furthermore, the same type of peripheral devices designed by different manufacturers may not be able to share information with one another due to the different communication protocols and data formats of the peripheral devices made by different manufacturers. It is therefore challenging for users to explore and learn the different user interfaces and functions of different products they purchase. It is even more difficult for the users to share information created or gathered in their own gadgets with others who may or may not possess the same types of devices.

The present disclosure describes a method and device for controlling peripheral devices via a social networking platform. As stated above in the background, social networking has becoming increasingly prevalent in today's world. Many people are already very familiar with the operations and controls of the social networking client applications for one or more social networking platforms. Enabling access and control of peripheral devices over social network messages (e.g., instant messages in a natural language) sent and received over a social networking platform help users to avoid learning many proprietary user interfaces for different peripheral devices and making the communication with the peripheral devices more natural and intuitive. Furthermore, simple unified user interface controls can be provided for peripheral devices made by different manufacturers, allowing users to easily share information across peripheral devices of different manufactures and device types. In addition, in some embodiments, each device manufacturer can adopt the communication protocol (e.g., including protocols for device registration, device discovery, communication of instructions and responses, presentation of information, translation of encoded instructions and responses to and from the peripheral devices to messages in human-readable form, etc.) established by the social networking platform provider. Thus, the peripheral devices can rely on a communication server of the social networking platform and user devices connected to the communication server to forward the instructions and messages encoded in the manufacturer's proprietary format to and from the peripheral devices of the user devices. Furthermore, in some embodiments, the encoded instructions and messages can be encapsulated in messages formatted according to the communication protocols established by the communication server, thus, the communication server does not need to separately implement the logic and functions to interpret the encoded instructions messages for each type of peripheral devices. The load of developing support capabilities of the peripheral devices are thus shifted to the manufacturers of the different types of peripheral devices. This way, the users enjoy a simple, unified, familiar way to control different types of peripheral devices via the familiar user interface of the social networking client application, and to share information with other users and their respective peripheral devices that may or may not be of the same type or made by the same manufacturers. In addition, the provider of the social networking platform need not expend an extraordinary amount of resources to expand the type of peripheral devices that it supports.

In the present disclosure, various embodiments illustrate the inter-relationships between different parties involved in providing access and controls of peripheral devices via a social networking platform, including servers of manufacturers or support service providers (e.g., also referred to as "support servers") for the peripheral devices, the server(s) of the social networking platform (e.g., also referred to as "communication servers"), the user devices (e.g., the main user device that executes the social networking client application and used to communicate with the communication server), the users, and the peripheral devices (e.g., the devices that communicate with others through a main user device to which it has established a communication connection) to be controlled via the social networking platform.

As demonstrated by various use case scenarios in the present disclosure, providing convenient, fun, and interactive control of peripheral devices through a social networking platform may help enhancing user experience, shorten software development and support for peripheral device makers. As described herein, in some embodiments, the method of providing access and control of peripheral devices via a social networking platform, such as a blog-platform, an online forum platform, a message board platform, a micro-blog platform, an instant message platform, an online chat-room platform, and a hybrid of one or more of the above platforms enables a wealth of possibilities previous unavailable to the users and the peripheral device manufacturers.

Figure 1B:
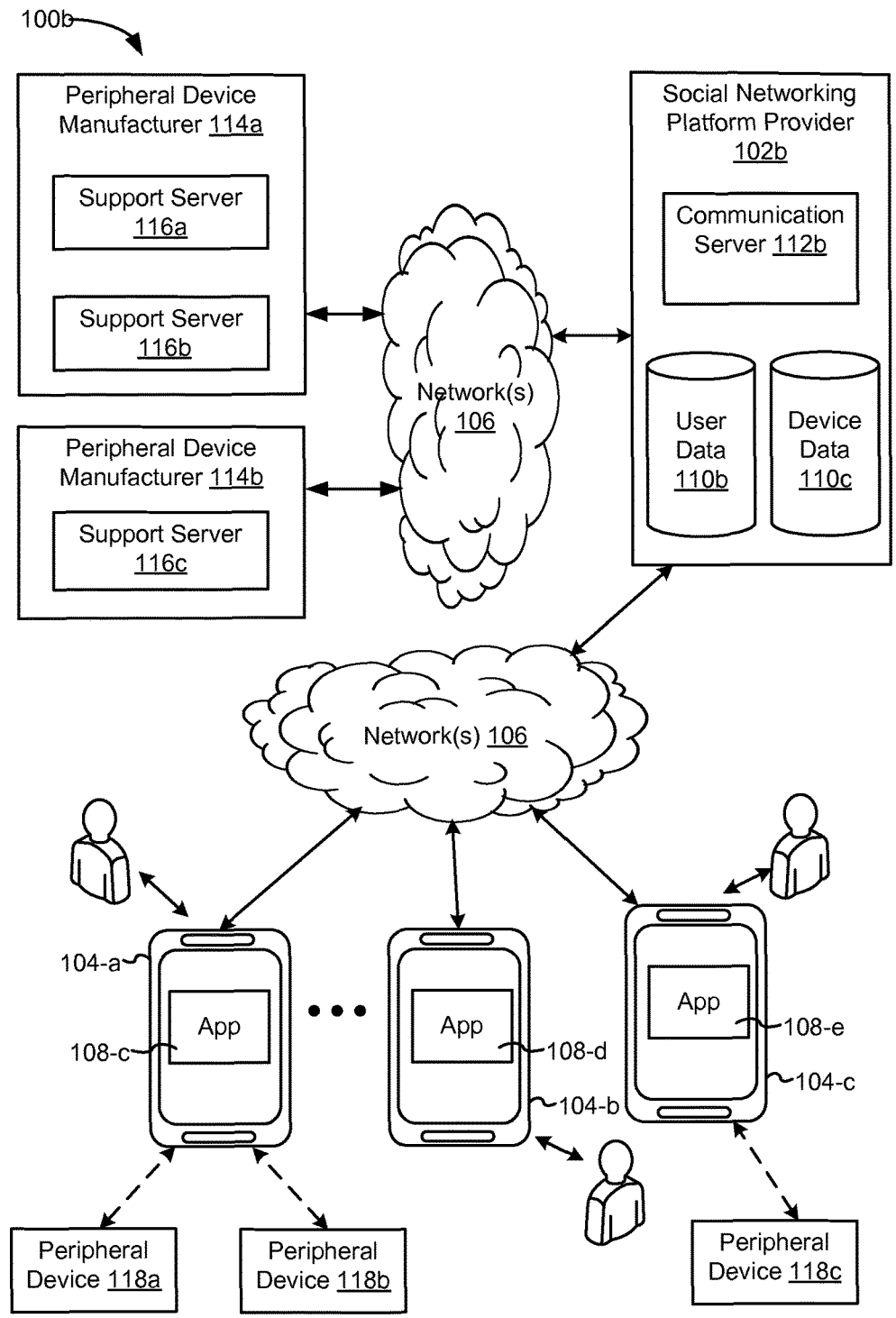
FIG. 1B is a block diagram of an exemplary operating environment for a social networking platform that supports access and control of peripheral devices via the social networking platform, in accordance with some embodiments.

FIG. 1B is a block diagram of an exemplary operating environment 100b for a social networking platform that supports access and control of peripheral devices via the social networking platform, in accordance with some embodiments.

As shown in FIG. 1B, a social networking platform provider 102b provides a communication server 112b. The social networking platform provider 102b and the communication server 112b are able to perform all of the conventional functions that a conventional social networking platform provider (e.g., the social networking platform provider 102a) and a conventional communication server (e.g., the communication server 112a) can perform. In addition, the social networking platform provider 102b also implements the communication server 112b to enable access and control of peripheral devices (e.g., peripheral devices 118) according to the embodiments described herein.

As shown in FIG. 1B, each user of the social networking platform communicate with the communication server 112b through a respective social networking client application 108 (e.g., social networking client applications 108c-e) executing on a respective user device 104 (e.g., user devices 104a-c). Each user device 104 may be connected to one or more peripheral devices 118 (e.g., 118a, 118b, and/or 118c) via a wired or wireless connection. Examples of the connection type include Universal Serial Bus (USB), FIREWIRE, Global System for Mobile Communications (GSM), Enhanced Data GSM Environment (EDGE), code division multiple access (CDMA), time division multiple access (TDMA), Bluetooth, Bluetooth Low Energy (BLE), WiFi, voice over Internet Protocol (VoIP), Wi-MAX, or other connections established based on any other suitable communication protocols. Typically, each peripheral device is connected to a respective user device through a connection with a relative short range (e.g., a few meters or tens of meters), although such limitations are not necessary for many types of peripheral devices. Examples of the peripheral devices include, but are not limited to, smart watches, health monitors (e.g., heart rate or blood pressure monitors, pacemakers, lifestyle monitoring wristbands, etc.), music players, climate controls (e.g., weather monitors, temperature control, heaters, air conditioners, humidity controls, etc.), lighting controls, security monitoring systems, smart coffee makers, charging stations (e.g., charging station for electric cars or electronic equipments, etc.), navigation systems (e.g., GPS systems), sports equipment (e.g., smart golf clubs, smart fishing poles, smart basketballs, etc.), set-top boxes (e.g., online streaming set-top boxes, online gaming devices, etc.), etc. These peripheral devices may still be provided with proprietary software applications that is separately installed and usable independent of the social networking client application. In addition, the peripheral devices may also optionally include physical hardware buttons and controls or built-in onboard screens and software interfaces for users to control directly.

As shown in FIG. 1B, the communication server 112b includes user database 110b that includes the information of each user account registered with the communication server 112b. The user database 110b is analogous to the user database 110a in FIG. 1A. In addition, the communication server 112b also includes a device database 110c. The device database 110c stores identifiers for the peripheral devices that have been registered with the communication server 112b using the device registration methods described herein. The device database 110c also includes the data regarding the relationships between the peripheral devices, their respective users, their respective main user devices, their respective support servers, etc.

In some embodiments, each registered peripheral device is provided with a respective social network identity (e.g., analogous to the social networking identity of a human user) by which the registered peripheral device can be identified by its human owner (e.g., a human user operating a main user device to which the peripheral device is connected to), other users, the communication server, and the support server provided by the manufacturer of the peripheral device. The characteristics of each registered peripheral device as well as the user account or user device to which it is currently associated with (e.g., connected to) are stored in the device database 110c under the respective social network identity of the registered peripheral device. In some embodiments, each registered peripheral device is associated with a user account or user device as a social network contact of the user account currently associated with the user device (e.g., the user account currently logged in at the user device). In some embodiments, other users, its support server, other peripheral devices may be associated with a registered peripheral device as social network contacts of the registered peripheral device in the device database 110c.

In some embodiments, a peripheral device may communicate with its human owner (e.g., the user of the user device to which the peripheral device is currently connected), another peripheral device (e.g., another peripheral device connected to the same user device, or another peripheral device connected to another user device), another user (e.g., a social network contact of the human owner), and/or a support server, using its own social network identity. In some embodiments, a peripheral device may communicate with its human owner through a respective device identity established under the public social network identity of its support server. In some embodiments, each registered device does not possess a social network identity separate from the user account under which it is registered. In some embodiments, a peripheral device may communicate with another peripheral device, another user, a support server through a respective device identity established under the social network identity of its human owner. In some embodiments, the device database 110c may be merged into the user database 110b, such that an network identity of a peripheral device resembles the network identity of a human user or a support server, e.g., including respective contact lists, log-in status, communication history, etc.

As shown in FIG. 1B, the communication server 112b also communicates with one or more support servers 116 (e.g., support servers 116a-c) provided by one or more respective peripheral device manufacturers or support service providers (e.g., peripheral device manufacturers 114a-b). In some embodiments, each of the support service providers have implemented the support servers 116 according to the protocol standards established by the social networking platform provider 102b, such that encoded instructions for accessing and controlling their respective types of peripheral devices can be transmitted to the peripheral devices (e.g., peripheral devices 118a-c) through the social network platform (e.g., via the communication server 112b, and the social networking client applications 108c-e executing on the user devices 104a-c).

In some embodiments, the communication server 112b and the social networking client applications 108c-e does not perform interpretation and/or translations of the encoded instructions, and the decoding of the encoded instructions are performed at the target of the encoded instructions (e.g., at the peripheral devices). Correspondingly, in some embodiments, the social networking client application (e.g., applications 108c-e) executing on the user devices 104 have been implemented according to the protocol standards established by the social networking platform provider 102b, such that encoded messages for the peripheral devices 118a-c can be transmitted to their respective support servers (e.g., support servers 116a-c) through the social network platform (e.g., including through the communication server 112b. In some embodiments, the communication server 112b and the social networking client applications 108c-e does not perform interpretation and/or translations of the encoded messages, and the decoding of the encoded messages are performed at the target of the encoded messages (e.g., at the support servers 116a-c).

In some embodiments, the support servers 116 sending the encoded instructions and receiving the encoded messages optionally generate corresponding instant messages in human-readable forms (e.g., instant messages in textual, tabular, image, graphic, sound, and/or speech forms), and sends the instant messages to one or more users (e.g., the owner of the peripheral devices or other users with which the owner has shared information or control of the peripheral devices) via the communication server 112b. In some embodiments, the human-readable messages are presented on the user interfaces of the social networking client applications 108c-e as instant messages sent from the social networking identity of the support server to the social network identity of the human owner and/or peripheral device. Similarly, in some embodiments, these human-readable messages are presented on the user interfaces of the social networking client applications 108c-e as instant messages sent from the social networking identity of the peripheral device to the social network identity of the support server and/or human owner.

In some embodiments, the communication server 112b optionally implements translation of the encoded instructions and encoded messages for communications that do not involve the support server. For example, the communication server 112b optionally translates instructions originated from a human user and targeting a registered peripheral device (e.g., an instruction submitted via one or more instant messages or selection of one or more user interface controls provided in the social networking client application 108c-e) into the corresponding encoded instructions understood by the peripheral device, thereby accomplishing access and control of the peripheral device by the human user via the social networking platform. In addition, the communication server 112b optionally translates encoded messages originated from a registered peripheral device and targeting a human user into a human-readable form (e.g., one or more instant messages to the user).

The communications that can be accomplished over the social platform can be between a peripheral device and its human owner with or without the participation of the support server; between a peripheral device and its support server with or without the participation of the human owner of the peripheral device; between a human owner of a peripheral device and the support server of the peripheral device with or without the participation of the peripheral device; between different users with or without the participation of their respective peripheral devices, and with or without the participation of the support servers of their respective peripheral devices; between two or more peripheral devices with or without the participation of their respective human owners, and/or with or without their respective support servers; between a user and a peripheral device of another user, with or without the participation of the other user, and/or with or without the participation of the support server of the peripheral device. Other communication configurations are possible and apparent in light of the various examples provided herein.

Before providing more details on the different aspects of the embodiments described herein, a simple exemplary usage scenario is presented first. In an exemplary usage scenario, an exemplary binding process is performed first to bind a peripheral device to a user device that executes a social networking client application, and to bind the peripheral device to a respective user account currently operating the social networking client application.

During the exemplary device binding process, a user launches a social networking client application (e.g., an instant messaging client application that implements the methods described herein) on a user device (e.g., a smart phone, a tablet device, or a portable computer). The user logs into his/her user account at a communication server of the social networking platform through a log-in interface of the social networking client application. Subsequent communications between the user device and the communication server will occur under the user account of the user. Provided in the user interface of the social networking client application is a barcode scanner interface that can scan a barcode (e.g., via a camera of the user device). In some embodiments, the manufacturer of a peripheral device provides a 2D barcode on the peripheral device, and the 2D barcode includes the necessary information that the communication server of the social networking platform needs to uniquely identify the peripheral device or the maker of the peripheral device, such as a URL of the manufacturer and/or a device ID of the peripheral device. Once the user has agreed to proceed with the binding process and the barcode information is transmitted from the user device to the communication server of the social networking platform under the user account of the user, the communication server binds the peripheral device to the user account. In other words, the communication server of the social networking platform creates a unique social network identity for the peripheral device, and adds the peripheral device to the list of social network contacts of the user under the user account. In some embodiments, the communication sever also creates a respective social networking identity for an support server of the support service provider for the peripheral device, and adds the support server to the list of social network contacts of the user under the user account.

In some embodiments, the binding process does not require the peripheral device to be connected to the user device. After the binding process is completed, the peripheral device can be connected to the user device under the social network identity created for the peripheral device at any time. The communication from the peripheral device to the communication server of the social network platform can be accomplished through the user device as an intermediary. During an exemplary device connection process, the user device automatically scans for nearby peripheral devices that broadcast a unique service identifier of the social network client application. The peripheral device has been preconfigured by the manufacturer to broadcast in its device discovery messages the unique service identifier of the social network client application. The social network client application executing on the user device scans for and detects that the peripheral device's device discovery messages includes the required service identifier, and establishes a connection (e.g., a Bluetooth, Bluetooth Low Energy, WiFi, USB, etc. connection) with the peripheral device. Once the connection has been established, the social network client application notifies the communication server of the social networking platform that the peripheral device is now online. The social network client application also indicates in a user interface to the user that the peripheral device is now online and available to communicate with the user as social network contacts over the social networking platform. In some embodiments, the user device does not try to establish the connection with the peripheral device until the user has selected a user interface control to start a conversation session with the peripheral device in the social networking client application. In some embodiments, the user device scans for and tries to establish a connection with the peripheral device when the user first logs into his/her user account. In some embodiments, the user does not have to use the same user device for the binding process and the connection process. The user device referred to in the description of the binding process and the connection process is the user device that is currently executing the social networking client application (including a browser showing a web interface for the social networking platform) and that has the user's account as the currently active user account.

After the peripheral device has established a connection with the user device within the social networking client application under the user account of the user, the user is able to communicate with the peripheral device as a social network contact on the social networking platform. For example, if the peripheral device is a health monitoring wrist band that has been connected to the user device (e.g., a smart phone) via a Bluetooth or Bluetooth Low Energy (BLE) connection within the social networking client application under the user account of the user, the user can optionally start a chat session with the wrist band like he/she would with any other social network contact of his/hers. For example, the user may choose to send an instant text message to the wrist band during the chat session, saying "Show me today's data" or "Light up the screen." The instant text message will be presented in the conversation interface of the chat session as a message sent from the user to the respective social network identity of the peripheral device.

In some embodiments, the social networking client application provides a customized user interface to the user when the user selects to start a conversation session with the wrist band, and within the customized user interface, the social networking client application presents one or more buttons representing different commands that may be issued to the wrist band. For example, the customized user interface may present a button for "output today's data", a button for "show battery level", and a button for "vibrate". When the user invokes one of the buttons (e.g., the button for "vibrate"), a corresponding command will be presented on the conversation interface of the chat session as a message from the user to the respective social network identity of the peripheral device. The command will also be translated into an encoded instruction by the communication server or support server of the peripheral device, and sent to the peripheral device via the communication server and the user device. The wrist band receiving the encoded instruction will respond accordingly, e.g., by start vibrating.

In some embodiments, regardless of whether the user has entered the instruction/command to the peripheral device by typing, by speech, by invoking a button, or by any other means, the instruction/command is sent from the user device to the communication server, which obtains the corresponding encoded instruction/command (e.g., either by doing an internal translation itself, or by contacting the support server of the peripheral device) and sends the translation back to the user device. The user device forwards the encoded instruction/command to the peripheral device through the connection that has been established between the user device and the peripheral device. The peripheral device responds or acts in accordance with the encoded instruction/command. For example, the wrist band will start vibrating after the user has entered a text message "vibrate" in the chat interface or invoked a button for "vibrate" in the customized user interface the social networking client application has provided for the wrist band. This would be useful when the user cannot locate the wrist band in her vicinity, and wishes to use his/her social network client application to talk to the wrist band such that the wrist band can respond by making a noise for the user to find it.

Sometimes, the user may include additional user(s) and/or other peripheral device(s) in a chat session between the user and the peripheral device. For example, the user can create a group chat session including the respective social network identities of any other user(s) or peripheral devices that have been registered with the communication server by their respective owners and are currently online via their respective owner's user accounts. For example, if the user's peripheral device is a blood pressure monitor, the user may start a group chat session involving the user him/herself, the user's family members, and the blood pressure monitor. After the user has put the arm wrap of the blood pressure monitor around his/her arm, the user may enter a text message (e.g., "start measuring") to the blood pressure monitor (e.g., by using @XXX in the message body) in the group chat interface, or invoke a button for "start" in the customized group chat interface. The conversation interface of the group chat session will show the user's instruction as an instant message "Start today's blood pressure measurement" sent from the user to the blood pressure monitor. The communication server obtains the user's instruction and according to the user's instruction obtains the corresponding encoded instruction for the blood pressure monitor. The communication server sends the encoded instruction to the blood pressure monitor via the user device, and the blood pressure monitor responds to the encoded instruction by start measuring the user's blood pressure. In some embodiments, the blood pressure monitor optionally sends a encoded response to the user device regarding the progress and final results of the blood pressure measurement. The user device sends the encoded response to the communication server, and the communication server obtains the corresponding human-readable data according to the content of the encoded response. The communication server sends the human readable data to the users involved in the group chat as one or more chat messages (e.g., "Starting to measure blood pressure, please keep still." "You blood pressure today is 120/60, very good." "Measurement completed, please remove the arm wrap." etc.). Each user currently in the group chat will see these chat messages on their respective user devices as a message from the blood pressure monitor to the whole group or to each of them individually.

More example usage scenarios and embodiments will be provided below.

FIGS. 2A-2H are exemplary user interfaces for setting up access and control of a peripheral device via a social networking client application in accordance with some embodiments.

In some embodiments, to set up access and control of a peripheral device, the user first requests the communication server to bind the peripheral device to the user's account on the social networking platform. After the peripheral device has been bound to the user's account, the user device scans for the peripheral device and establishes a connection to the peripheral device if the peripheral device is found. FIGS. 2A-2H illustrate a process for setting up control for an exemplary peripheral device 200 (e.g., one of the peripheral devices 118 in FIG. 2B), through an exemplary user device 202 (e.g., one of the user devices 104 in FIG. 2B) executing a social networking client application operating under an exemplary user account "Red207".

Figure 2A:
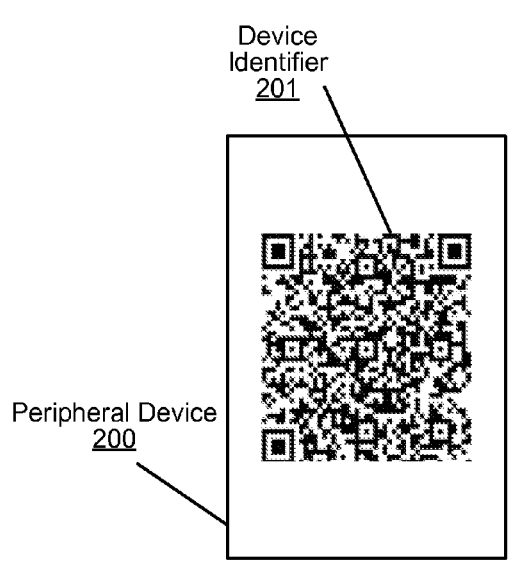
FIGS. 2A-2H are exemplary user interfaces for setting up access and control of a peripheral device via a social networking client application in accordance with some embodiments.

As shown in FIG. 2A, in some embodiments, a manufacturer of the peripheral device 200 (e.g., a health monitoring wrist band) provides a 2D barcode on the packaging or the body of the peripheral device 200, where the 2D barcode encodes a unique identifier 201 for the peripheral device 200, or a unique identifier for an support server of the peripheral device 200 which will provide support services for the type of peripheral devices including the peripheral device 200. Other format of the unique device identifier is possible.

Figure 2B:
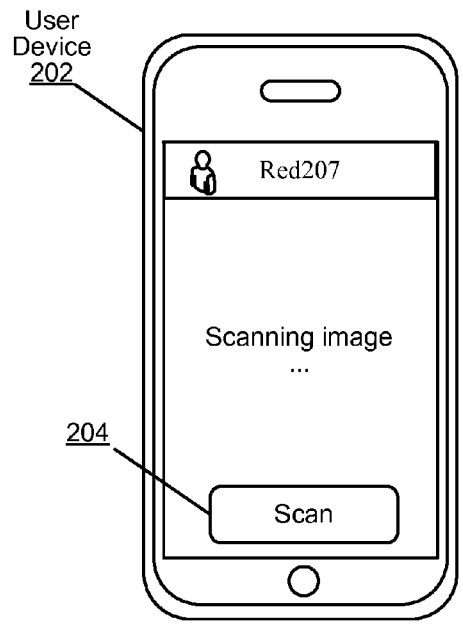

FIG. 2B shows that the user with a user account named "Red207" has started a social networking client application on the user device 202 (e.g., a smart phone) and invoked a function to add a hardware contact provided in the social networking client application. The user places the 2D barcode under the scanner (e.g., a built-in camera of the smart phone), and invokes the scan button 204 to scan the 2D barcode. In some embodiments, the user interface control for start scanning the barcode of a peripheral device is the same as the user interface control for starting scanning the barcode (e.g., a QR code) assigned to any other user of the social network platform. The communication server determines on the backend whether the user wishes to add a new human contact or a hardware contact based on the identifier obtained in the barcode.

Figure 2C:
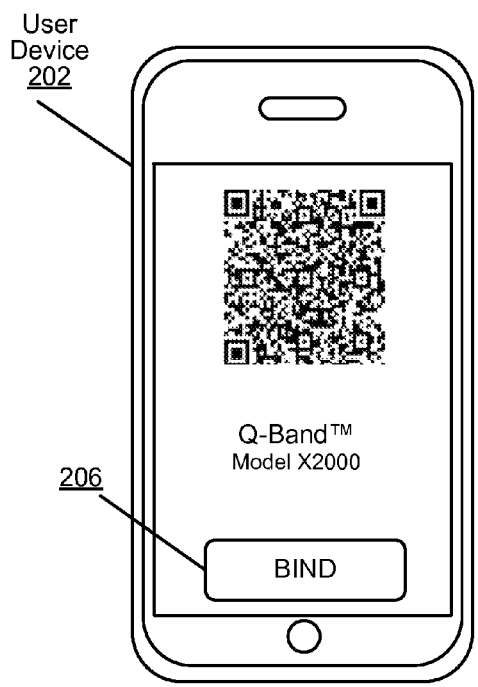

FIG. 2C shows that the user device 202 has successfully scanned the barcode and recognized the identifier of the peripheral device that the user wishes to bind to his/her account. The name (e.g., "Q-Band™") of the peripheral device 200 is displayed to the user. In some embodiments, the model number (e.g., "Model X2000") is also optionally displayed to the user. Once the user confirms that the reading of the barcode agrees with his/her expectation, the user can invoke the "bind" button 206 to bind the peripheral device 200 to the user account "Red207". The invocation of the "bind" button 206 causes the user device 202 to send the binding instruction to the communication server of the social networking platform, and the communication server creates a binding between the user's account and the identifier of the peripheral device. Sometimes, if the barcode assigned to the peripheral device 200 is not unique (e.g., is a common barcode assigned for all of a type of peripheral devices (e.g., a particular device model) or a support service provider for one or more types of peripheral devices), the binding process creates a unique device identifier for the peripheral device based on the user account identifier and the identifier encoded in the barcode (e.g., by concatenating the username and the common device identifier). The communication server also creates a social networking identity for the peripheral device 200, including all or at least some of the features of a human user (e.g., including a user name, an avatar, an account type, an online status, a contact list, a social network group list, a conversation history, a fan list (e.g., "other users that follow me"), a list of subscriptions (e.g., "other users I am following"), etc.). In some embodiments, the communication server also indicates that the peripheral device 200's account is a device account, and is associated with a respective user account (e.g., "Red207").

Figure 2D:
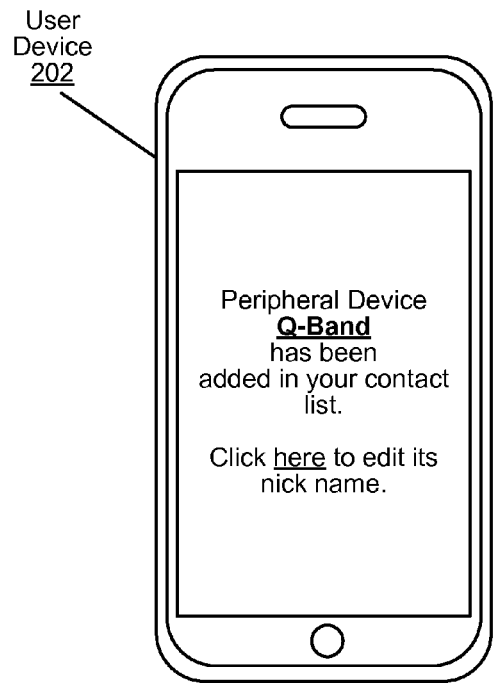

FIG. 2D shows that the binding process has been successfully completed. The communication server notifies the user that the peripheral device 200 (with a temporary online identity of "Q-Band") has been bound to the user's account. The user can optionally change the nickname of the peripheral device 200 to other names that are more appealing to the user (e.g., "Red's Q-Band").

Figure 2E:
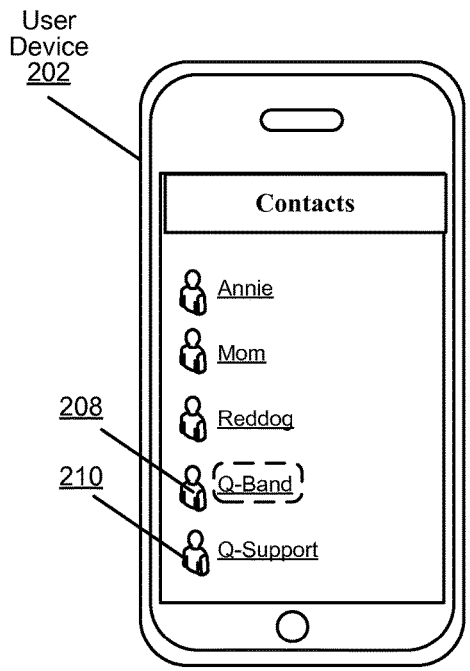

FIG. 2E shows a list of contacts that are currently associated with the user account "Red207". The list of contacts includes other human users (e.g., "Annie", "Mom", and "Reddog") with whom the user has previously established a mutual social networking relationship. FIG. 2E also shows that the list of contacts also includes the social network identity 208 of the peripheral device (e.g., "Q-Band"). In some embodiments, the list of contacts also includes a public social network identity 210 of a support service provider 2 (e.g., "Q-Support") for the newly added peripheral device 200. At this point, the icon for the peripheral device is shaded in a way to indicate that the peripheral device 200 corresponding to the social network identity "Q-Band" is not currently connected to the user device 202. After the peripheral device 200 is connected to the user device 202, the communication server is notified of the connection, and the appearance of the icon for the peripheral device will change to indicate that the active online status of the peripheral device 200 is now connected.

Figure 2F:
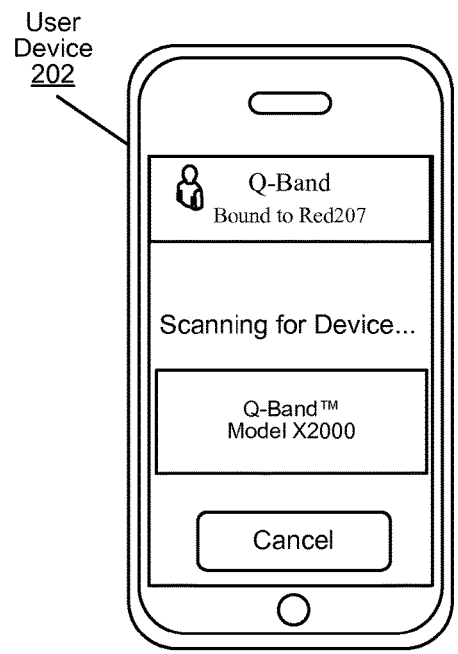

FIG. 2F shows that when the user invokes the icon of the peripheral device 200 in the contact list shown in FIG. 2E, the user device 202 initiates a connection process to scan for and connect to the peripheral device 200 associated with the social network identity "Q-Band". In some embodiments, the manufacturer of the peripheral device 200 and the provider of the social networking client application agrees on a particular connection protocol (e.g., a Bluetooth™ or Bluetooth Low Energy, or WiFi connection protocol), such that the social networking client application can discover the type of peripheral devices that have implemented the methods described herein. More details on the connection protocol are provided later in the present disclosure. When the user device 202 discovers the presence of the peripheral device 200 through the scanning process, the detected peripheral device 200 is matched to the social network identity of the peripheral device 200, and displayed to the user on the user device 202. After the peripheral device 200 is connected to the user device 202, the communication server is notified of the connection, and the appearance of the icon for the peripheral device will change (not shown) to indicate that the peripheral device 200 is now connected.

Figure 2G:
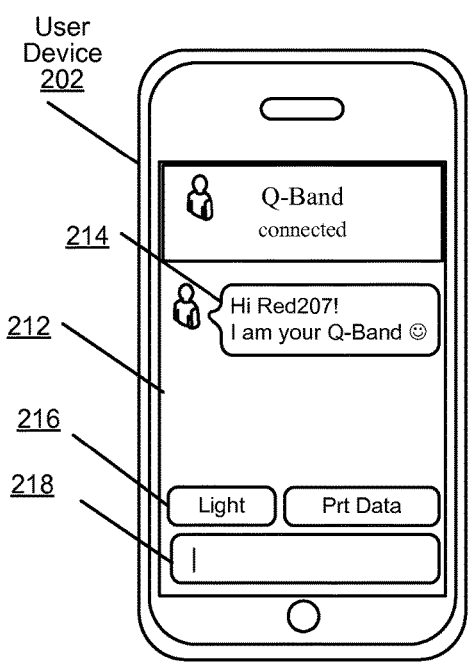

FIG. 2G shows that once the peripheral device 200 and the user device 202 has established a connection in the social networking client application, a chat session can be established between the user and the peripheral device 200 in a manner similar to establishing a chat session between two users (e.g., by selecting the peripheral device 200 in the contact list and choosing to send a message to the peripheral device 200). In some embodiments, a conversation interface for a chat session between the peripheral device 200 and the user "Red207" is automatically started when the connection is first established. In the conversation interface 212 displayed on the user device 202, the peripheral device 200 has send a message 214 to the user (e.g., "Hi Red207! I am your Q-Band ☺ "). This message 214 is provided to the user device 202 by the communication server. The process for the communication server to obtain this message may vary in different embodiments. In some embodiments, the user device 202 forwards the encoded message (e.g., an "Init OK" message) received from the peripheral device 200 to the communication server, and the communication server either translates the encoded message to the message 214 by itself or asks the support server of the support service provider for the peripheral device 200 to translate the encoded message to the message 214. More details of how encoded messages are transmitted from the peripheral devices, processed by the user device, the communication server, and/or the support server, communicated to the user, and memorialized in the conversation history are provided in other parts of the present disclosure.

FIG. 2G also shows that the conversation interface 212 of the current chat session optionally includes a message input box 218 through which the user may enter a text message (e.g., "Light the display") to the peripheral device 200. The conversation interface 212 optionally include one or more user interface controls for invoking specific commonly used functions of the peripheral device 200. For example, the conversation interface 212 optionally includes a button 216 for lighting up the peripheral device 200 (e.g., a health monitoring wrist band) to test the communication channel and function of the peripheral device 200. The conversation interface 212 optionally includes other buttons (e.g., a "print data" button) for invoking other functions of the peripheral device 200. When the user presses the "Light" button 216, a signal is sent to the communication server indicating that the user has pressed the "Light" button 216. The communication server obtains the corresponding encoded instruction for the peripheral device 200, and sends the encoded instruction back to the user device 202. The user device then forwards the encoded instruction to the peripheral device through the connection established between the user device and the peripheral device. The peripheral device then interprets and carries out the command in the encoded instruction, and optionally sends back an encoded response (e.g., an encoded response indicating successful completion of the requested task).

In some embodiments, the development of the user interface controls can be accomplished through the cooperation between the manufacturer of the peripheral device 200 and the provider of the social networking platform. In some embodiments, the communication server only needs to know what functions the manufacturer prefers to include in the conversation interface for its product (e.g., the peripheral device 200), and the communication server does not need to perform any actual translation and/or interpretation of the commands and messages that are received from the user and/or the peripheral device 202 through the user device 202. For example, in some embodiments, the communication server need not perform the conversion from an instant message or function button press entered by the user to a corresponding encoded instruction targeting the peripheral device. Instead, the communication server forwards the user-requested function to the support server of the support service provider for the peripheral device, and receives the corresponding encoded instruction from the support server. The communication server in turn forwards the encoded instruction to the peripheral device through the user device. In some embodiments, the communication server also need not perform the conversion from the encoded message received from the peripheral device to an instant message shown to the user. Instead, the communication server forwards the encoded message to the support server of the support service provider for the peripheral device, and receives a corresponding translation of the encoded message. The communication server in turn sends the translation as an instant message to the user as a message from the peripheral device to the user. In some embodiments, the communication server optionally performs the conversions by itself, e.g., through the use of a mapping table between natural language messages/button presses and encoded instructions/messages.

Figure 2H:
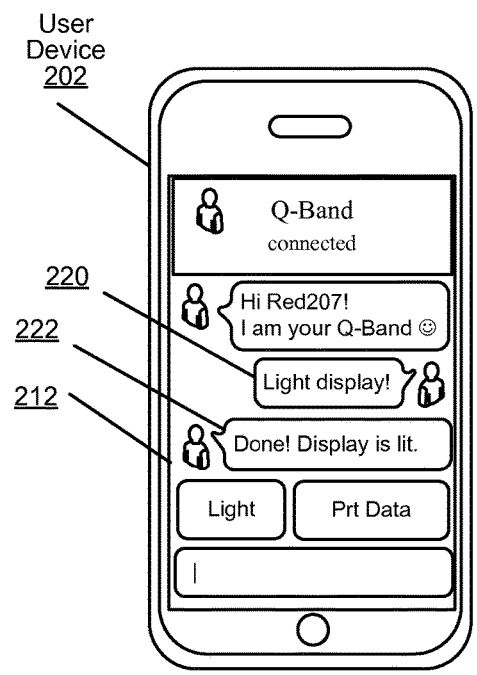

FIG. 2H shows that after the user has entered a text message (e.g., "Light display") or pressed the "Light" button 216, the corresponding encoded instruction is sent from the communication server to the user device 202, and then from the user device 202 to the peripheral device 200. The corresponding instant message 220 is displayed in the conversation interface 212 as a message from the user to Q-Band. After the peripheral device 200 performs the requested function, the peripheral device 200 sends a response (e.g., an encoded response indicating completion of the task to light the display of the health monitoring wrist band) to the user. The response is displayed as an instant message 222 (e.g., "Done! Display is lit".) from Q-Band to the user in the conversation interface 212. In some embodiments, when the peripheral device 212 wishes to send a message to the user, the message is in an encoded form (e.g., formatted according to the proprietary format of the device manufacturer). The encoded message is sent to the user device 202, and the user device 202 forwards it to the communication server. The communication server optionally forwards it to the support server and obtains a translation of the encoded message from the support server. The communication server then sends the translation as an instant message to the user device 202. The translation is presented to the user as an instant message from the peripheral device "Q-Band" to the user "Red207".

The user interfaces shown in FIGS. 2A-2H and the features described with respect thereto are merely illustrative of the embodiments possible. In some embodiments, more function buttons are included in an extended conversation interface that can be invoked via a control displayed on a simple version of the conversation interface. In some embodiments, the user is provided with a configuration interface that allows the user to set up buttons for the most frequently used commands and instructions. In some embodiments, the social networking client application allows the user to enter natural language instructions and commands via a text input box or a speech input interface, and the communication server receiving the natural language instructions and commands optionally generates an interpretation of the user's command through a local or third-party natural language processing service. The communication server then forwards the interpretation to the support server of the peripheral device for translation into the encoded instructions. More details on how the instructions and responses are transmitted between the different layers of the communication architecture (e.g., support server←→communication server←→user device(s)←→user(s) and peripheral device(s)) are provided later in the present disclosure.

Figure 2I:
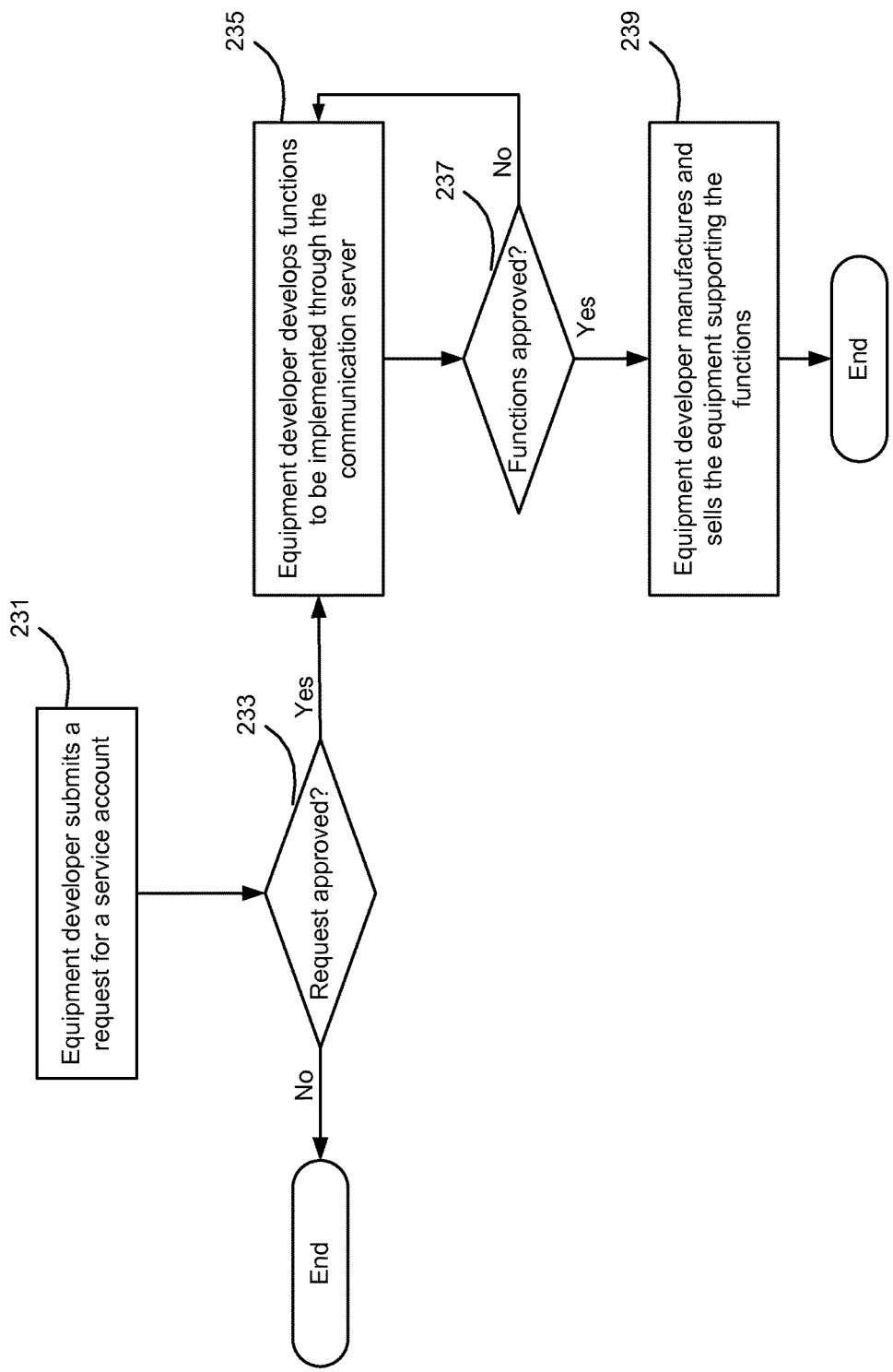
FIG. 2I illustrates a simplified process flow for a device manufacturer to obtain a support service account from a provider of the social networking platform in accordance with some embodiments.

FIG. 2I is a simplified process flow illustrating a process for a device manufacturer to establish support for one or more types of its peripheral devices through the provider of the social networking platform. For example, the manufacturer (e.g., equipment developer of the peripheral device) submits (231) a request for a service account (e.g., an account for a support server of a support service provider for a type of peripheral devices made by the manufacturer). In some embodiments, the manufacturer or equipment developer submits the name, model number, basic functions, and functions to be supported by the social networking platform to the provider of the social networking platform. The provider of the social networking platform reviews the request, and determines (233) whether to accept the request according to internal or published guidelines. If the provider of the social networking platform decides to accept the request, the developer is notified of the acceptance and the manufacturer or equipment developer proceeds (235) to develop functions to be implemented through the communication server of the social networking platform. If the provider of the social networking platform does not accept the request, the equipment developer can go back and modify the request and resubmit or terminate the request process.

When the approved functions are implemented by the equipment developer, the functions will be reviewed (237) by the provider of the social networking platform for quality assurance. Once the functions are approved again through testing, the support for the type of peripheral devices identified in the request is formally released to the public, and the communication server will now accept registration requests for peripheral devices of this supported type, and establish a respective social network identity for the support server of the peripheral devices on the social networking platform. After the public release, the manufacturer and equipment developer for the supported peripheral devices may start (239) manufacturing and/or selling the peripheral devices to the end users. In some embodiments, the provider of the social networking platform will also assign a unique identifier to the support server for the supported type of peripheral devices, which can be provided to the buyers of the peripheral devices that are manufactured at the time of sale. For example, the identifier may be provided as a 2D barcode attached to the peripheral device or its packaging, or provided as a unique serial number included with the peripheral device.

Figure 2J:
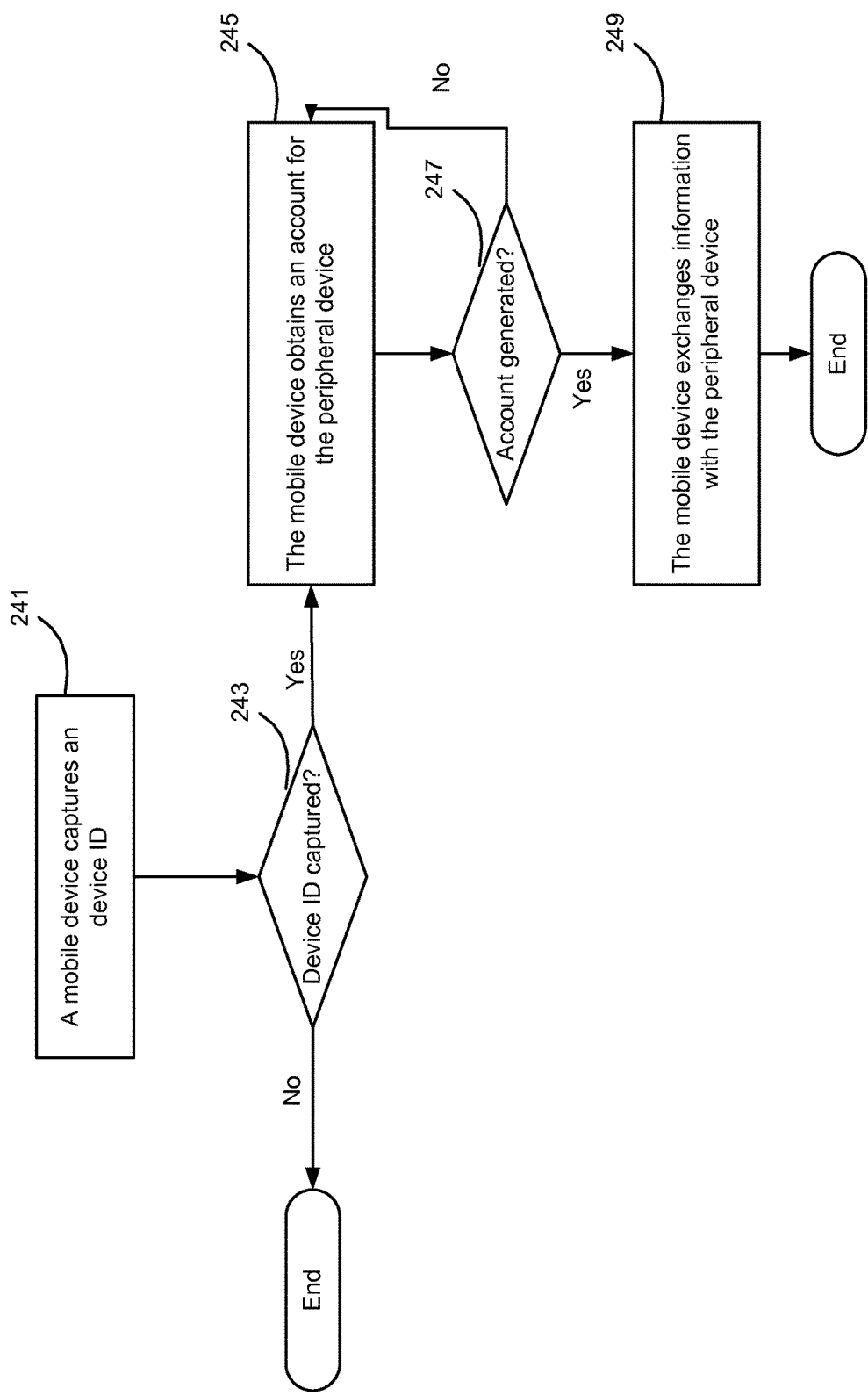
FIG. 2J illustrates a simplified process flow for a user device to obtain a social network identity for a supported peripheral device in accordance with some embodiments.

FIG. 2J is a simplified process flow illustrating a process for an end user to register a particular peripheral device using a user device (e.g., a mobile device) with the communication server of the social networking platform. As shown in FIG. 2J, when the end user provides the device ID to the user device at the time of device registration, the user device captures (241) the device ID provided by the user (e.g., through a 2D barcode on the peripheral device or through a direct text input). The user device determines (243) whether the device ID has been successfully captured. If the user device does not recognize the device ID after consulting a database stored at the communication server, the process ends. If the user device determines that a correct device ID for a supported peripheral device has been captured, the user device obtains (345) an account for the peripheral device from the communication server of the social networking platform. For example, in some embodiments, the user device sends the device ID to the communication server, and the communication server generates the appropriate social network identity for the peripheral device based on the device ID and the user's own ID, and creates the account for the peripheral device. The account for the peripheral device is also associated with the user's own account by the communication server. Once the account has been generated, the communication server sends the account information to the user device. The user device determines (247) whether the account for the peripheral device has been successfully generated. If so, the user device can start (249) exchanging information (e.g., instructions and responses) with the peripheral device. The information includes encoded instructions originated from the support server of the peripheral device and sent to the user device through the communication server, encoded instructions from the communication server directly, encoded response from the peripheral device directed to the support server, the communication server, other devices, and/or the user, etc.

FIGS. 2K-2T illustrate message translation and flow in various communication scenarios involving accessing and controlling a peripheral device over a social networking platform in accordance with some embodiments. Different combinations of the communication scenarios may be present in a conversation involving more than one communication from an originating party to a target party. Each of a user, a peripheral device, a support server, and a communication server may be the originating party (also referred to as an "originator") or the target party (also referred to as a "target") of a particular communication message (e.g., an encoded instruction, an encoded message, or an instant message). Each of a user device, a support server, and a communication server may serve as an intermediate transmitter of the particular communication message originated by other parties and targeting other parties. In some embodiments, direct messages to the communication server, e.g., direct messages originated from the support server, a user, or a peripheral device are permitted, but since the communication server is usually not considered one of the conversation participants in a chat session, these messages are not depicted herein. As used herein, if a message is directed at a particular party, the message is said to be "@" that party in FIGS. 2K-2T, and that party is the target of the message, even if the message may pass one or more other parties during transit from its source to the target. The party that initiated a message or instruction is the originator of the message or instruction, even if the initiation of the message is in response to another message or instruction previously received by the originator.

As depicted herein, the messages originating from a peripheral device are called "encoded messages", and the encoded message follow the native I/O and data format of the peripheral device. In some embodiments, encoded messages from some types of peripheral devices may be human-readable, but such is not required. In some embodiments, if an encoded message from a particular peripheral device is directed to a human user, the encoded message is transmitted to the support server of the peripheral device first to be translated into a human-readable instant message, and the human-readable instant message is then sent to the user (via the user's user device) instead of the encoded message. In some embodiments, if an instant message from a particular user is directed to a peripheral device, the instant message is transmitted to the support server of the peripheral device first to be translated into an encoded instruction for the peripheral device, and the encoded instruction is then sent to the peripheral device (via the user's user device) instead of the instant message. In some embodiments, the communication server forwards an original message to the support server and obtains a translation of the original message suitable for the target of the original message. In some embodiments, for at least a subset of the original messages, the communication server generates the translation locally without contacting the support server. In some embodiments, when the support server is the originator of a message or instruction, the support server provides the message or instruction in the correct format (e.g., either as an instant message or as an encoded instruction) depending on the target party of the message.

Figure 2L:
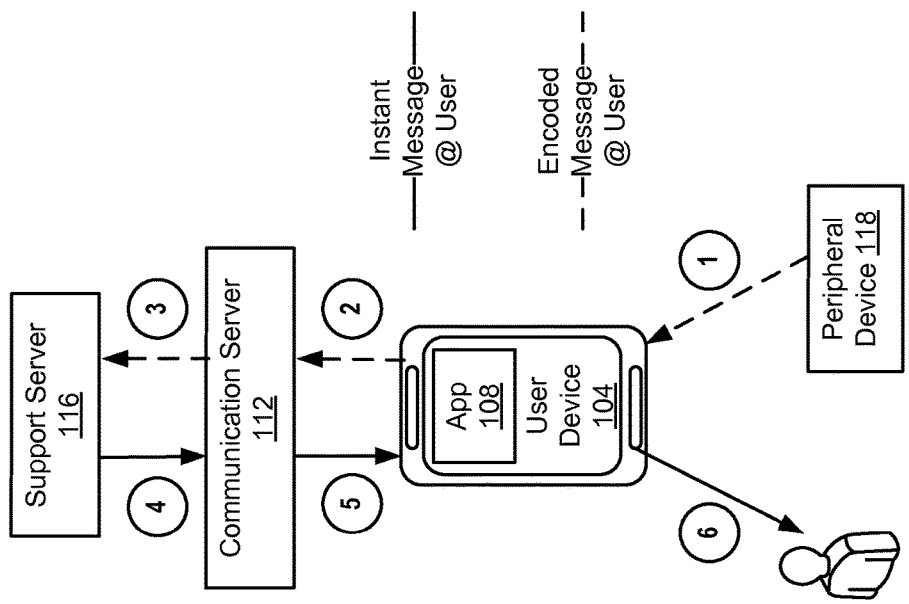
FIGS. 2K-2T illustrate message translation and flow in various communication scenarios involving accessing and controlling a peripheral device over a social networking platform in accordance with some embodiments.
Figure 2K:
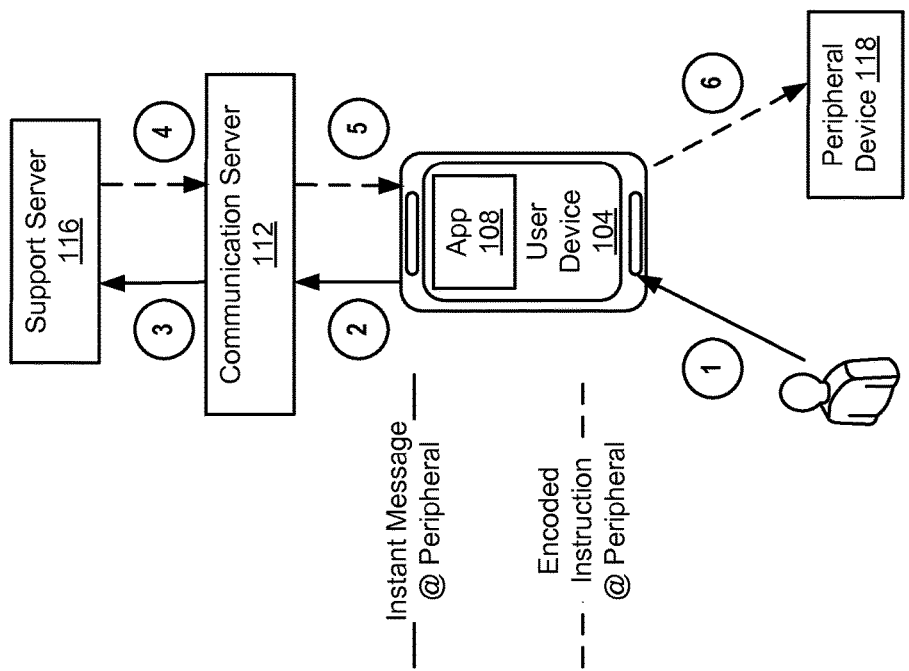

FIG. 2K depicts a communication scenario in which a user initiates an instruction (e.g., "Turn off air conditioner.") targeting a peripheral device 118 (e.g., a climate control device), in a user interface provided by a social networking client application 108 executing on a user device 104 (e.g., a smart phone). In this and the following example scenarios, the user has already logged into his/her account at the communication server 112; the peripheral device 104 is a supported device of the support server 116, and has been registered by the user under his/her account; and the peripheral device and the user device have established a connection under the social networking client application. For illustrative purposes, assume that the user's social network identity is "User" and the social networking identity of the peripheral device 118 is "Peripheral" in this example.

In this example, the flow of the message(s) is as follows:

(1) The user optionally inputs the instruction by typing an instant message "Turn off air conditioner" or by invoking a user interface control (e.g., a "Turn Off" button) for turning off the peripheral device 118 provided in a conversation interface for a chat session between "User" and "Peripheral". In a one-to-one chat session, a message from one participant automatically targets the other participant of the chat session. Thus, the message entered by the user is an instant message that targets the peripheral device 108. In some embodiments, the invocation of a preset user interface control corresponds to an instant message that targets the peripheral device 108, and is represented in the conversation log as such.

(2) The instant message originated from the user and targeting the peripheral device 118 is transmitted from the user device 104 to the communication server 112.

(3) The communication server 112 receives the instant message and further transmits it to the support server of the peripheral device. The communication server obtains the identities of the user and the peripheral device from the originator and target fields of the instant message. Based on the identity of the peripheral device, the communication server determines the identity of the support server for the peripheral device.

(4) The support server 112 receives the instant message, and recognizes that it is a human-readable message, and needs to be translated into a format that is acceptable to the peripheral device 118. The support server 112 interprets the received instant message, and maps it to an encoded instruction targeting the peripheral device 118. The support server 112 sends the encoded instruction to the communication server, the encoded instruction targeting the peripheral device 118.

(5) The communication server 112 receives the encoded instruction targeting the peripheral device from the support server 116, and forwards it to the user device 104.

(6) The user device 104 receives the encoded instruction targeting the peripheral device 118, and sends it to the peripheral device 118. The peripheral device 118 reads and carries out the task requested in the encoded instruction.

Although the encoded instruction in this example is an instruction initiated from the user. The same flow of message(s) applies when the user is responding to a previous request for information from the peripheral device. For example, if the peripheral device had previously requested the user to provide a preferred energy saving mode for the temperature control, the user can answer the request for information by typing an instant "Most Power Saving" or "Balanced between Power and Comfort" targeting the peripheral device in the chat interface.

FIG. 2L illustrate a communication scenario in which the peripheral device 118 initiates a message or request (e.g., "E01", meaning "Error 01=Light Sensor Blocked.") targeting a user through the social networking client application 108 executing on the user device 104. In this example, the flow of the message(s) is as follows:

(1) The peripheral device 118 generates an encoded message (e.g., "E01") targeting the user.

(2) The user device 104 receives the encoded message, and forwards it to the communication server 112.

(3) The communication server receives the encoded message from the user device and recognizes that "User" and "Peripheral" are the originator and the target of the encoded message, respectively. The communication server also identifies the support server for the peripheral device, and forwards the encoded message to the support server for translation into a human-readable instant message.

(4) The support server 116 receives the encoded message targeting the user, and translates it into human-readable form (e.g., an instant message "The light sensor is blocked, please remove its cover".). The support server 116 then sends the instant message targeting the user to the communication server.

(5) The communication server receives the instant message targeting the user, and forwards it to the user device.

(6) The user device receives the instant message targeting the user and displays the instant message to the user as an instant message originated from the peripheral device and targeting the user.

Although the encoded message in this example is a request initiated from the peripheral device. The same flow of message(s) applies when the peripheral device is responding to a previous request for information from the user. For example, if the user had previously requested the peripheral device to provide a weather forecast data for today, the peripheral device can answer the request for information by sending the answers in an encoded message (e.g., "90RSW", meaning "Rainy, highest temperature=90 degrees, Southwest wind.") targeting the user.

Figure 2N:
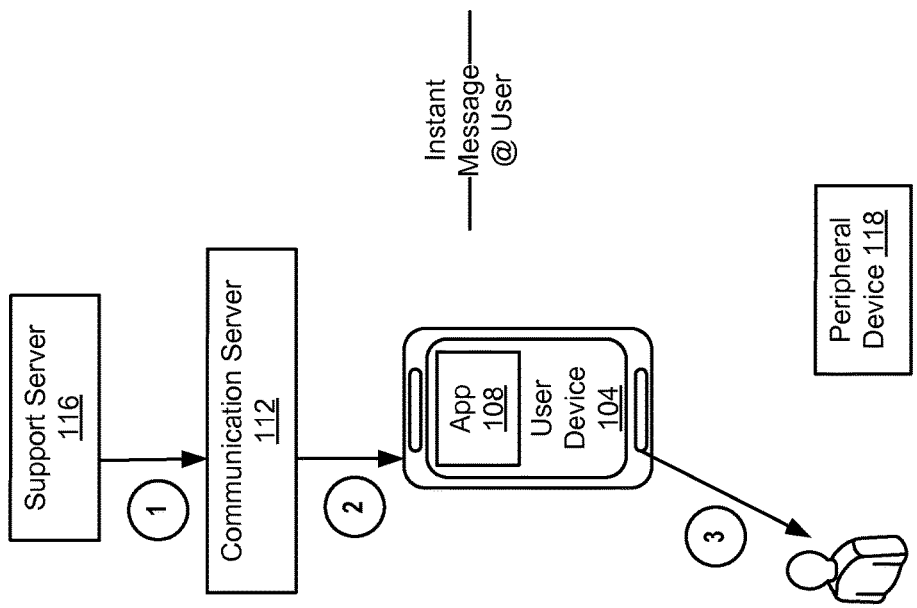
Figure 2M:
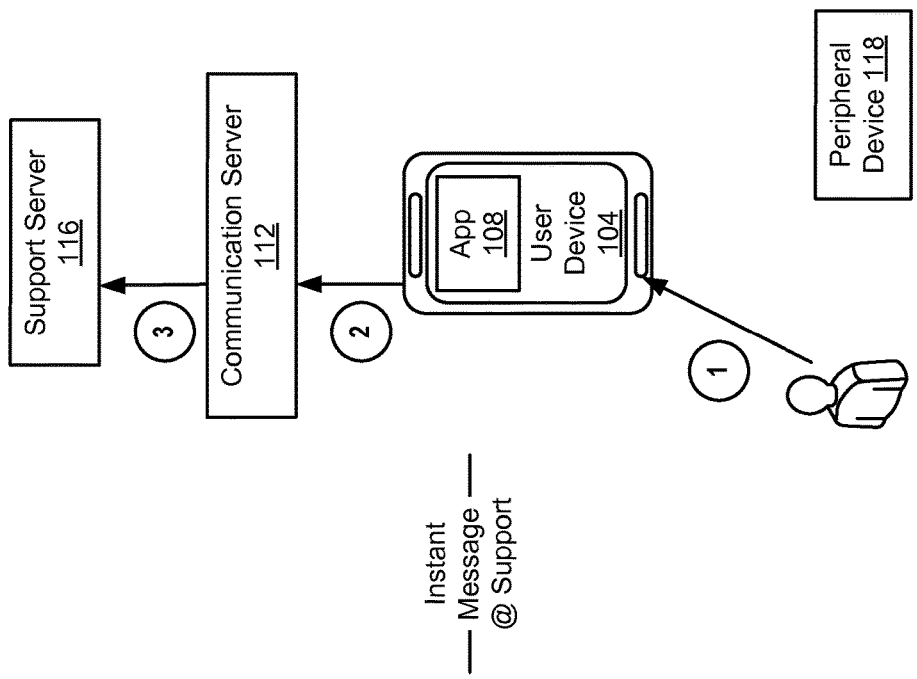

FIGS. 2M-2N illustrate that a user may communicate with a support server independent of a peripheral device supported by the support server. The communication between the support server and the user can be carried out using normal instant messaging capabilities provided on the social networking platform. Suppose that the social network identity of the support server 116 is "Support". A user can send an instant message targeting "Support", and the support server can send an instant message targeting "User."

As shown in FIG. 2M, the message flow is as follows:

(1) The instant message targeting the support server is typed in by the user in a conversation interface of a chat session including "User" and "Support".

(2) The user device sends the instant message targeting "Support" to the communication server.

(3) The communication server recognizes that the instant message targets the support server, and sends the instant message to the support server. The instant message is recorded in the conversation log of the chat session as an instant message from User to Support.

As shown in FIG. 2N, the message flow is as follows:

(1) The instant message targeting the user is generated by the support server (e.g., either machine-generated or typed by an administrator of the support server). The support server sends the instant message to the communication server.

(2) The communication server recognizes that the instant message targets the user, and sends the instant message to the user device associated with the user.

(3) The user device displays the instant message to the user, and the instant message is recorded in the conversation log of the chat session as an instant message from Support to User.

In various communication scenarios, the direct communication from the support server to the user can occur when a support staff wants to obtain some information from the user directly (e.g., "Is the surface of the temperature control wet?"), or give an instruction or information directly to the user (e.g., "Press the red button twice while holding the blue button" or "No, that is not an error. The blinking blue light means the unit is operating normally").

In various communication scenarios, the direct communication from the user to the support server can occur when the user wants to obtain some information from a staff of the support server or the support server directly (e.g., "How do I turn the unit off without erasing my last measurement"), or give an instruction or information directly to the support staff (e.g., "Can you reconfigure the unit remotely for me?" or "No, I never changed the filter before.").

In various communication scenarios, the direct communications between the user and the support server may be a one-on-one communication, or part of a group chat session involving other user(s) and/or peripheral device(s).

Figure 2P:
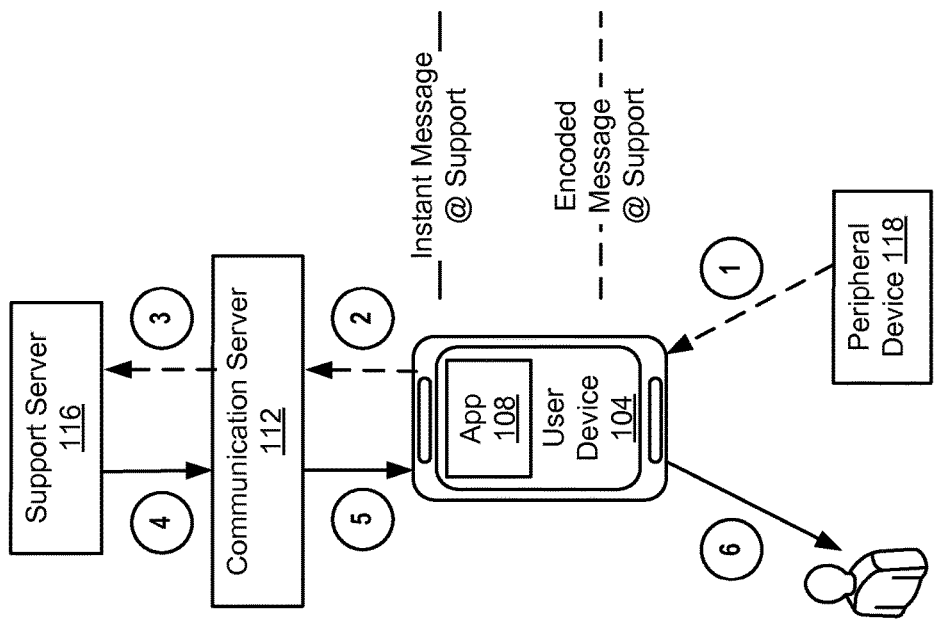
Figure 2O:
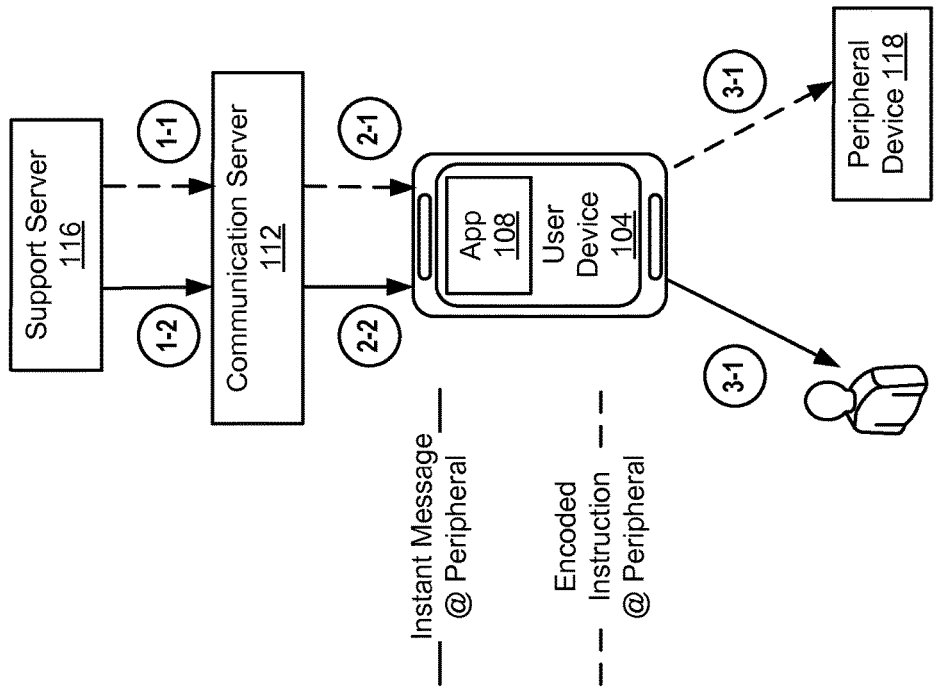

FIG. 2O illustrates an exemplary communication scenario in which the support server 116 initiates an encoded instruction targeting the peripheral device 118 over the social networking platform. In this communication scenarios, the user is engaged in a group conversation involving at least the support server (identified as "Support"), the user him/herself (identified as "User"), and the peripheral device (identified as "Peripheral"). In such a communication scenario, in addition to the encoded instruction targeting the peripheral device (e.g., "T01", meaning "Run diagnostic test 1."), the support server also prepares an instant message (e.g., "@Peripheral: Run diagnostic test 1.") based on the content of the encoded instruction, such that the instant message can be sent to the user via the social networking platform and displayed in a conversation log of the current chat session. The instant message will appear in the conversation log as an instant message originated from the support server and targeting the peripheral device.

In some embodiments, the flow of the message(s) is as follows:

(1) In a group chat session involving "Support," "User," and "Peripheral", the support server initiates an encoded instruction targeting the peripheral device 118. The support server also generates an instant message version of the encoded instruction for use by the communication server. The support server sends (1-1) the encoded instruction and sends (1-2) the instant message, both targeting the peripheral device, to the communication server.

(2) The communication server receives the encoded instruction and the instant message from the support server. The communication server forwards (2-1) the encoded instruction to the user device as an encoded message targeting the peripheral device. The communication server also forwards (2-1) the instant message to the user device as a human-readable translation of the encoded message.

(3) The user device receives the encoded instruction and the instant message from the communication server. The user device sends (3-1) the encoded instruction to the peripheral device. The user device displays (3-2) the instant message to the user in a conversation log of the current chat session as a message from "Support" to "Peripheral."

In some embodiments, the support server may communicate with the peripheral device independent of the user's participation. In such cases, no instant message needs to be prepared and sent to the user, and only the encoded instruction is sent to the peripheral device via the communication server and the user device.

FIG. 2P illustrates an exemplary communication scenario in which the peripheral device 116 initiates an encoded message (e.g., "R01", meaning "Diagnostic Test 01 has completed normally.") targeting the support server 116 over the social networking platform. In this communication scenarios, the user is engaged in a group conversation involving at least the support server (identified as "Support"), the user him/herself (identified as "User"), and the peripheral device (identified as "Peripheral"). In such a communication scenario, when the support server receives the encoded instruction targeting itself, the support server also prepares an instant message based on the content of the encoded message, such that the instant message can be sent to the user via the social networking platform and displayed in a conversation log of the current chat session. The instant message will appear in the conversation log as an instant message from "Peripheral" to "Support".

In some embodiments, the flow of the message(s) is as follows:

(1) In a group chat session involving "Support," "User," and "Peripheral", the peripheral initiates an encoded message targeting the support server 116. The peripheral device sends the encoded message targeting the support server to the user device first.

(2) The user device receives the encoded message from the peripheral device, and forwards it to the communication server.

(3) The communication server receives the encoded message targeting the support server from the user device. The communication server forwards the encoded message to the support server.

(4) The support server receives the encoded message and acts accordingly (e.g., updates records, prepare a next instruction, or ignores it.). The support server also prepares a human-readable instant message based on the content of the encoded message. The human-readable instant message will be shown on the user device as a message originated from the peripheral device and targeting the support server". The support server transmits the instant message targeting the support server to the communication server.

(5) The communication server transmits the instant message targeting the support server to the user device.

(6) The user device receives the instant message targeting the support server and displays the instant message in a conversation log of the current chat session. The instant message is displayed as a message originating from "Peripheral" to "Support".

In some embodiments, the support server may communicate with the peripheral device independent of the user's participation. In such cases, no instant message needs to be prepared and sent to the user.

Figure 2R:
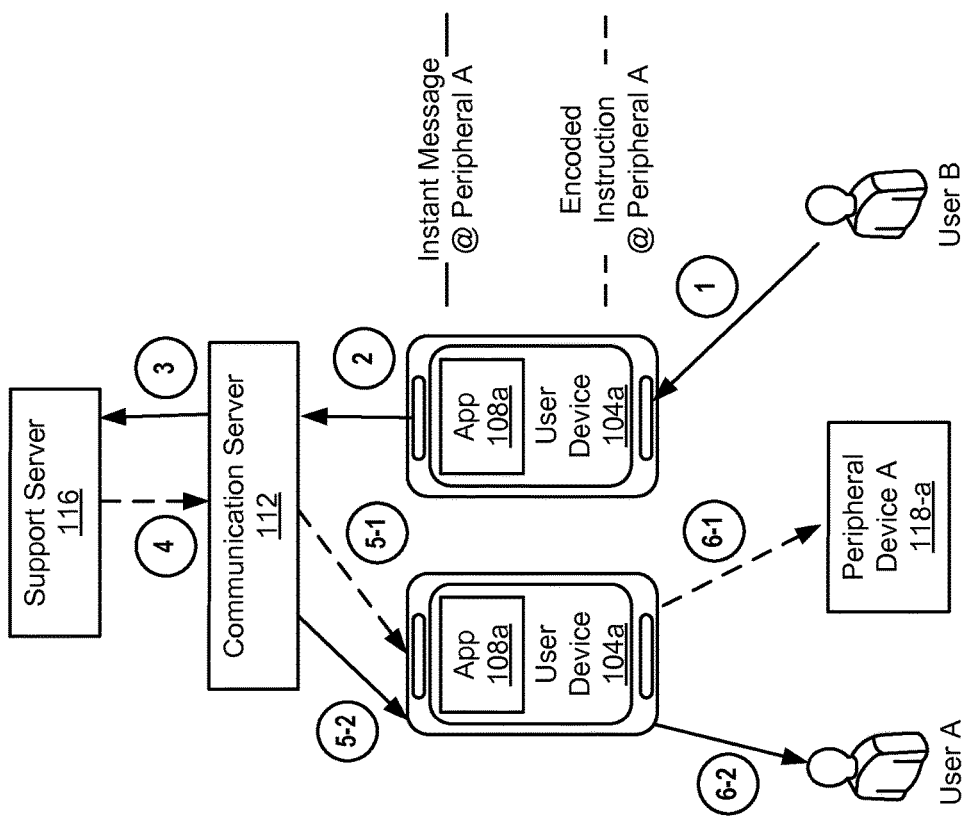
Figure 2Q:
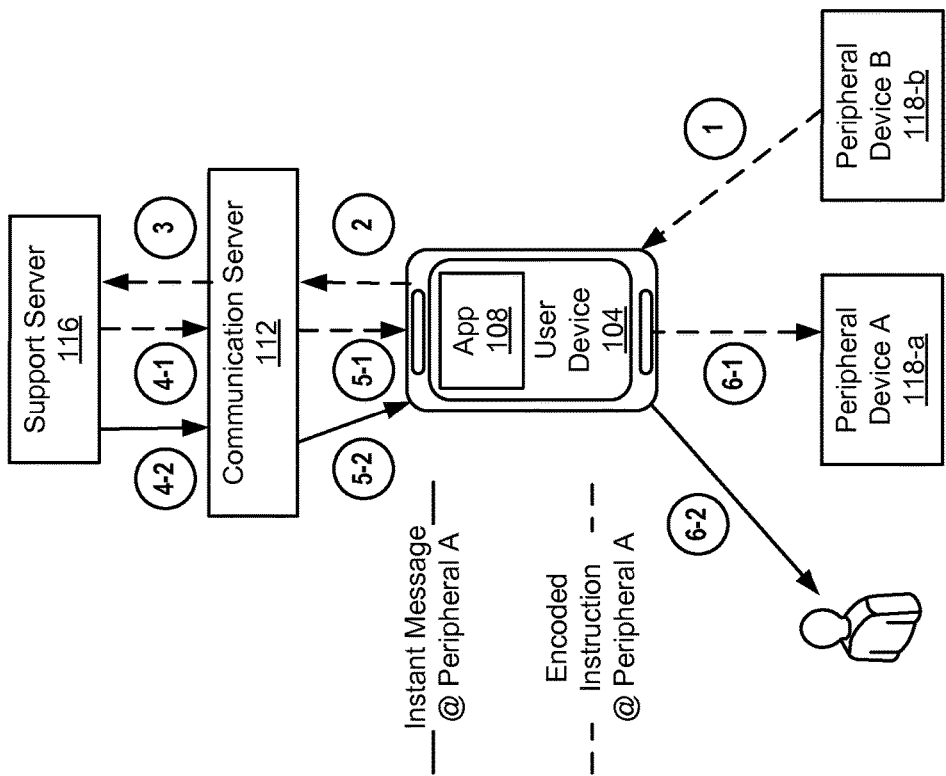

FIG. 2Q illustrates an exemplary communication scenario in which two or more peripheral devices (e.g., peripheral devices 118-*a* and 118-*b*) are connected to the user device 104. The peripheral device 118-*a* is registered under the user's account as "Peripheral A", and the peripheral device 118-*b* is registered under the user's account as "Peripheral B". The two peripheral devices may be of the same type, or different types. In this example, both peripheral devices have the same support server 116, e.g., since they have the same manufacturer or share the same or related native message formats. For example, peripheral device 118-*a* may be a climate control device, and the peripheral device 118-*b* may be an energy monitoring device made by the same manufacturer. In this example, peripheral device 118-*b* sends an encoded instruction to access or control peripheral device 118-*a* through the social networking platform. In this example, at least the user (identified as "User"), the peripheral device 118-*a* (identified as "Peripheral A"), and the peripheral device 118-*b* (identified as "Peripheral B") are involved in a group chat session. The peripheral device 118-*a* is also referred to as peripheral device A, and the peripheral device 118-*b* is also referred to as peripheral device B in this example.

In this example scenario, the flow of message(s) is as follows:

(1) Peripheral device B generates an encoded message (e.g., "QR0111032," meaning, "Energy use has reached a preset limit, initiate energy saving mode.") targeting peripheral device A. Peripheral device B transmits the encoded message targeting peripheral device A to the user device 104.

(2) The user device receives the encoded message targeting peripheral device A, and forwards it to the communication server 112.

(3) The communication server 112 receives the encoded message targeting peripheral device A, and forwards it to the support server 116.

(4) The support server receives the encoded message targeting peripheral device A, and translates the received encoded message to another encoded message targeting peripheral device A according to the format requirements of peripheral device A. This translation is not necessary if the source peripheral device (e.g., peripheral device B) and the target peripheral device (e.g., peripheral device A) use the same message format. The support server transmits (4-1) the translated encoded message targeting peripheral device A to the communication server. The support server also translates the received encoded message targeting peripheral device A to a human-readable instant message targeting peripheral device A. The support server also transmits (4-2) the translated instant message targeting the peripheral device A to the communication server.

(5) The communication server receives the encoded message targeting peripheral device A from the support server, and forwards (5-1) it to the user device. The communication server also receives the translated instant message targeting peripheral device A from the support server, and forwards (5-2) it to the user device.

(6) The user device receives the encoded message targeting peripheral device A, and sends (6-1) it to the peripheral device A. The peripheral device A then acts according to the received encoded message, e.g., changes to an energy saving mode. The user device also displays the instant message targeting the peripheral device A in the conversation log of the current chat session, where the instant message is displayed as a message from "Peripheral B" to "Peripheral A".

In some embodiments, the user may establish a control hierarchy of which registered peripheral device may control and/or access another registered peripheral device. In some embodiments, by including two or more registered peripheral devices in the same group chat session, the user is deemed to have provided permission that allows each peripheral device to communicate with each of the other peripheral devices in the same group chat. In some embodiments, a default control hierarchy is provided by the support server of the different types of peripheral devices that the support server supports.

FIG. 2R illustrates an exemplary communication scenario in which two or more users (e.g., with social network identities "User A" and "User B", respectively) are logged onto the same communication server through their respective user devices (e.g., user device 104a, also referred to as "user device A"; and user device 104b, also referred to as "user device B"). A peripheral device 118-a (also referred to as peripheral device A in this example) is registered under user A's account as "Peripheral A". In this example, at least "User A", "Peripheral A", and "User B" are involved in the same group chat session. In this example scenario, User B initiates an instant message (e.g., "Turn off game after 20 minutes.") to access and control peripheral device A (e.g., a gaming console) over the social networking platform. The instant message is translated into an encoded instruction for the peripheral device A by the support server, and the encoded instruction arrives at the peripheral device through the communication server and the user device A. The communication server also sends the original instant message to the user device as an instant message targeting the peripheral device A. The original instant message targeting the peripheral device A is displayed in the conversation log of the present chat session as a message from "User B" to "Peripheral A".

In this example scenario, the flow of message(s) is as follows:

(1) User B enters an instant message (e.g., "@Peripheral A: Exit game after 20 minutes.") targeting peripheral device A in a conversation interface of the group chat session displayed on user device B.

(2) The user device B transmits the instant message targeting peripheral device A to the communication server.

(3) The communication server receives the instant message targeting peripheral device A, and forwards it to the support server 116.

(4) The support server 116 receives the instant message targeting peripheral device A, and translates it to an encoded instruction targeting peripheral device A. The support server transmits the encoded instruction targeting peripheral device A to the communication server.

(5) The communication server receives the encoded message targeting peripheral device A, and forwards (5-1) it to the user device A. The communication server also forwards (5-2) the original instant message targeting peripheral device A to the user device A.

(6) The user device A receives the encoded message targeting peripheral device A, and sends (6-1) it to the peripheral device A. The peripheral device A then acts according to the received encoded message, e.g., exists the game after 20 minutes. The user device receives the original instant message targeting peripheral device A, and displays (6-2) the instant message targeting the peripheral device A in the conversation log of the current chat session, where the instant message is displayed as a message from "User B" to "Peripheral A".

In some embodiments, the user may share access and/or control of a subset or all functions of a peripheral device registered under his/her account. This share of control and/or access can be on a per-chat basis, or on an on-going basis. In some embodiments, by including another user in the same group chat session involving a registered peripheral device, the user is deemed to have provided permission that allows that other user to communicate with the peripheral device. This can be applicable in a parental control context, where User B is the controlling party of the peripheral device A.

Figure 2T:
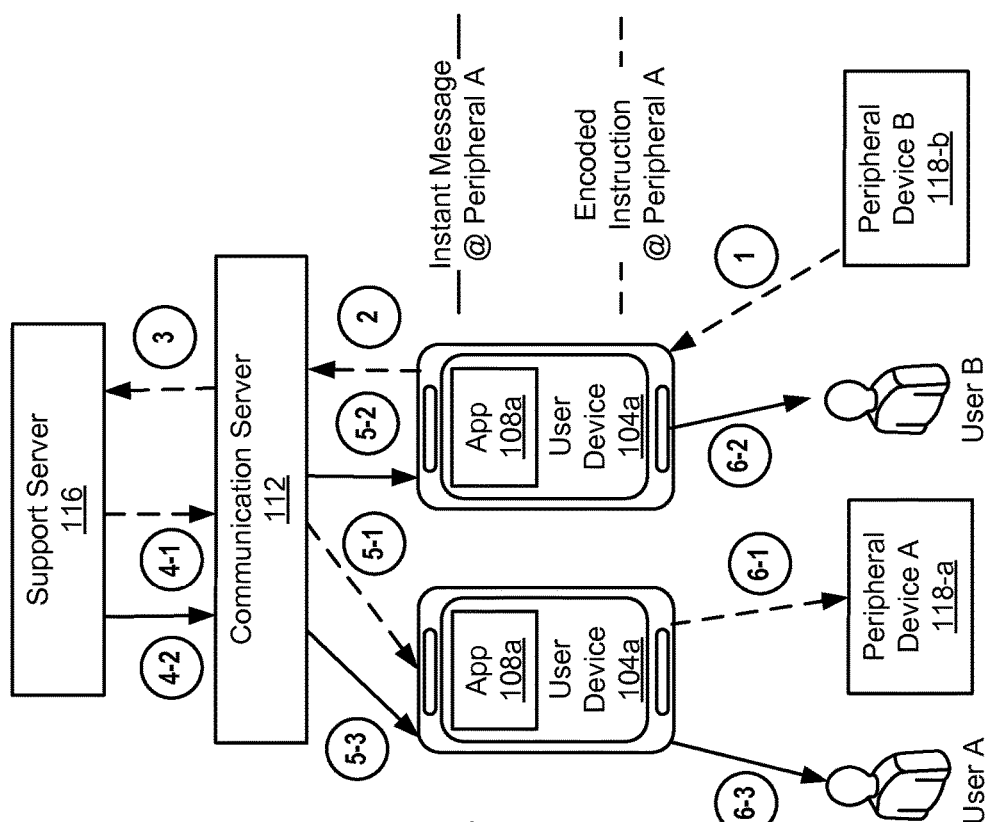
Figure 2S:
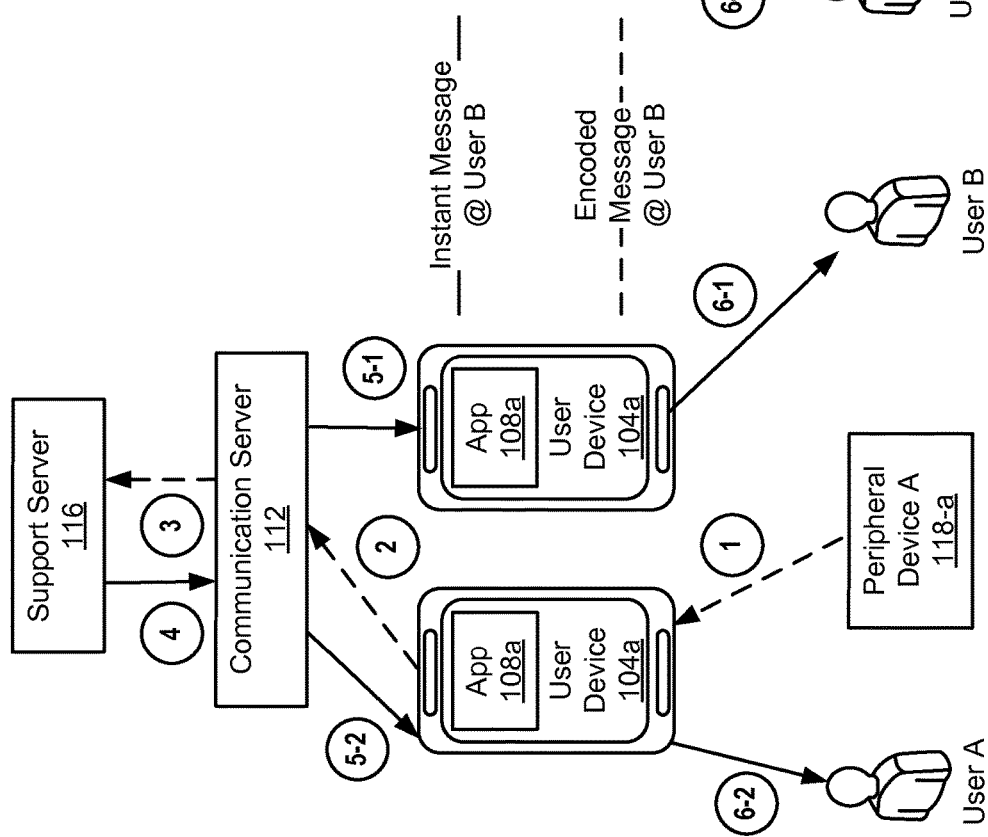

FIG. 2S illustrates an exemplary communication scenario in which two or more users (e.g., with social network identities "User A" and "User B", respectively) are logged onto the same communication server through their respective user devices (e.g., user device 104a, also referred to as "user device A"; and user device 104b, also referred to as "user device B"). A peripheral device 118-a (also referred to as peripheral device A in this example) is registered under user A's account as "Peripheral A". In this example, at least "User A", "Peripheral A", and "User B" are involved in the same group chat session. In this example scenario, Peripheral device A initiates an encoded message (e.g., "H120/L80/HR80/T97", meaning "Blood Pressure 120/80, Heart Rate 80 per minute, and Temperature 97 degrees Fahrenheit.") targeting user B in the group chat session. The encoded message is translated into a human-readable instant message targeting user B by the support server, and translated instant message arrives at the user devices A and B through the communication server. The translated instant message targeting the user B is displayed in the conversation log of the present chat session as a message from "Peripheral A" to "User B" (or a message from "Peripheral A" to the conversation group as a whole).

In this example scenario, the flow of message(s) is as follows:

(1) Peripheral device A generates an encoded message (e.g., "H120/L80/HR80/T97", meaning "Blood Pressure 120/80, Heart Rate 80 per minute, and Temperature 97 degrees Fahrenheit.") targeting user B (or the whole group). Peripheral device A transmits the encoded message to user device A.

(2) User device A transmits the encoded message targeting user B (or the whole group) to the communication server.

(3) The communication server receives the encoded message targeting user B (or the whole group), and forwards it to the support server 116.

(4) The support server 116 receives the encoded message targeting user B (or the whole group), and translates it to an instant message (e.g., "User A's blood Pressure is 120/80, heart rate is 80 per minute, and body temperature is 97 degrees Fahrenheit.") targeting user B (or the whole group).

The support server transmits the translated instant message targeting user B (or the whole group) to the communication server.

(5) The communication server receives the instant message targeting user B (or the whole group), and forwards (5-1) it to the user device A. The communication server also forwards (5-2) the instant message targeting user B (or the whole group) to the user device B.

(6) The user device A receives the instant message targeting user B (or the whole group), and displays (6-1) it to user A in the conversation log of the current chat session, where the instant message is displayed as a message from "Peripheral A" to "User B" (or the whole group). The user device B receives the instant message targeting user B (or the whole group), and displays (6-2) it to user B in the conversation log of the current chat session, where the instant message is displayed as a message from "Peripheral A" to "User B" (or the whole group).

FIG. 2T illustrates an exemplary communication scenario in which two or more users (e.g., with social network identities "User A" and "User B", respectively) are logged onto the same communication server through their respective user devices (e.g., user device 104a, also referred to as "user device A"; and user device 104b, also referred to as "user device B"). A peripheral device 118-a (also referred to as peripheral device A in this example) is registered under user A's account as "Peripheral A". A peripheral device 118-b (also referred to as peripheral device B in this example) is registered under user B's account as "Peripheral B". In this example, at least "User A", "Peripheral A", "User B", and "Peripheral B" are involved in the same group chat session. In this example scenario, Peripheral device B initiates an encoded message (e.g., "@Peripheral A: XT1", meaning "@Peripheral A: Bedroom light is on; Turn off down-stair heater.") targeting peripheral device A in the group chat session. The encoded message is translated into a human-readable instant message targeting Peripheral A by the support server, and the translated instant message arrives at user device A and user device B through the communication server. The translated instant message targeting peripheral device A is displayed at both user device A and user device B, e.g., in the conversation log of the present chat session, as a message from "Peripheral B" to "Peripheral A". The support server also translates the original encoded message targeting peripheral device A to a translated encoded message in a format that is acceptable to peripheral device A. The translated encoded message targeting peripheral device A arrives at the peripheral device A through the communication server and the user device A.

In this example scenario, the flow of message(s) is as follows:

(1) Peripheral device B generates an encoded message (e.g., "@Peripheral A: XT1", meaning "@Peripheral A: Bedroom light is on; Turn off down-stair heater") targeting peripheral device A. Peripheral device B transmits the encoded message to user device B.

(2) User device B transmits the encoded message targeting peripheral device A to the communication server.

(3) The communication server receives the encoded message targeting Peripheral A, and forwards it to the support server 116.

(4) The support server 116 receives the encoded message targeting Peripheral A, and translates it to an encoded message targeting peripheral device A in a format acceptable to peripheral device A. The support server 116 transmits (4-1) the translated encoded message targeting peripheral device A to the communication server. The support server also translates the original encoded message targeting peripheral device A to an instant message (e.g., "@Peripheral A: Bedroom light is on; Turn off down-stair heater") targeting peripheral device A. The support server transmits (4-2) the translated instant message targeting peripheral device A to the communication server.

(5) The communication server receives the instant message targeting peripheral device A and the translated encoded message targeting peripheral device A. The communication server forwards (5-1) the translated encoded message targeting peripheral device A to user device A. The communication server also forwards (5-2) the translated instant message targeting peripheral device A to user device B. The communication server also forwards (5-3) the translated instant message targeting peripheral device A to the user device A.

(6) The user device A receives the translated encoded message targeting peripheral device A, and sends (6-1) it to the peripheral device A. The user device A also receives the translated instant message targeting peripheral device A, and displays (6-3) it to user A in the conversation log of the current chat session, where the instant message is displayed as a message from "Peripheral B" to "Peripheral A". The user device B also receives the instant message targeting peripheral device A, and displays (6-2) it to user B in the conversation log of the current chat session, where the instant message is displayed as a message from "Peripheral B" to "Peripheral A".

Other variations of the communication configurations are possible, and may be derived from the examples shown herein.

Figure 3A:
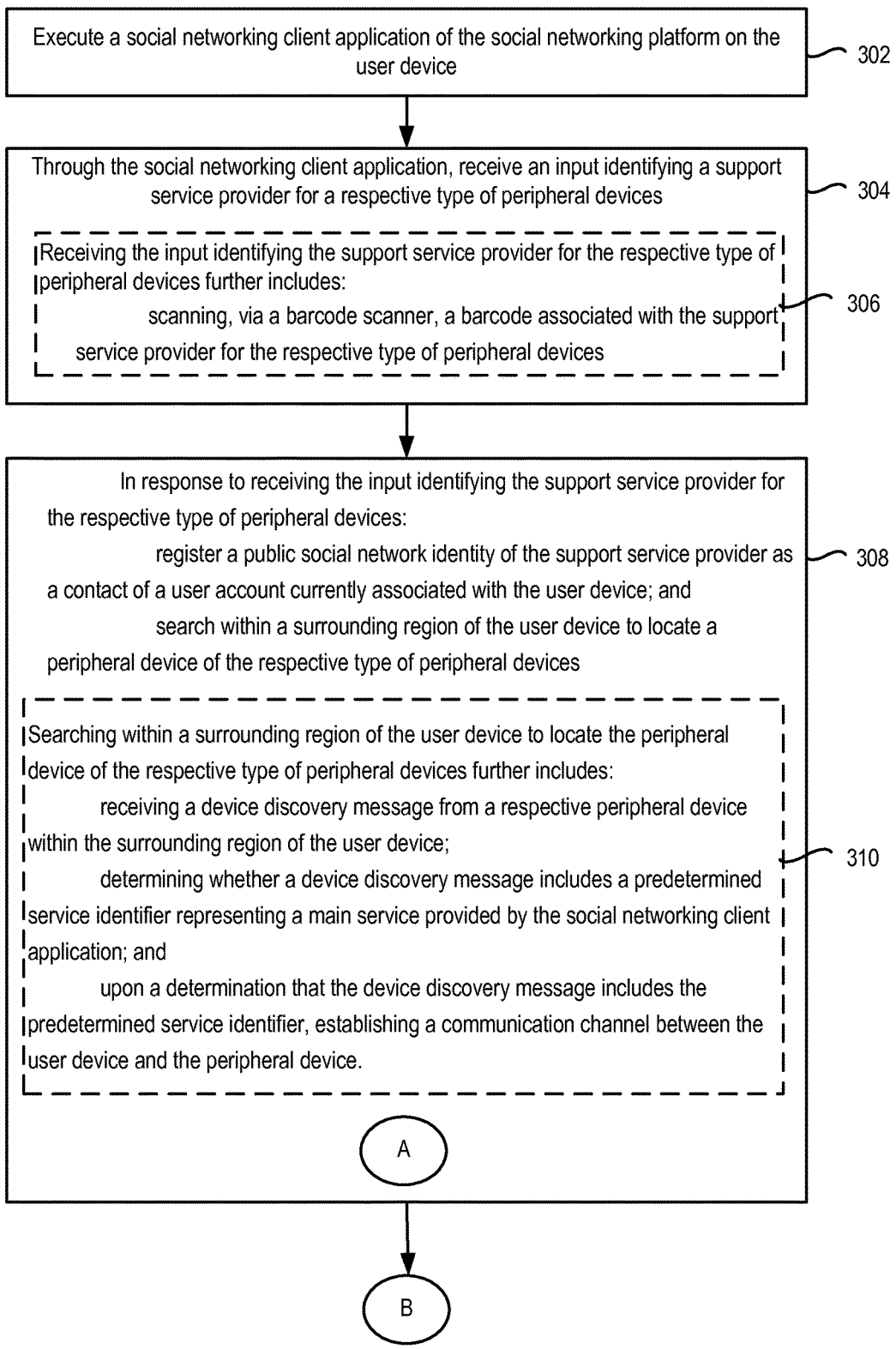
FIGS. 3A-3C are flow charts for an exemplary process for setting up access and control of a peripheral device over a social networking platform in accordance with some embodiments.
Figure 3B:
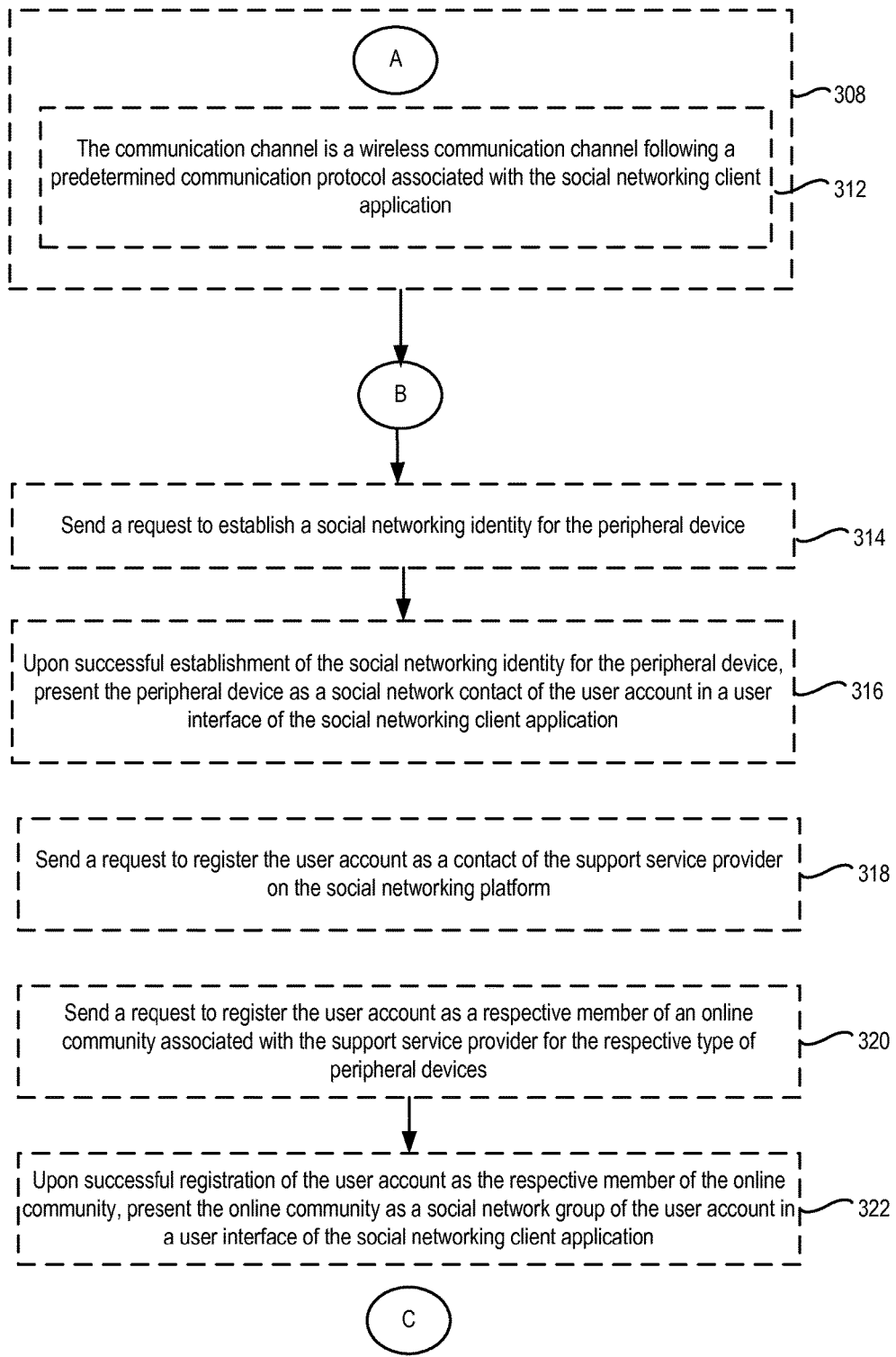
Figure 3C:
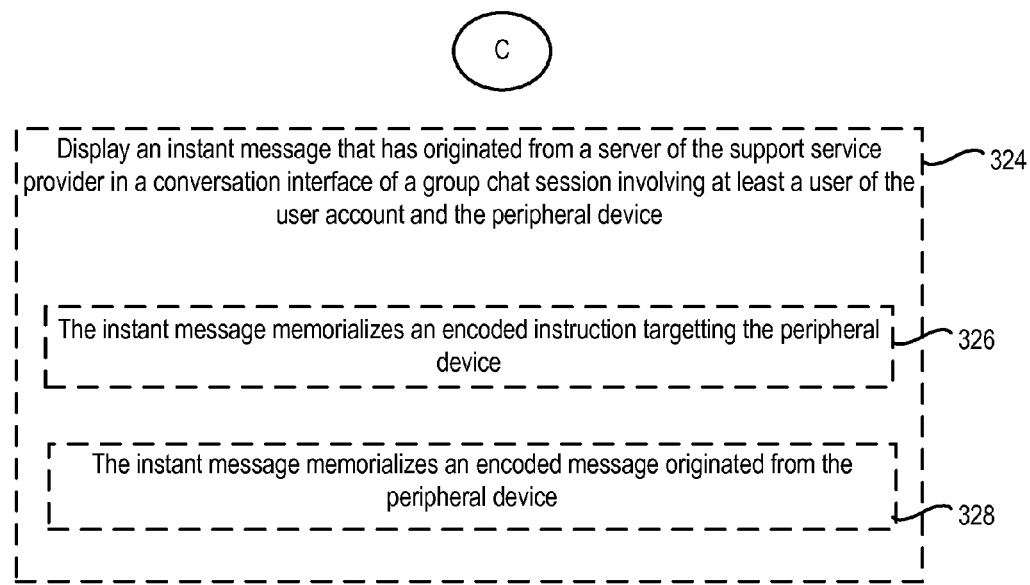

FIGS. 3A-3C are flow charts for an exemplary process 300 for setting up control of a peripheral device (e.g., peripheral device 200) over a social networking platform in accordance with some embodiments. The exemplary process 300 is performed on a user device (e.g., user devices 118 or 202) that to be connected to the peripheral device through a social networking client application operating under a user's user account on the social networking platform. Various aspects of the process 300 are illustrated in FIGS. 1B and 2A-2T and accompanying descriptions.

In at least some embodiments, the method is performed by a user device (e.g., user device 104 or 202) with one or more processors and memory, or one or more components of the electronic device (e.g., social networking client application 108 in FIG. 1B). In some embodiments, the method is governed by instructions that are stored in a non-transitory computer readable storage medium and that are executed by one or more processors of an electronic device (e.g., processor(s) of the user device 104).

In some embodiments, at the user device having one or more processors and memory: the user device executes (302) a social networking client application of the social networking platform. The social networking client application communicates with a communication server of the social networking platform to provide communication functions (e.g., log-in, user registration, establishing contact relationships, creating and joining groups, following others, publishing messages to followers, create one-to-one or group chat sessions, send and receive messages in various formats, control and access registered peripheral devices through chat messages or customized controls, etc.) available to users of the social networking platform.

In some embodiments, the user device, through the social networking client application, receives (304) an input identifying a support service provider for a respective type of peripheral devices. For example, in some embodiments, receiving the input identifying the support service provider for the respective type of peripheral devices further includes (306): scanning, via a barcode scanner, a barcode associated with the support service provider for the respective type of peripheral devices. This is illustrated in FIGS. 2A-2D and accompanying descriptions. In some embodiments, the user optionally manually enters the unique device identifier (e.g., a serial number for the device) of the peripheral device or its support service provider as a text input.

In some embodiments, the user device, in response to receiving the input identifying the support service provider for the respective type of peripheral devices performs (308) the following operations: registering a public social network identity of the support service provider as a contact of a user account currently associated with the user device; and searching within a surrounding region of the user device to locate a peripheral device of the respective type of peripheral device. In some embodiments, when the input containing the information for identifying the support service provider of the peripheral device is provided to the user device, the user device sends the information to the communication server, and the communication server identifies the support server for the peripheral device, and establishes a social network identity for the support server. In some embodiments, the social network identity of the equipment may have already been established at the communication server by other users at this time, and the communication server merely associates the present peripheral device to the social network identity of the support server. In some embodiments, a separate instance of the support server is spawn to serve the particular peripheral device, and the separate instance is assigned a respective unique social network identity. The communication server registers the public social network identity of the support service provider as a contact of a user account currently associated with the user device and the peripheral device. The communication server provides the name of the social network contact for the support service provider to the user device, which in turns displays it to the user. This is illustrated in FIG. 2E (e.g., the social network contact 210 "Q-Support" is a social network identity assigned to the support server of the peripheral device Q-Band). In some embodiments, the user specifically requests to add the support server as a social network contact, and the user device forwards the request to the communication server. In some embodiments, the user device also sends (318) a request to register the user account as a contact of the support service provider on the social networking platform. For example, on the side of the support server providing the support service for the peripheral device, the contact list of the support server will also include the social network identities of the user and the peripheral device.

In some embodiments, the scan for the peripheral device is performed using a special protocol that indicates to the user device that a peripheral device is configured to allow access and control over the social network platform. For example, the if the connection is to be established via a Bluetooth protocol, in the device discovery message, the peripheral device broadcast a predefined main service identifier (UUID) of the social networking client application, such that the social networking client application executing on the user device can recognize the peripheral device as a compatible device when it receives the device discovery message from the peripheral device. More details of the connection protocol (Bluetooth™ or Bluetooth Low Energy™) and other wired or wireless protocols are described later in the present disclosure.

In some embodiments, searching within a surrounding region of the user device to locate the peripheral device of the respective type of peripheral device further includes (310): receiving a device discovery message from a respective peripheral device within the surrounding region of the user device; determining whether a device discovery message includes a predetermined service identifier representing a main service provided by the social networking client application; and upon a determination that the device discovery message includes the predetermined service identifier, establishing a communication channel between the user device and the peripheral device. This is illustrated in FIG. 2F and accompanying descriptions. In some embodiments, the communication channel is a wireless communication channel following predetermined communication protocol associated with the social networking client application (e.g., a classic Bluetooth or BLE protocol modified according to the disclosure presented herein).

In some embodiments, the user device send (314) a request to establish a social network identity for the peripheral device. For example, in some embodiments, once the user device has found the peripheral device that has been bound to the user account active on the user device, the user device sends a request to the communication server to obtain a respective social networking identity for the peripheral device. In some embodiments, once the user device has successfully bound the peripheral device to the user account active on the user device, the user device sends a request to the communication server to obtain a respective social networking identity for the peripheral device. In some embodiments, the respective social networking identity for the peripheral device is the same as the unique instance of the support server that has been spawned for the peripheral device. In some embodiments, upon successful establishment of the social networking identity for the peripheral device, the user device presents the peripheral device as a social network contact of the user account in a user interface of the social networking client application. This is illustrated in FIG. 2E and accompanying descriptions.

In some embodiments, the user device sends (320) a request to register the user account as a respective member of an online community associated with the support service provider for the respective type of peripheral device. In some embodiments, upon successful registration of the user account as the respective member of the online community, the user device presents the online community as a social network group of the user account in a user interface of the social networking client application. For example, in some embodiments, the support server of the peripheral device establishes an online community to include many users that own the type of peripheral devices the support server supports. Within this online community, the support server can broadcast notifications, messages, tips, etc. to each user that has agreed to join the online community (e.g., chose to "follow" the public social network identity of the support server for the type of peripheral devices it supports). In addition, in some embodiments, the members of the online community can also post and receive messages from one another or the whole online community. In some embodiments, the online community optionally includes the respective social networking identities of the registered peripheral devices that the support server supports, such that the user optionally allows others to access and control their own peripheral devices according to the embodiments described herein.

In some embodiments, the user device displays (324) an instant message that has originated from the a server of the support service provider in a conversation interface of a group chat session involving at least a user of the user account and the peripheral device. In some embodiments, the instant message memorializes an encoded instruction targeting the peripheral device. In some embodiments, the instant message appears as a message originated from the public social network identity of the support server in the conversation interface, such as "An instruction for resetting your B-Band has been sent to Q-Band" or "@Q-Band, Reset the system". In some embodiments, the instant message appears as a message originated from a second peripheral device different from the peripheral device in the conversation interface. In some embodiments, the instant message memorializes an encoded message originated from the peripheral device. In some embodiments, the instant message appears in the conversation interface as a message originated from the social network identity of the peripheral device, and targeting the public social network identity of the support service provider. In some embodiments, the instant message appears in the conversation interface as a message originated from the social network identity of the peripheral device, and targeting the respective social network identity of the user account. In some embodiments, the instant message appears in the conversation interface as a message originated from the social network identity of the peripheral device, and targeting a respective social network identity of second peripheral device different from the peripheral device.

The features and steps of this exemplary process may be combined with the features and steps described in other parts of the present disclosure, and these other features and steps are not repeated here for purposes of brevity.

Figure 3D:
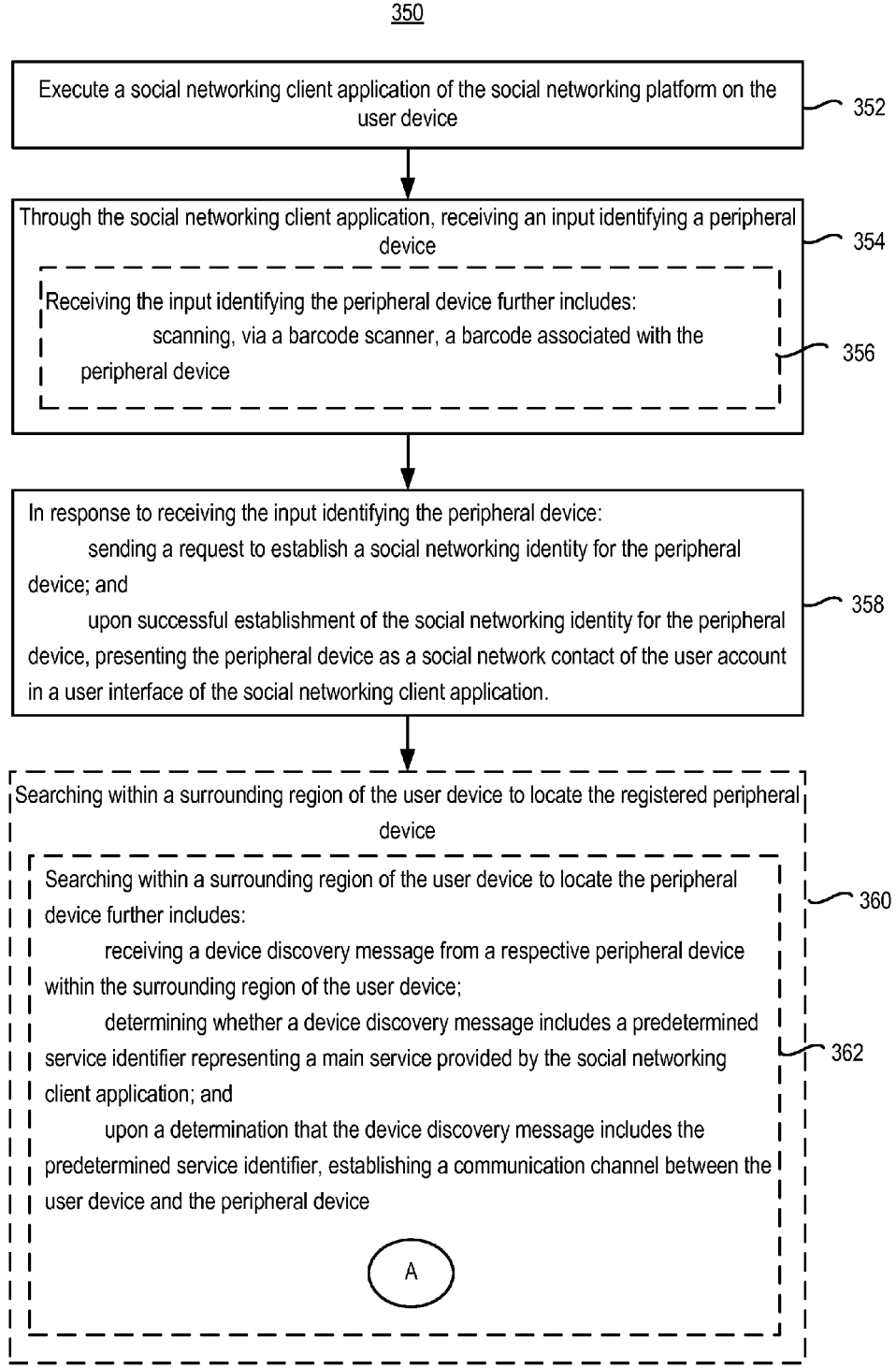
FIGS. 3D-3E are flow charts for an exemplary process for setting up access and control for a peripheral device over a social networking platform in accordance with some embodiments.
Figure 3E:
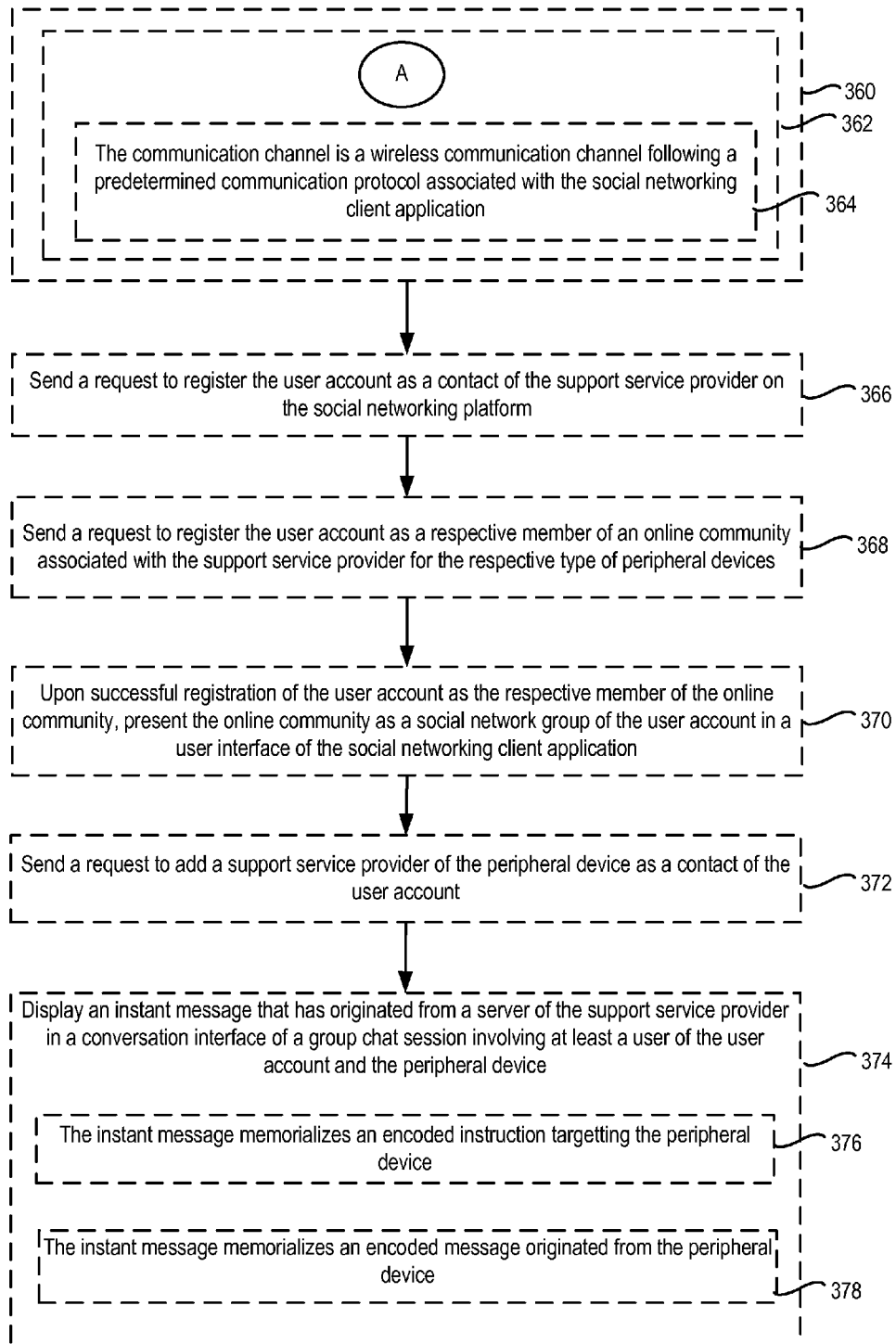

FIGS. 3D-3E are flow charts for an exemplary process 350 for setting up access and control of a peripheral device (e.g., peripheral device 200) in accordance with some embodiments. The exemplary process 350 is performed on a user device (e.g., user devices 118 or 202) that to be connected to the peripheral device through a social networking client application operating under a user's user account on the social networking platform. Various aspects of the process 300 are illustrated in FIGS. 1B and 2A-2T and accompanying descriptions. In the process 350, the input identifying the peripheral device (e.g., scanning a bar code of the peripheral device) causes the user device to request a social network identity for the peripheral device, in dependent of the social network identity of a support server for the peripheral device. In some embodiments, both the social network identity of the peripheral device and the social network identity of the support server are automatically added to the user's contact list. In some embodiments, the input identifying the peripheral device only causes the peripheral device to be added as a contact of the user account, and the user can manually add the support server as a contact. In some embodiments, the support server does not provide a public social network identity that users can follow, instead, the support server may send communications to the user through the social network identity of the peripheral device that it supports.

In at least some embodiments, the method is performed by a user device (e.g., user device 104 or 202) with one or more processors and memory, or one or more components of the electronic device (e.g., social networking client application 108 in FIG. 1B). In some embodiments, the method is governed by instructions that are stored in a non-transitory computer readable storage medium and that are executed by one or more processors of an electronic device (e.g., processor(s) of the user device 104).

In some embodiments, at a user device having one or more processors and memory: the user device executes (352) a social networking client application of the social networking platform on the user device. The social networking client application communicates with a communication server of the social networking platform to provide communication functions (e.g., log-in, user registration, establishing contact relationships, creating and joining groups, following others, publishing messages to followers, create one-to-one or group chat sessions, send and receive messages in various formats, control and access registered peripheral devices through chat messages or customized controls, etc.) available to users of the social networking platform.

In some embodiments, the user device, through the social networking client application, receives (354) an input identifying a peripheral device. In some embodiments, receiving the input identifying the peripheral device further includes (356) scanning, via a barcode scanner, a barcode associated with the peripheral device. This is illustrated in FIGS. 2A-2D and accompanying descriptions. In some embodiments, the user optionally manually enters the unique device identifier (e.g., a serial number for the device) of the peripheral device as a text input.

In some embodiments, the user device, in response to receiving the input identifying the peripheral device, performs (358) the following operations: sending a request to establish a social networking identity for the peripheral device; and upon successful establishment of the social networking identity for the peripheral device, presenting the peripheral device as a social network contact of the user account in a user interface of the social networking client application. This is illustrated in FIGS. 2A-2E. In some embodiments, the user device send (314) a request to establish a social network identity for the peripheral device.

In some embodiments, the user searches (360) within a surrounding region of the user device to locate the registered peripheral device. In some embodiments, searching within a surrounding region of the user device to locate the peripheral device further includes (362): receiving a device discovery message from a respective peripheral device within the surrounding region of the user device; determining whether a device discovery message includes a predetermined service identifier representing a main service provided by the social networking client application; and upon a determination that the device discovery message includes the predetermined service identifier, establishing a communication channel between the user device and the peripheral device. This is illustrated in FIG. 2F and accompanying descriptions. In some embodiments, the communication channel is (368) a wireless communication channel following a predetermined communication protocol associated with the social networking client application (e.g., a classic Bluetooth or BLE protocol modified according to the disclosure presented herein).

In some embodiments, the user device sends (366) a request to register the user account as a contact of a support service provider of the peripheral device on the social networking platform. In some embodiments, the user device sends (368) a request to register the user account as a respective member of an online community associated with a support service provider for the peripheral device. In some embodiments, upon successful registration of the user account as the respective member of the online community, the user device presents (370) the online community as a social network group of the user account in a user interface of the social networking client application. In some embodiments, the user device sends (372) a request to add a support service provider of the peripheral device as a contact of the user account. For example, in some embodiments, the support server of the peripheral device establishes an online community to include many users that own the type of peripheral devices the support server supports. Within this online community, the support server can broadcast notifications, messages, tips, etc. to each user that has agreed to join the online community (e.g., chose to "follow" the public social network identity of the support server for the type of peripheral devices it supports). In addition, in some embodiments, the members of the online community can also post and receive messages from one another or the whole online community. In some embodiments, the online community optionally includes the respective social networking identities of the registered peripheral devices that the support server supports, such that the user optionally allows others to access and control their own peripheral devices according to the embodiments described herein.

In some embodiments, the user device displays (374) an instant message that has originated from the a server of the support service provider in a conversation interface of a group chat session involving at least a user of the user account and the peripheral device. In some embodiments, the instant message memorializes (376) an encoded instruction targeting the peripheral device. In some embodiments, the instant message appears as a message originated from a public social network identity of the support service provider in the conversation interface. In some embodiments, the instant message appears as a message originated from a second peripheral device different from the peripheral device in the conversation interface. In some embodiments, the instant message memorializes (378) an encoded message originated from the peripheral device. In some embodiments, the instant message appears in the conversation interface as a message originated from the social network identity of the peripheral device, and targeting a public social network identity of the support service provider. In some embodiments, the instant message appears in the conversation interface as a message originated from the social network identity of the peripheral device, and targeting the respective social network identity of the user account. In some embodiments, the instant message appears in the conversation interface as a message originated from the social network identity of the peripheral device, and targeting a respective social network identity of second peripheral device different from the peripheral device.

The features and steps of this exemplary process may be combined with the features and steps described in other parts of the present disclosure, and these other features and steps are not repeated here for purposes of brevity.

FIGS. 4A-4D are flow charts for an exemplary process 400 for providing access and control of a peripheral device through a support service provider (e.g., an support server of the support service provider) thereof over a social networking platform in accordance with some embodiments.

In at least some embodiments, the method is performed by a communication server (e.g., a communication server 112*b* of the social networking platform in FIG. 1B) with one or more processors and memory, or one or more components of the electronic device (e.g., a social networking server application module). In some embodiments, the method is governed by instructions that are stored in a non-transitory computer readable storage medium and that are executed by one or more processors of an electronic device (e.g., processor(s) of the communication server 112*b*).

Figure 4A:
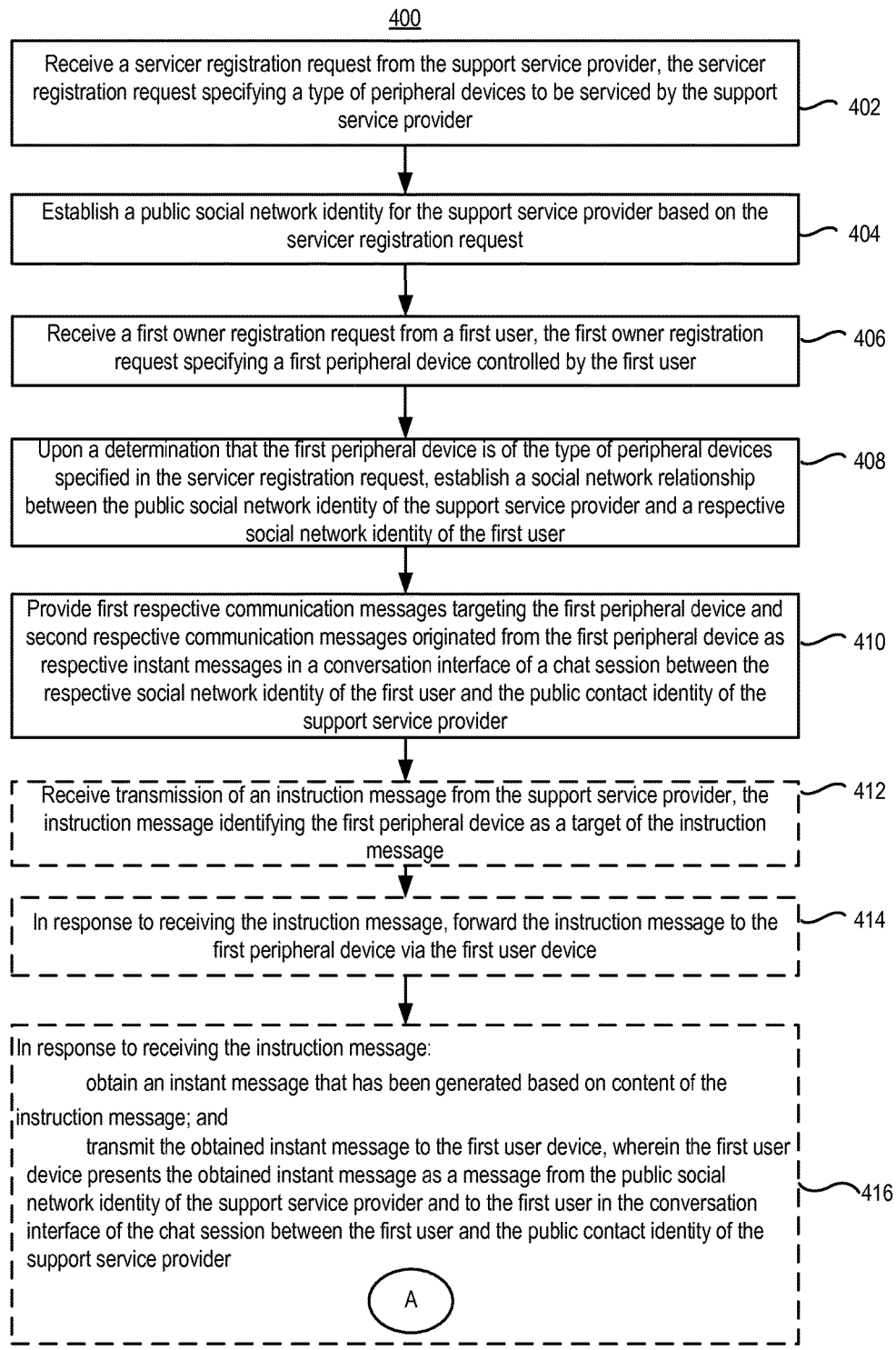
FIGS. 4A-4D are flow charts for an exemplary process for providing access and control of a peripheral device through a support service provider thereof over a social networking platform in accordance with some embodiments.
Figure 4B:
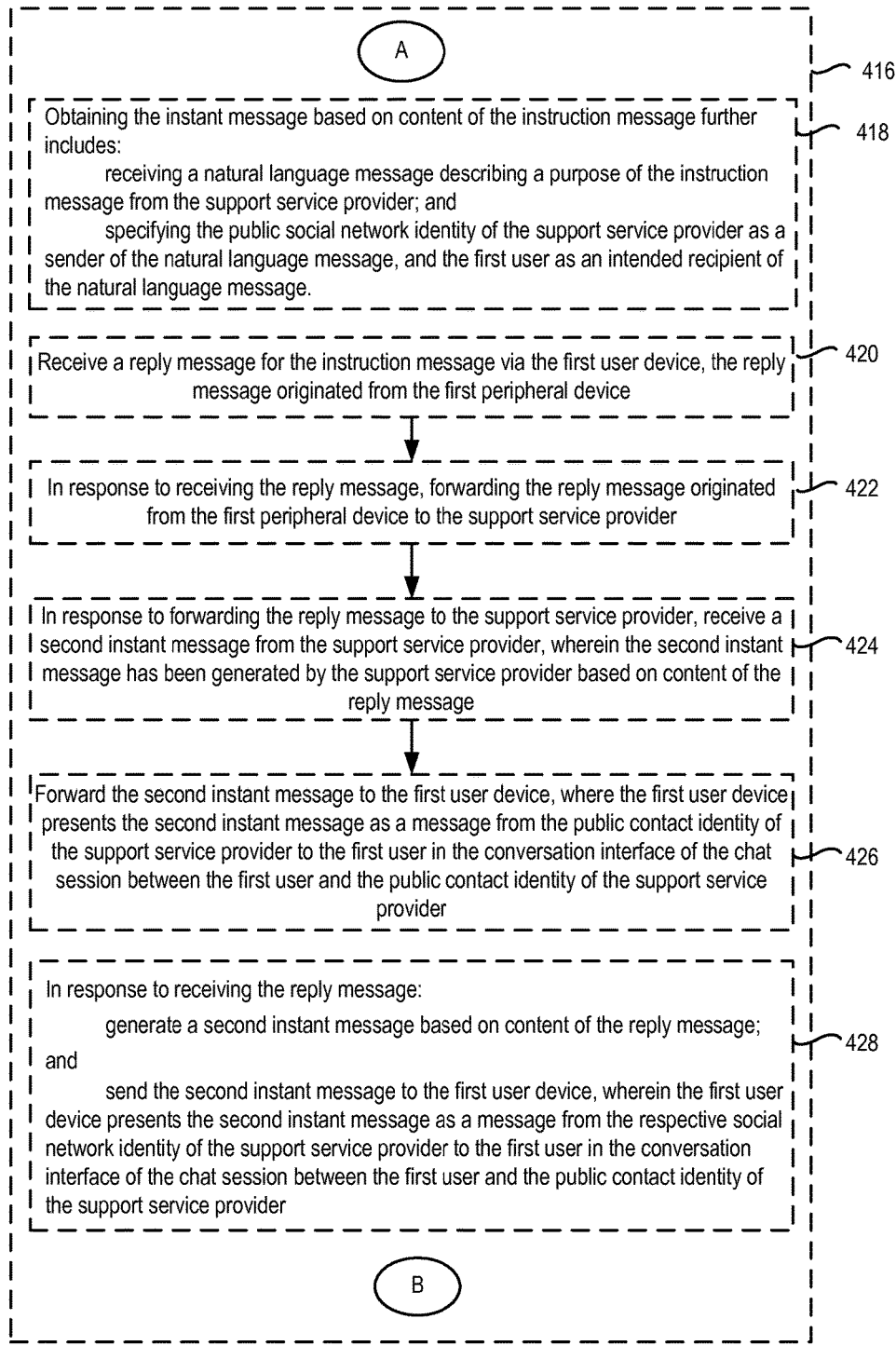
Figure 4C:
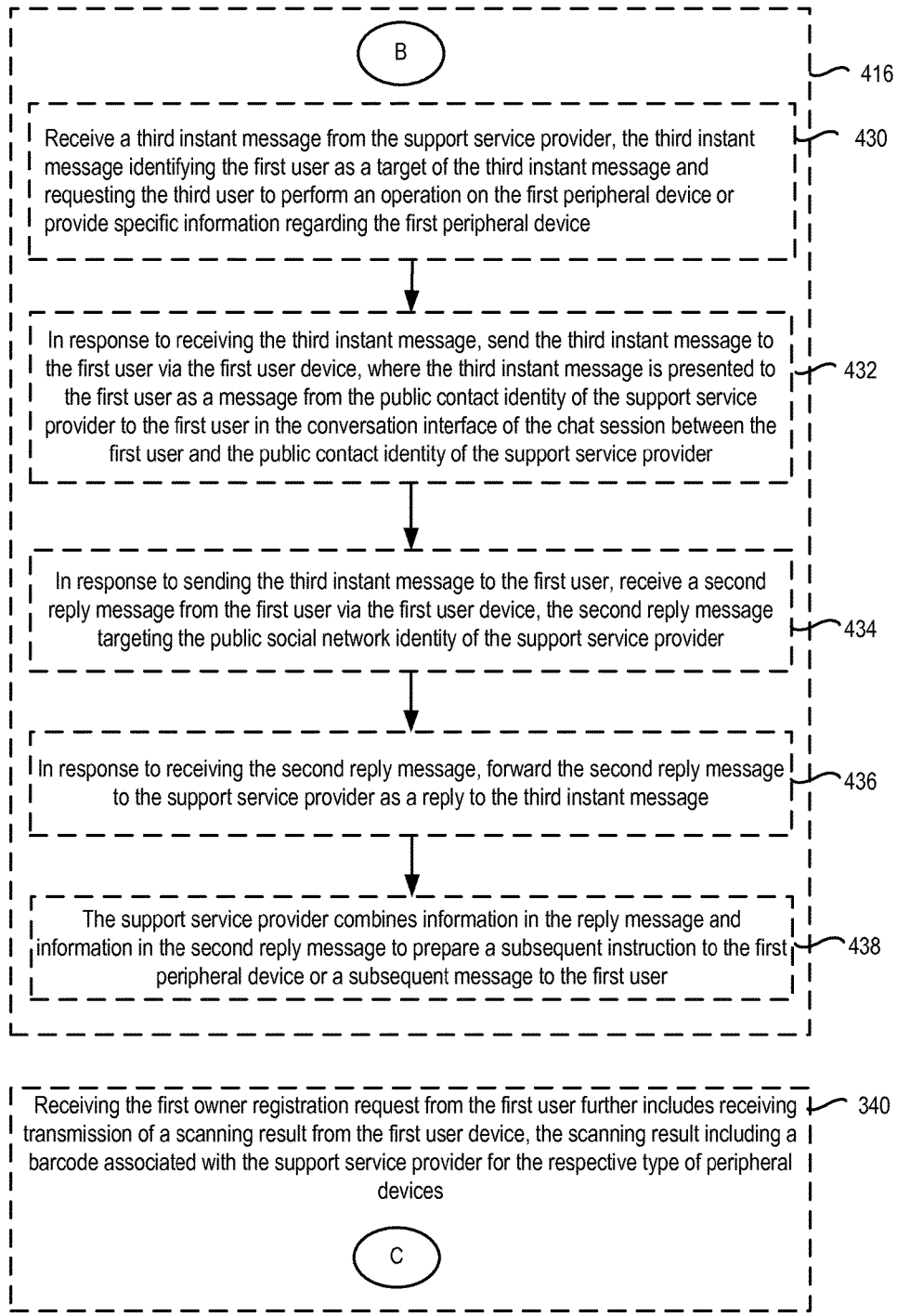
Figure 4D:
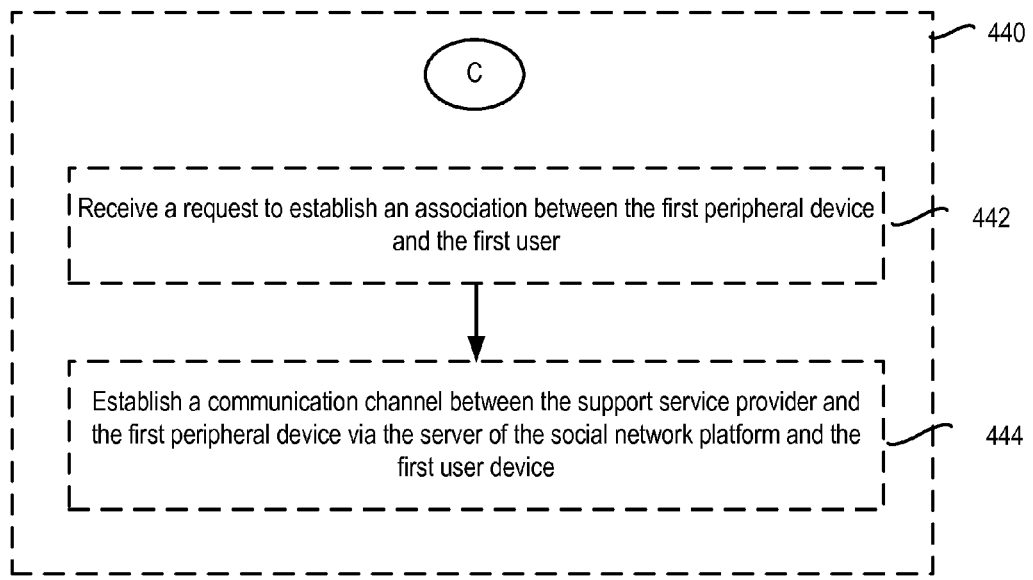

As shown in FIG. 4A, in some embodiments, the communication server (402) receives a servicer registration request from the support service provider, the servicer registration request specifying a type of peripheral devices to be serviced by the support service provider. In response to the servicer registration request, the communication server establishes (404) a public social network identity for the support service provider based on the servicer registration request. For example, the servicer registration can be performed before the manufacturer of the type of peripheral device releases the type of peripheral device for public sale. The servicer registration request can be part of the account registration process shown in FIG. 2I, in some embodiments.

The communication server receives (406) a first owner registration request from a first user, the first owner registration request specifying a first peripheral device controlled by the first user. For example, this is illustrated in a device binding process shown in FIGS. 2A-2H and 2J, and accompanying descriptions. In some embodiments, upon a determination that the first peripheral device is of the type of peripheral devices specified in the servicer registration request, the communication server establishes (408) a social network relationship between the public social network identity of the support service provider and a respective social network identity of the first user. For example, the communication server associates the social network identities of the support server for the type of peripheral device, the peripheral device, and the first user as social network contacts of one another, and notifies each regarding the association. In some embodiments, the communication server provides (410) first respective communication messages targeting the first peripheral device and second respective communication messages originated from the first peripheral device as respective instant messages in a conversation interface of a chat session between the respective social network identity of the first user and the public contact identity of the support service provider. For example, example communication scenarios are provided in FIGS. 2K-2T and accompanying descriptions.

In some embodiments, the communication server receives (412) an instruction message from the support service provider, the instruction message identifying the first peripheral device as a target of the instruction message. In response to receiving the instruction message, the communication server forwards the instruction message to the first peripheral device via the first user device. The instruction message can be a direct encoded instruction generated by the support server or a translation of another instruction (e.g., an instruction from a user, another peripheral device) targeting the peripheral device.

In some embodiments, in response to receiving the instruction message, the communication server obtains (416) an instant message that has been generated based on content of the instruction message, and sends the instant message to the first user device, wherein the first user device presents the instant message as a message from the public contact identity of the support service provider to the first user in the conversation interface of the chat session between the first user and the public contact identity of the support service provider. For example, the support server "Q-Support" can generated an encoded instruction for the peripheral device "Q-Band", the encoded instruction is forwarded to the peripheral device via the communication server and the user device coupled to the peripheral device. In addition, the communication server obtains a human-readable instant message (e.g., either by receiving it from the support server, or generate it locally) that corresponds to the content of the instruction from the support server.

In some embodiments, obtaining the instant message based on content of the instruction message further includes (418): receiving a natural language message describing a purpose of the instruction message from the support service provider; and specifying the public social network identity of the support service provider as a sender of the natural language message, and the first user as an intended recipient of the natural language message.

In some embodiments, the communication serve receives (420) a reply message for the instruction message via the first user device, the reply message originated from the first peripheral device; and in response to receiving the reply message, the communication server forwards (422) the reply message originated from the first peripheral device to the support service provider. For example, after the support server sends an encoded instruction to the peripheral device, the peripheral device can provide an encoded reply. For example, if the encoded instruction is for the peripheral device to generate some output data, the encoded reply can include the output data that has been generated by the peripheral device after receiving the encoded instruction. In some embodiments, in response to forwarding the reply message to the support service provider, the communication server receives (424) a second instant message from the support service provider, wherein the second instant message has been generated by the support service provider based on content of the reply message. For example, the support server receiving the encoded message containing the requested output data translates it into human-readable form for later presentation to the user. The communication server forwards (426) the second instant message to the first user device, wherein the first user device presents the second instant message as a message from the public contact identity of the support service provider to the first user in the conversation interface of the chat session between the first user and the public contact identity of the support service provider.

For example, the steps of 412-426 can occur in a communication scenario in which the Q-Support sends an instruction to the Q-Band for outputting the user "Red207"'s health data for today, and the Q-Band responds by sending the health data to the Q-Support. Both the instruction and the response containing the health data are transmitted through the user device and the communication server in a format agreed upon by the support server Q-Support and the peripheral device Q-Band. The support server helps the communication server to prepare the translation of the encoded instruction and response, such that the communication between the support server and the peripheral device can be presented in the conversation log as human-readable instant messages in a chat session between at least Q-Support and Q-Band.

In some embodiments, the communication server does not use the support server to provide the translation of the encoded messages and instructions. Instead, for at least some simply and/or common instructions and messages, the communication server performs the translation locally. In some embodiments, in response to receiving the reply message: the communication server generates (428) a second instant message based on content of the reply message; and sends the second instant message to the first user device, wherein the first user device presents the second instant message as a message from the respective social network identity of the support service provider to the first user in the conversation interface of the chat session between the first user and the public contact identity of the support service provider.

In some embodiments, the communication server receives (430) a third instant message from the support service provider, the third instant message identifying the first user as a target of the third instant message and requesting the third user to perform an operation on the first peripheral device or provide specific information regarding the first peripheral device. In response to receiving the third instant message, the communication server sends (432) the third instant message to the first user via the first user device, where the third instant message is presented to the first user as a message from the public contact identity of the support service provider to the first user in the conversation interface of the chat session between the first user and the public contact identity of the support service provider. For example, the Q-Support can send an instant message ("@Red207: Press and hold both buttons on the Q-Band until it beeps.") to the user asking the user to perform a physical operation on the Q-Band, and report back the result of the operation.

In some embodiments, in response to sending the third instant message to the first user, the communication server receives (434) a second reply message from the first user via the first user device, the second reply message targeting the public social network identity of the support service provider. For example, after the user Red207 has performed the operation requested in the third instant message from Q-Support, the user can send a reply instant message to Q-Support saying "I pressed the buttons for 30 seconds, and Q-Band did not beep, but flashed blue light." In some embodiments, the communication server, in response to receiving the second reply message, forwards (436) the second reply message to the support service provider as a reply to the third instant message.

In some embodiments, the support service provider combines information in the reply message and information in the second reply message to prepare a subsequent instruction to the first peripheral device or a subsequent message to the first user. For example, if the third instant message from Q-Support to Red207 is "Did you eat breakfast this morning?" and the second reply message from Red207 to Q-Support is "No, I didn't", the support server optionally generates a health report or further instructions based on the health monitoring data obtained from Q-Band in the first reply message and the breakfast information provided in the user's second reply message.

In some embodiments, receiving the first owner registration request from the first user further includes (340): receiving transmission of a scanning result from the first user device, the scanning result including a barcode associated with the support service provider for the respective type of peripheral devices. In some embodiments, the communication server receives (442) a request to establish an association between the first peripheral device and the first user; and establishes (444) a communication channel between the support service provider and the first peripheral device via the server of the social network platform and the first user device. This is illustrated in FIGS. 2A-2H, for example.

Other features and aspects for the above exemplary process are provided in other parts of the present disclosure.

Figure 5A:
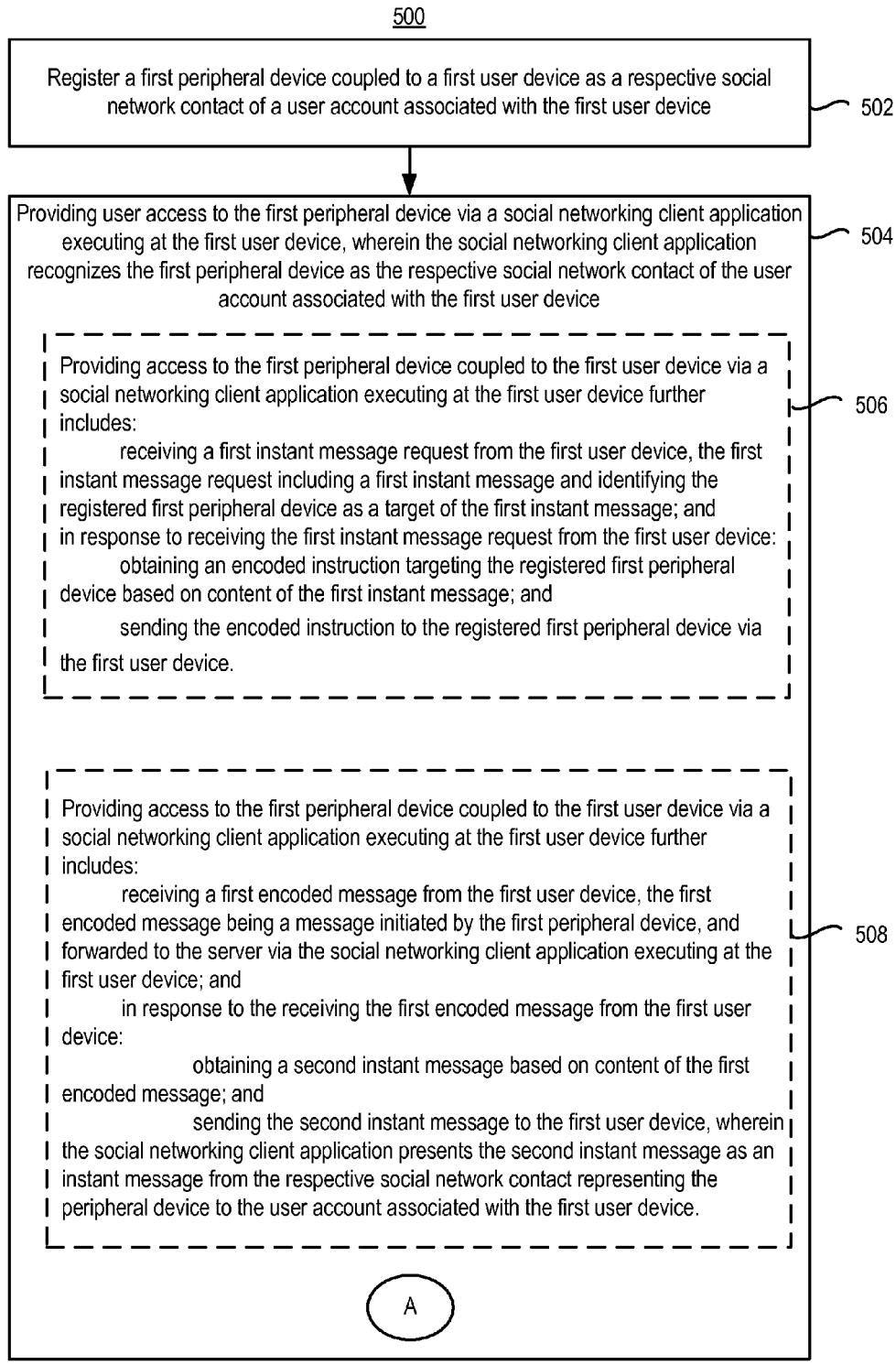
FIGS. 5A-5C are flow charts for an exemplary process for controlling a peripheral device as a social network contact over a social networking platform in accordance with some embodiments.
Figure 5B:
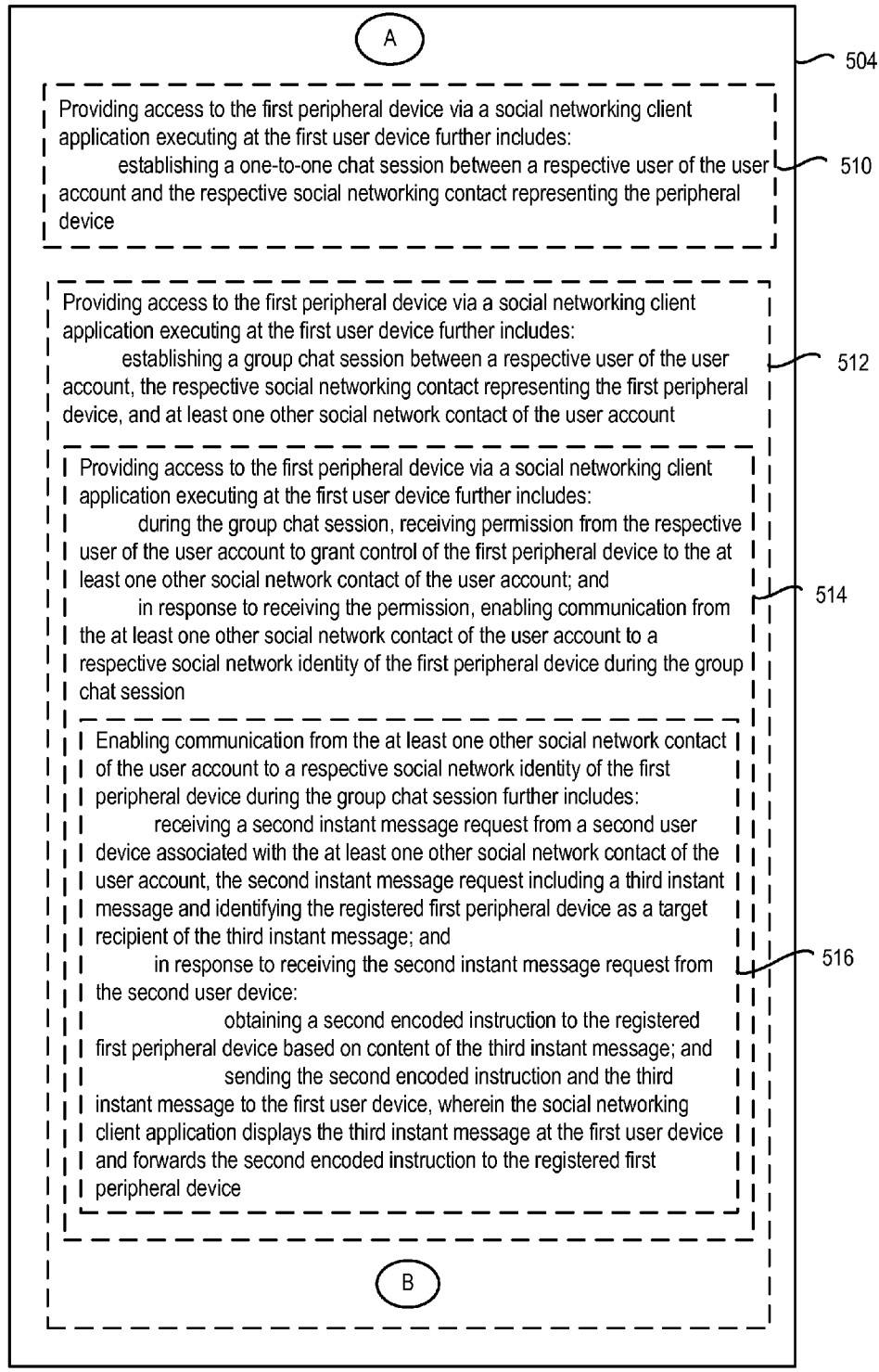
Figure 5C:
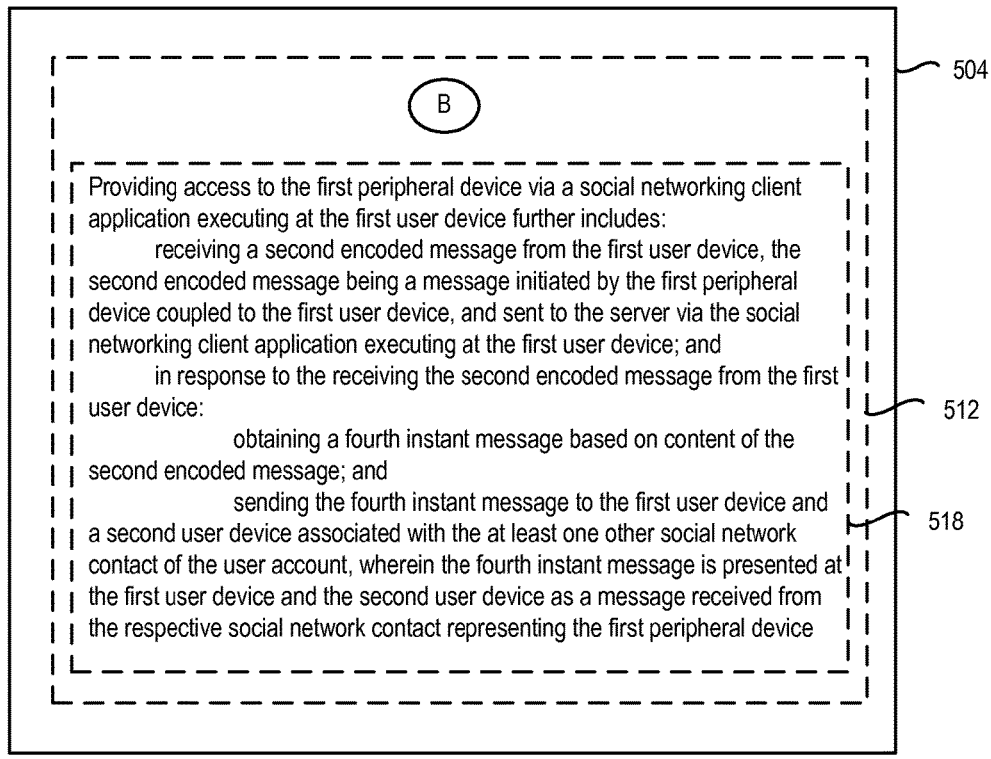
Figure 6A:
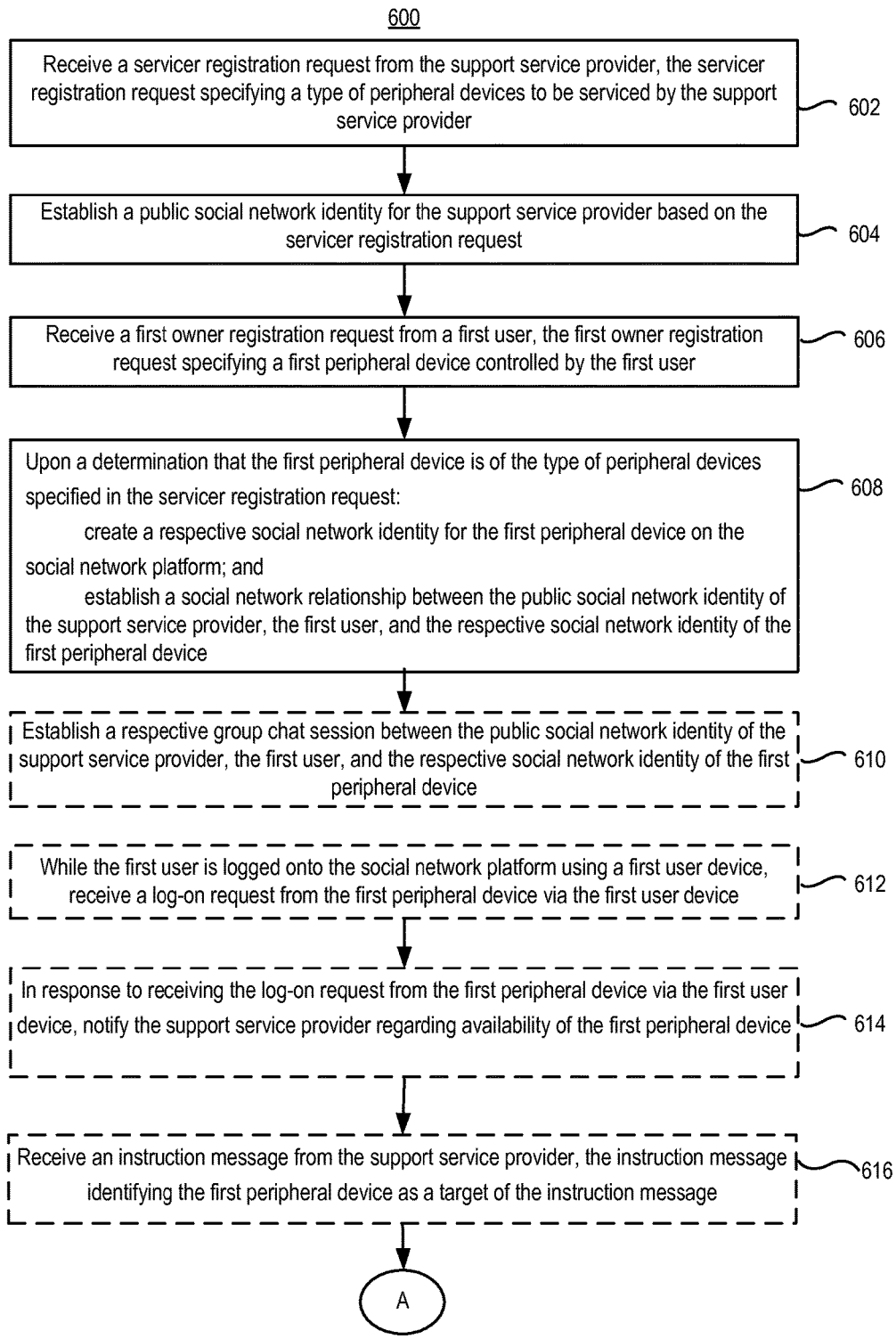
FIGS. 6A-6D are flow charts for an exemplary process for providing control and access to a peripheral device by treating the peripheral device as a social network contact in a social network in accordance with some embodiments.
Figure 6B:
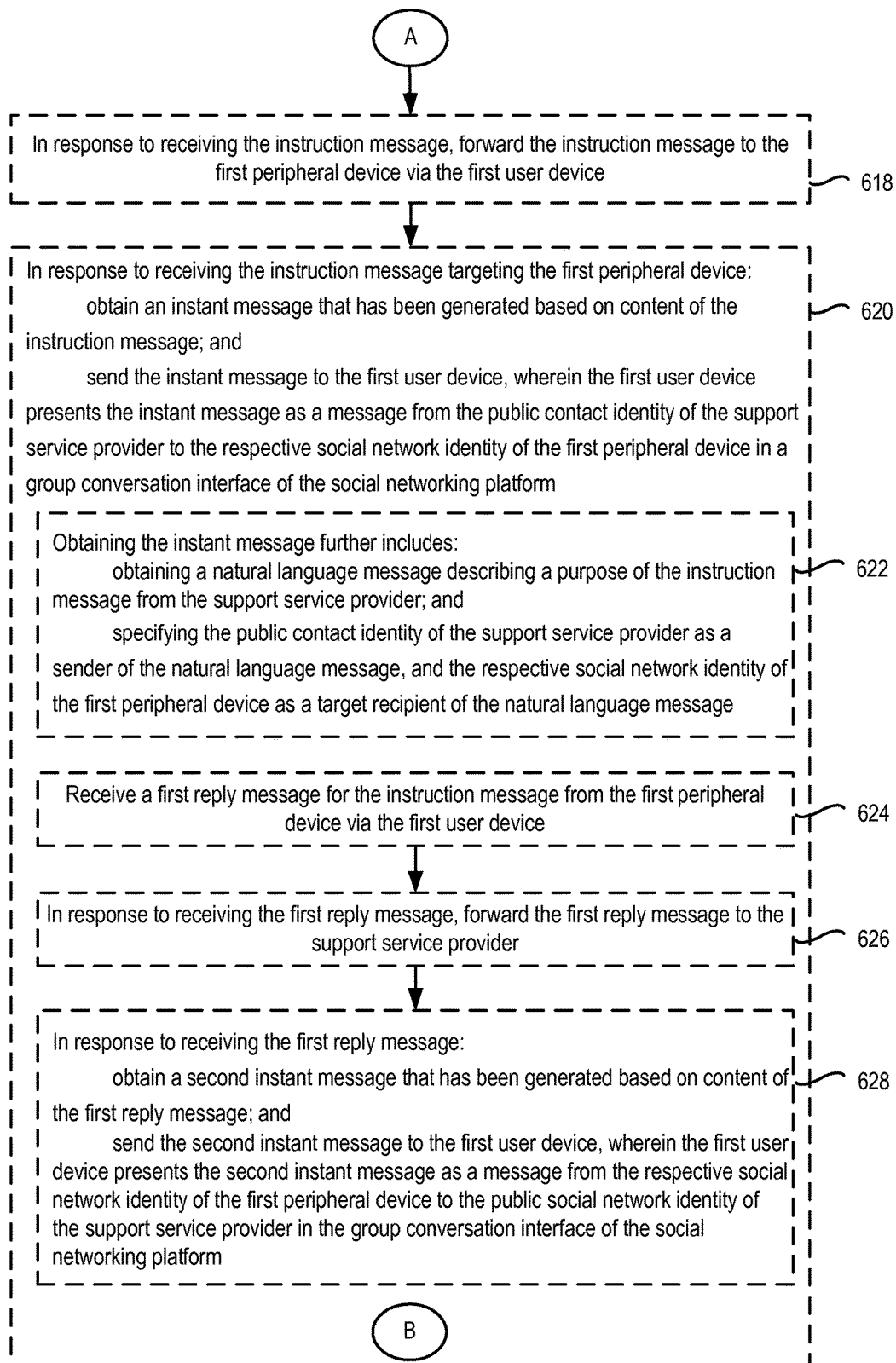
Figure 6C:
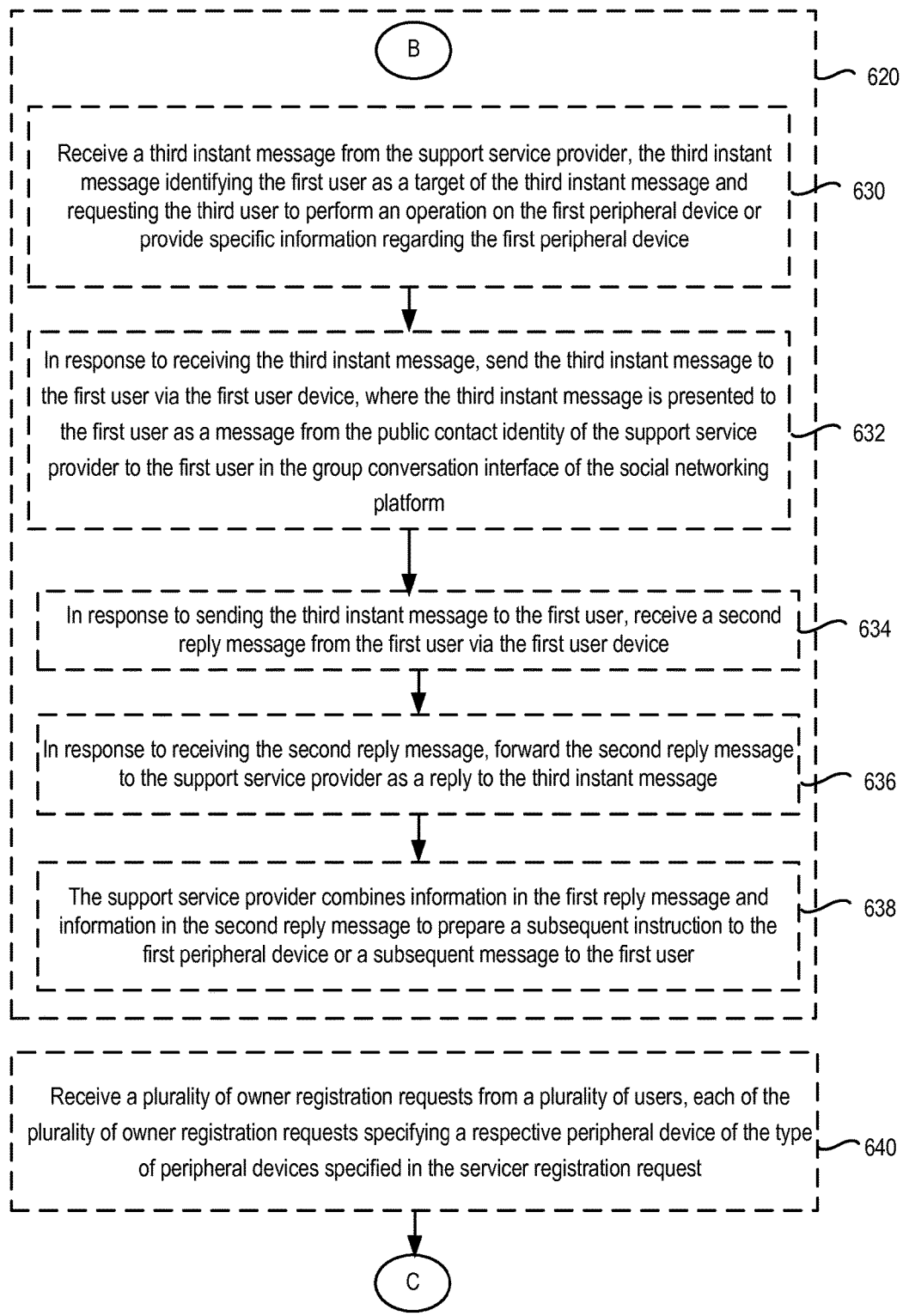
Figure 6D:
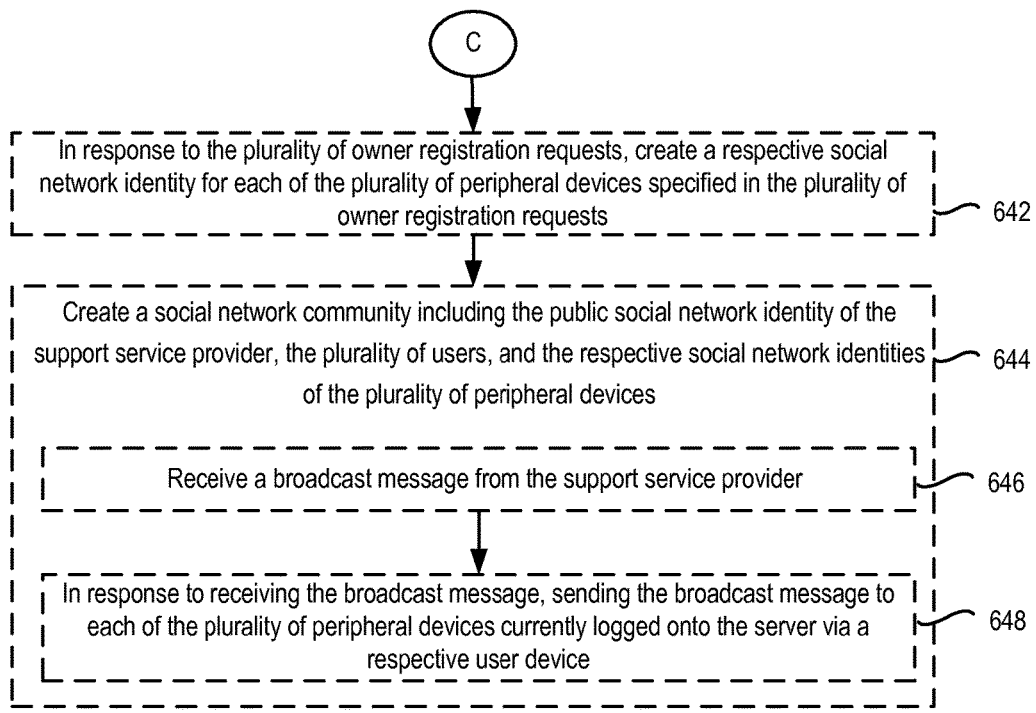

FIGS. 5A-5C are flow charts for an exemplary process 500 for providing access to one or more peripheral devices over a social networking platform. The peripheral devices are treated as social network contacts of human users on the social networking platform.

In some embodiments, the process 500 is performed by a server of the social network platform (e.g., the communication server 112*b* in FIG. 1B). In some embodiments, the communication server registers (502) a first peripheral device coupled to a first user device as a respective social network contact of a user account associated with the first user device. For example, this is illustrated in FIGS. 2A-2H and accompanying descriptions. The communication server provides (504) user access to the first peripheral device via a social networking client application executing at the first user device, wherein the social networking client application recognizes the first peripheral device as the respective social network contact of the user account associated with the first user device.

In some embodiments, providing access to the first peripheral device coupled to the first user device via a social networking client application executing at the first user device further includes (506): receiving a first instant message request from the first user device, the first instant message request including a first instant message and identifying the registered first peripheral device as a target of the first instant message; and in response to receiving the first instant message request from the first user device: obtaining an encoded instruction targeting the registered first peripheral device based on content of the first instant message; and sending the encoded instruction to the registered first peripheral device via the first user device. For example, a user (e.g., user "Red207") of the first user device (e.g., a smart phone) wishes to control a first peripheral device (e.g., Bluetooth enabled bread maker) that has been registered with the communication server, and associated with the user's account as a social network contact of the user. The bread maker is connected to the user device and is displayed in the user's contact list as "Red's Bread Machine." When the user wishes to start the bread maker at a later time (e.g., 4 pm), the user can start a chat session with "Red's Bread Machine" using the social network client application executing on the user device, and sends a first instant message "Start kneading at 4 pm." The communication server receives the user's instant message request, and obtains a corresponding encoded instruction (e.g., a binary command sequence) that is accepted by the bread maker. The communication server optionally uses the support server of the bread maker to obtain the encoded instruction. The communication server then sends the encoded instruction to the bread maker via the user device, and the bread maker starts the appropriate kneading program as instructed by the instruction message (e.g., at 4 pm). This communication scenario is also shown in FIG. 2K and accompanying descriptions.

In some embodiment, providing access to the first peripheral device coupled to the first user device via a social networking client application executing at the first user device further includes (508): receiving a first encoded message from the first user device, the first encoded message being a message initiated by the first peripheral device, and forwarded to the server via the social networking client application executing at the first user device; and in response to the receiving the first encoded message from the first user device: obtaining a second instant message based on content of the first encoded message; and sending the second instant message to the first user device, wherein the social networking client application presents the second instant message as an instant message from the respective social network contact representing the peripheral device to the user account associated with the first user device. For example, continue with the above example of the bread maker. Suppose that after the bread maker starts the kneading program at 4 pm as instructed by the user, the bread maker detects that the dough is too dry (e.g., if the user didn't put enough water in the bread maker) for a previously selected type of bread, the bread maker generates a first encoded message (e.g., "0014053434") asking permission to modify the originally selected bread type (e.g., from French bread to Russian bread). The first encoded message is sent from the bread maker to the communication server via the user device, and the communication server obtains a translation of the first encoded message (e.g., "The dough is too dry, requesting permission to change baking program from French Bread Mode to Russian Bread Mode.") based on the content of the encoded message. The communication server sends the translation as a second instant message to the user, and the conversation log shown in the social networking application at the user device presents an instant message from "Red's Bread Machine" to "Red207" saying "The dough is too dry, requesting permission to change baking program from French Bread Mode to Russian Bread Mode." The user receiving the second instant message has the option to send a reply saying "No, proceed as programmed" or "OK, go ahead" to the bread maker. This communication scenario is also shown in FIG. 2L and accompanying descriptions.

In some embodiments, providing access to the first peripheral device via a social networking client application executing at the first user device further includes (510): establishing a one-to-one chat session between a respective user of the user account and the respective social networking contact representing the peripheral device.

In some embodiments, providing access to the first peripheral device via a social networking client application executing at the first user device further includes: establishing a group chat session between a respective user of the user account, the respective social networking contact representing the first peripheral device, and at least one other social network contact of the user account.

In some embodiments, providing access to the first peripheral device via a social networking client application executing at the first user device further includes (512): during the group chat session, receiving permission from the respective user of the user account to grant control of the first peripheral device to the at least one other social network contact of the user account; and in response to receiving the permission, enabling communication from the at least one other social network contact of the user account to a respective social network identity of the first peripheral device during the group chat session. For example, as shown in the communication scenario described with respect to FIG. 2R, one user (e.g., User A) has granted permission to a social network contact of his/hers to access and/or control a peripheral device registered under user A's account and coupled to user A's user device. For example, when user A (e.g., "Red207") added user B (e.g., "Reddog") to a current chat session between user A and peripheral device A (e.g., "Red's Bread Machine"), and user A is deemed to have granted access to the peripheral device A by user B. User B can now communicate with peripheral device A in the same group chat session using instant messages.

In some embodiments, enabling communication from the at least one other social network contact of the user account to a respective social network identity of the first peripheral device during the group chat session further includes (516): receiving a second instant message request from a second user device associated with the at least one other social network contact of the user account, the second instant message request including a third instant message and identifying the registered first peripheral device as a target recipient of the third instant message; and in response to receiving the second instant message request from the second user device: obtaining a second encoded instruction to the registered first peripheral device based on content of the third instant message; and sending the second encoded instruction and the third instant message to the first user device, wherein the social networking client application displays the third instant message at the first user device and forwards the second encoded instruction to the registered first peripheral device. For example, when user A "Red207" wishes to ask for user B "Reddog's" assistance in deciding whether to change the previously selected bread type, user A adds user B into the current chat session and establishes a group chat session involving "Red207", "Red's Bread Machine" and "Reddog." User "Red207" can optionally sends an instant message to user "Reddog" in the group chat session saying "The bread machine says the dough is too try, should I switch the baking program from French to Russian?" User "Reddog" being a more experience baker can instruct the bread machine to maintain the current bread type, but lower the baking temperature by 10 degrees while extending baking time by 10 minutes. In this example, the user "Reddog" serves as the social contact of the first user (e.g., "Red207") sends the second instant message request from a second user device (e.g., user "Reddog's" tablet device). The second instant message request includes the third instant message, e.g., "@Red's Bread Machine: Don't switch bread type. Instead, lower baking temperature by 10 degrees, and extend baking time by 10 minutes." The communication server obtains the encoded instruction based on the content of the third instant message, and sends the encoded instruction to the bread maker via the first user device. This communication scenario is also illustrated in FIG. 2R and accompanying descriptions.

In some embodiments, providing access to the first peripheral device via a social networking client application executing at the first user device further includes (518): receiving a second encoded message from the first user device, the second encoded message being a message initiated by the first peripheral device coupled to the first user device, and sent to the server via the social networking client application executing at the first user device; and in response to the receiving the second encoded message from the first user device: obtaining a fourth instant message based on content of the second encoded message; and sending the fourth instant message to the first user device and a second user device associated with the at least one other social network contact of the user account, wherein the fourth instant message is presented at the first user device and the second user device as a message received from the respective social network contact representing the first peripheral device. Following the example concerning the bread maker above. Suppose that the bread maker "Red's Bread Machine" receives the encoded instruction regarding lowering baking temperature and extending baking time, and determines that it is feasible. The break maker generates a second encoded message (e.g., "OK, program modification initiated, T=T+10, t=t+10."). The second encoded message targets the whole group including both user A and user B. The second encoded message is sent to the communication server, and the communication server obtains a fourth instant message targeting both user A and user B, based on the content of the second encoded message. For example, the fourth instant message may be "OK, proceeding to modify baking program as instructed by Reddog." The fourth instant message is displayed in the conversation log on both users' user devices as a reply from the bread maker "Red's Bread Machine." This communication scenario is illustrated in FIG. 2S and accompanying descriptions.

Other features and aspects for the above exemplary process are provided in other parts of the present disclosure.

FIGS. 6A-6D are flow charts for an exemplary process 600 for providing control and access to a peripheral device by treating the peripheral device as a social network contact in a social network in accordance with some embodiments. In some embodiments, the control and access to the peripheral device is accomplished through a social network identity of a support server for the peripheral device. In some embodiments, the process is performed by a server (e.g., communication server 112b in FIG. 1B) of the social networking platform.

In some embodiments, the communication server receives (602) a servicer registration request from the support service provider, the servicer registration request specifying a type of peripheral devices to be serviced by the support service provider. For example, a manufacturer of the bread maker can have a customer support department personnel register a servicer's account with the communication server. The servicer's account has its public social network identity that can become social network contacts of many users, as long as the users agrees to subscribed to the message or publication by the customer support personnel under the public social network identity. The communication server establishes (604) a public social network identity for the support service provider based on the servicer registration request. For example, the public social network identity may be associated with one or more types of peripheral devices for which the customer support department provides support services.

In some embodiments, the communication server receives (606) a first owner registration request from a first user, the first owner registration request specifying a first peripheral device controlled by the first user. Upon a determination that the first peripheral device is of the type of peripheral devices specified in the servicer registration request: the communication server creates (608) a respective social network identity for the first peripheral device on the social network platform; and establishes a social network relationship between the public social network identity of the support service provider, the first user, and the respective social network identity of the first peripheral device.

In some embodiments, the communication server establishes (610) a respective group chat session between the public social network identity of the support service provider, the first user, and the respective social network identity of the first peripheral device. In some embodiments, the communication server automatically establishes a group conversation for the support service provider, the user, and the peripheral device based on the fact that the user and the support server are both linked to the peripheral device, the former being a current owner of the peripheral device, and the latter being a support service provider of the peripheral device.

In some embodiments, while the first user is logged onto the social network platform using a first user device, the communication server receives (612) a log-on request from the first peripheral device via the first user device; and in response to receiving the log-on request from the first peripheral device via the first user device, the communication sever notifies (614) the support service provider regarding availability of the first peripheral device. For example, after the first peripheral device has been registered by the first user, as soon as the first peripheral device establishes a connection with the first user device of the first user through the operation of the social network client application executing on the first user device, the first user device reports the active online status of the first peripheral device to the communication server. The communication server then updates the support server of the active online status of the first peripheral device.

In some embodiments, the communication server receives (616) an instruction message from the support service provider, the instruction message identifying the first peripheral device as a target of the instruction message. In response to receiving the instruction message, the communication server forwards (618) the instruction message to the first peripheral device via the first user device. In some embodiments, in response to receiving the instruction message targeting the first peripheral device: the communication server obtains (620) an instant message that has been generated based on content of the instruction message; and sends the instant message to the first user device, wherein the first user device presents the instant message as a message from the public contact identity of the support service provider to the respective social network identity of the first peripheral device in a group conversation interface of the social networking platform. This is illustrated in the communication configuration of FIG. 2O. For example, if the support service provider of the bread maker wishes to collect bread making usage frequency data from the bread maker, the support server sends an encoded instruction to the bread maker "Red's Bread Machine" to submit the requested usage data via the communication server and the first user device. The communication server also obtains (e.g., from the support server) an instant message (e.g., "@Red's Bread Machine: Please send me the usage data for last month.") reflecting the content and/or purpose of the encoded instruction, and sends it to the first user device for display to the user in the conversation log of the group chat session between the social network identities of the support server, the first user, and the bread maker.

In some embodiments, obtaining the instant message further includes (622): obtaining a natural language message describing a purpose of the instruction message from the support service provider; and specifying the public contact identity of the support service provider as a sender of the natural language message, and the respective social network identity of the first peripheral device as a target recipient of the natural language message.

In some embodiments, the communication server receives (624) a first reply message for the instruction message from the first peripheral device via the first user device. In response to receiving the first reply message, the communication server forwards (626) the first reply message to the support service provider. For example, when the bread maker submits the usage data in an encoded message to the support server, the encoded message first arrives at the first user device and is transmitted by the first user device to the communication server, and the communication server then forwards it to the support server.

In some embodiments, in response to receiving the first reply message: the communication server obtains (628) a second instant message that has been generated based on content of the first reply message; and sends the second instant message to the first user device, wherein the first user device presents the second instant message as a message from the respective social network identity of the first peripheral device to the public social network identity of the support service provider in the group conversation interface of the social networking platform. For example, after the support server receives the encoded bread maker usage data in the first reply message, the support server translates the encoded usage data into human-readable form (e.g., a list or table) and includes it in a second instant message. The support server provides the second instant message to the communication server for the communication server to send to the first user device. The first user device displays the second instant message as a reply from the bread maker "Red's Bread Machine" to the public social network identity of the support server.

In some embodiments, the communication server receives (630) a third instant message from the support service provider, the third instant message identifying the first user as a target of the third instant message and requesting the third user to perform an operation on the first peripheral device or provide specific information regarding the first peripheral device. In response to receiving the third instant message, the communication server sends (632) the third instant message to the first user via the first user device, where the third instant message is presented to the first user as a message from the public contact identity of the support service provider to the first user in the group conversation interface of the social networking platform. In some embodiments, in response to sending the third instant message to the first user, the communication server receives (634) a second reply message from the first user via the first user device; and in response to receiving the second reply message, the communication server forwards (636) the second reply message to the support service provider as a reply to the third instant message. For example, continue with the example of the bread maker above. The support server can generate the third instant message asking the first user to provide some information on the taste preference or usage experience from the first user regarding the bread maker. The support server can state in the third instant message "Do you prefer your bread to be softer than those that have been made by Red's Bread Machine?" The support server sends the third instant message to the communication server, for the communication server to forward to the user "Red207." After the third instant message is sent to the user "Red207" and displayed at the first user device, the user can provide a reply to the question asked by the support server. For example, the user can provide the second reply message as an instant message targeting the support server, where the reply message states "I prefer softer breads." The second reply message is sent to the communication server and the communication server forwards the second reply message to the support server.

In some embodiments, the support service provider combines (638) information in the first reply message (e.g., the machine usage data received from the bread maker "Red's Bread Machine") and information in the second reply message (e.g., the taste and texture preference provided by the user) to prepare a subsequent instruction (e.g., an encoded instruction for adjusting a baseline of the bread making program) to the first peripheral device and/or a subsequent message (e.g., an instant message advising the user to put slight more water into the bread machine in the future) to the first user. In some embodiments, an instant message memorializing the encoded instruction and/or the instant message to the first user are entered into the conversation log of the current group chat session.

In some embodiments, the communication server receives (640) a plurality of owner registration requests from a plurality of users, each of the plurality of owner registration requests specifying a respective peripheral device of the type of peripheral devices specified in the servicer registration request. In response to the plurality of owner registration requests, the communication server creates (642) a respective social network identity for each of the plurality of peripheral devices specified in the plurality of owner registration requests. In some embodiments, the communication server creates a social network community including the public social network identity of the support service provider, the plurality of users, and the respective social network identities of the plurality of peripheral devices. For example, the communication server can create an online community for all users who have registered the same type of bread makers, and allow them to have a social network group to communicate with one another, along with their respective devices in the social network group. In some embodiments, the communication server receives (646) a broadcast message from the support service provider; and in response to receiving the broadcast message, the communication server sends the broadcast message to each of the plurality of peripheral devices currently logged onto the server via a respective user device. For example, the support server of the bread machines can send a broadcast message (e.g., an encoded message for stopping a feature that has just been discovered to be unsafe) to all registered bread machine in the online community. All the bread machines receiving the broadcast message can act according to the instruction in the broadcast message.

Other features and aspects for the above exemplary process are provided in other parts of the present disclosure.

Figure 7A:
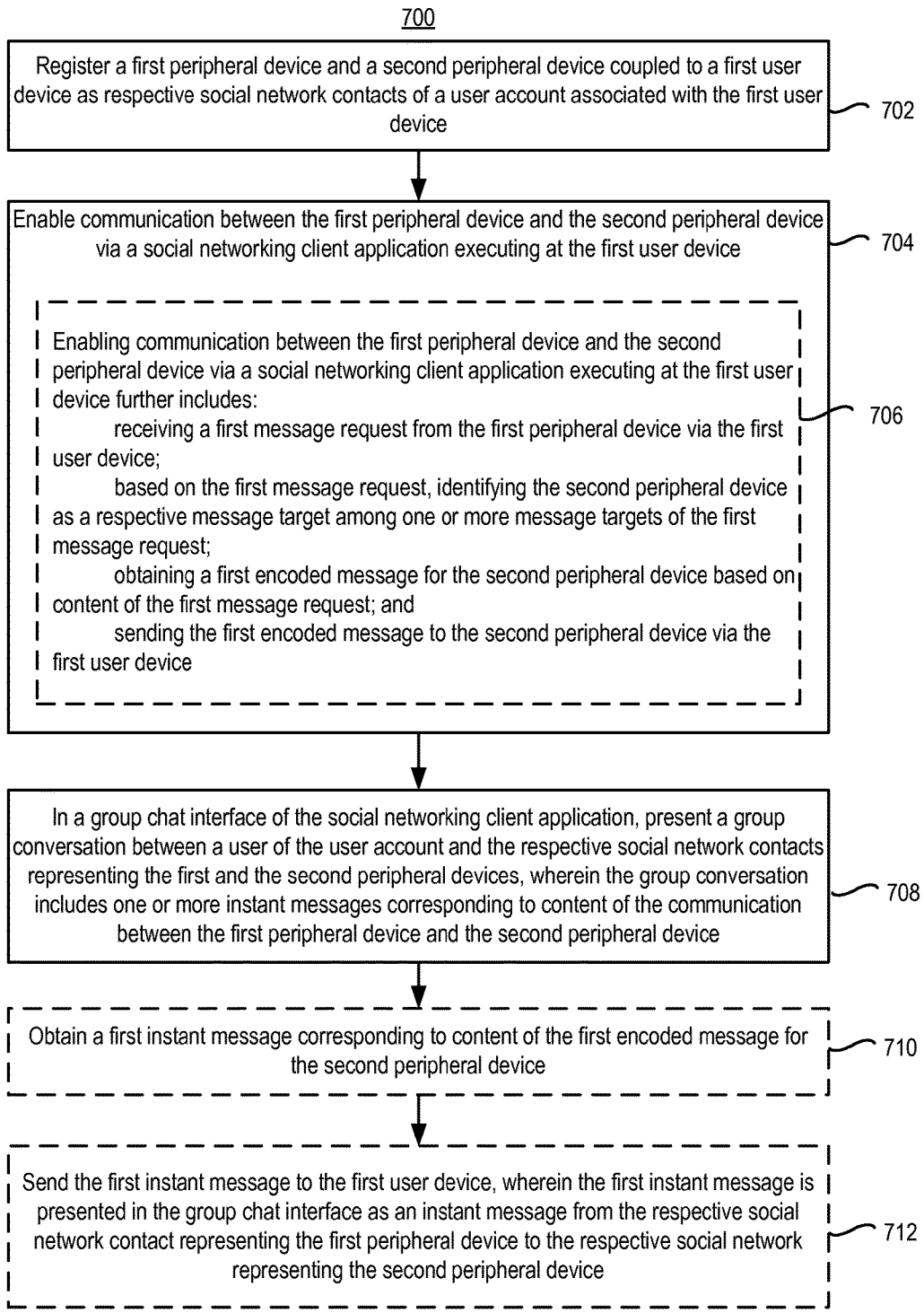
FIGS. 7A-7C are flow charts for an exemplary process for providing control and access between peripheral devices in a social network in accordance with some embodiments.
Figure 7B:
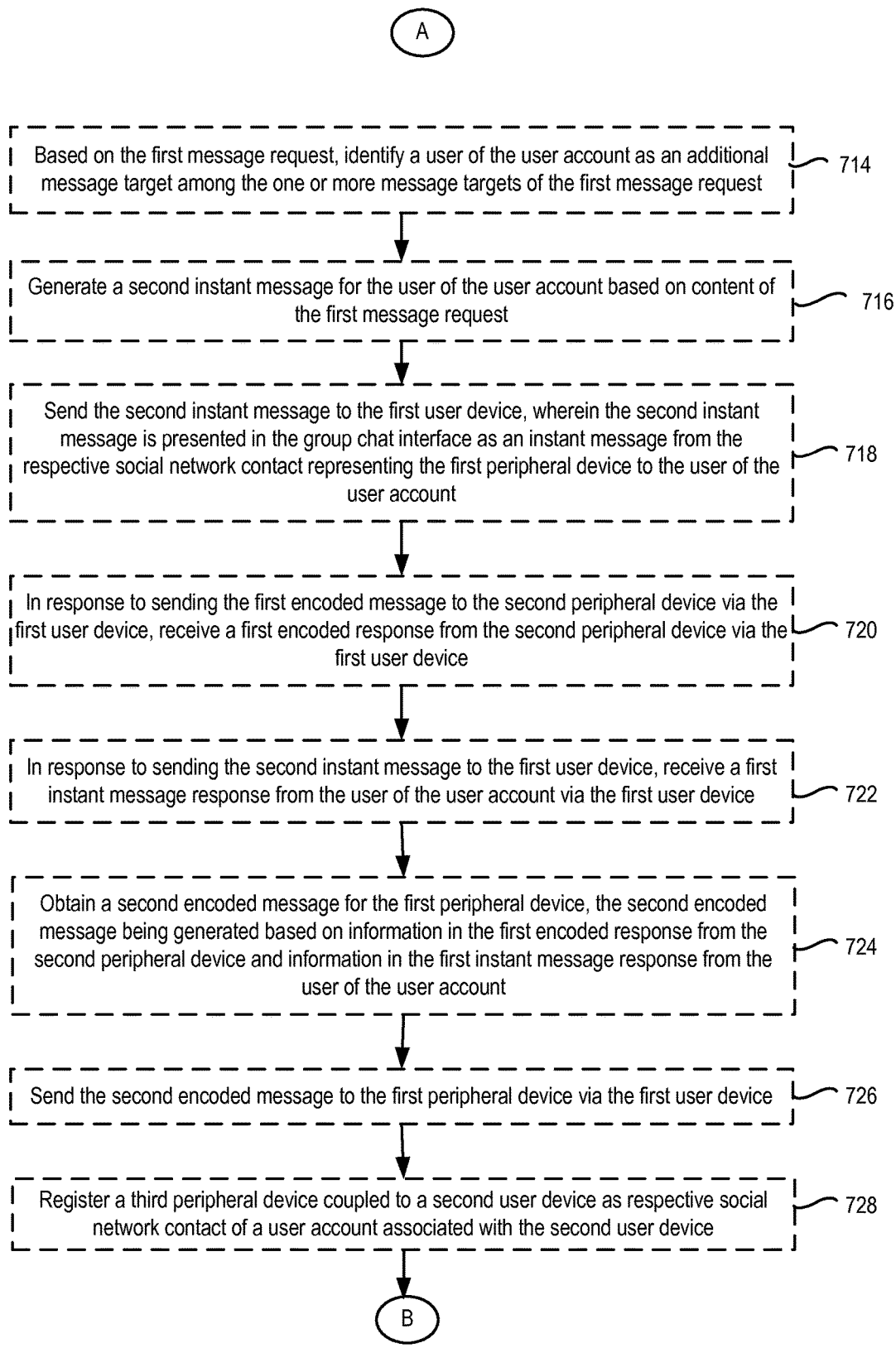
Figure 7C:
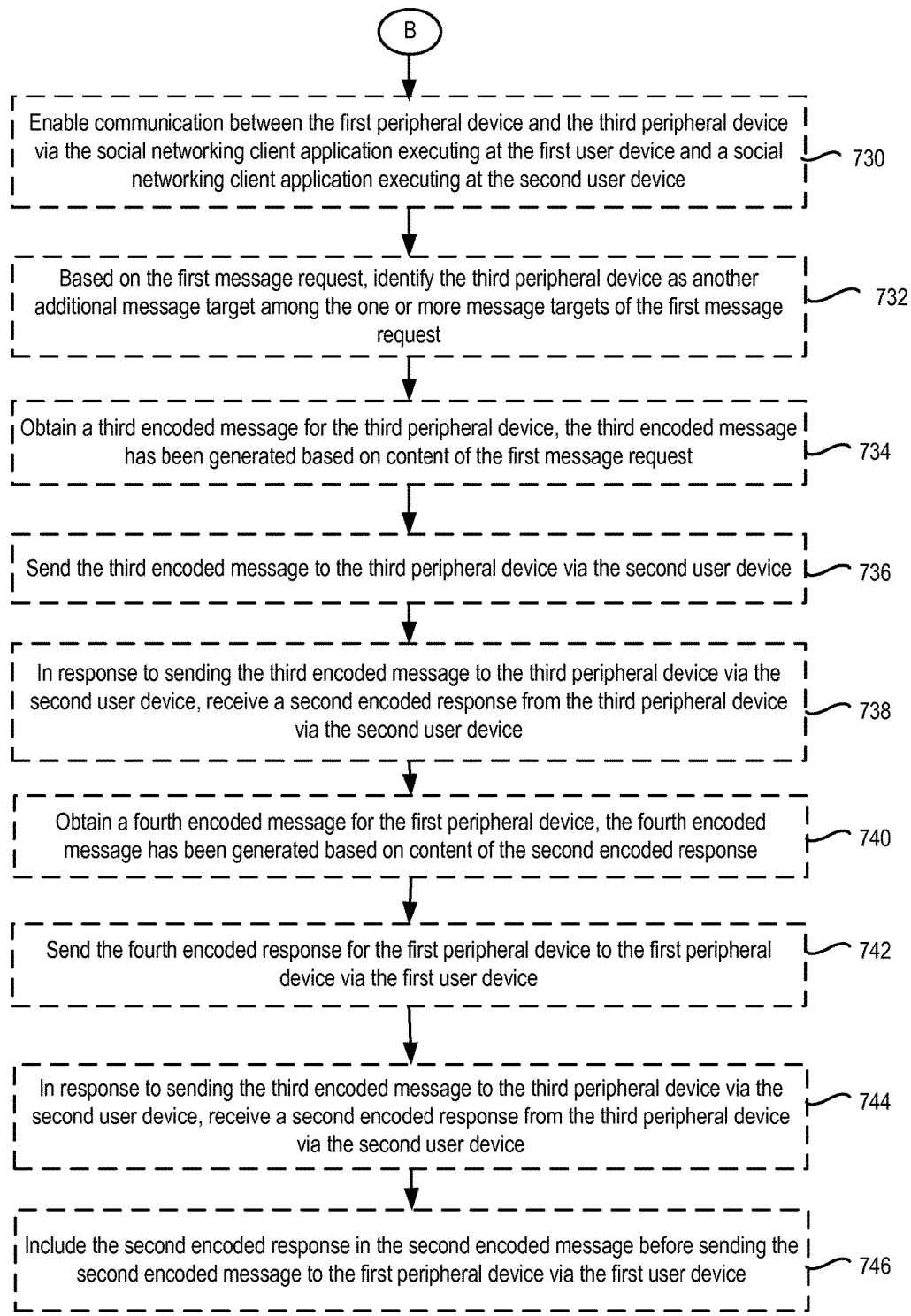

FIGS. 7A-7C are flow charts for an exemplary process 700 for providing control and access between peripheral devices over a social network platform in accordance with some embodiments. In some embodiments, the process is performed by a communication server of the social network platform.

In some embodiments, the communication server registers (702) a first peripheral device and a second peripheral device coupled to a first user device as respective social network contacts of a user account associated with the first user device. For example, the user Red207 can register a climate control device and a lighting control device in her apartment with the communication server. Suppose that the communication server assigns respective social network identities "Red's Climate Master" and "Red's Lighting Master" to the client control device and the lighting control device. Both devices are coupled to the user's user device (e.g., a smart phone) via a social network client application executing on the user device. In some embodiments, the communication server enables (704) communication between the first peripheral device (e.g., the lighting control device) and the second peripheral device (e.g., the climate control device) via the social networking client application executing at the first user device.

In some embodiments, in a group chat interface of the social networking client application, the communication server presents (708) a group conversation between a user of the user account and the respective social network contacts representing the first and the second peripheral devices, wherein the group conversation includes one or more instant messages corresponding to content of the communication between the first peripheral device and the second peripheral device. For example, the communication server can provide a group chat session in which the user "Red207" and the two peripheral devices "Red's Climate Master" and "Red's Lighting Master" can exchange communication messages with one another. In the conversation log of the group chat, the communication messages are all shown as instant messages readable by a human user, regardless of whether the original messages exchanged between the parties are encoded messages or regular instant messages.

In some embodiments, enabling communication between the first peripheral device and the second peripheral device via a social networking client application executing at the first user device further includes (706): receiving a first message request from the first peripheral device via the first user device; based on the first message request, identifying the second peripheral device as a respective message target among one or more message targets of the first message request; obtaining a first encoded message for the second peripheral device based on content of the first message request; and sending the first encoded message to the second peripheral device via the first user device. For example, if the lighting control device detects that the lights in the down stair living room has been turned off, and the lights upstairs bedroom has been turned on, the lighting control device optionally sends an a first message request to the communication server via the user device. The first message request including at least a first encoded message targeting the climate control device. The first encoded message is an instruction for the climate control device to turn off the air conditioning downstairs, and turn on the air conditioning upstairs. In some embodiments, the original message targeting the climate control device may be of a different format, and may be converted into a format acceptable by the climate control device before the message is send to the client control device via the user device.

In some embodiments, the communication server obtains (710) a first instant message corresponding to content of the first encoded message for the second peripheral device, and sends (712) the first instant message to the first user device, wherein the first instant message is presented in the group chat interface as an instant message from the respective social network contact representing the first peripheral device to the respective social network representing the second peripheral device. For example, the first instant message can be a message saying "@Red's Climate Master, Red207 has moved upstairs, please adjust the air conditioning accordingly." Note that the first instant message is meant for the user to understand what has happened between the devices, and thus the first instant message need not be a verbatim translation of the encoded message transmitted between the two peripheral devices. Other customized and more natural statements conveying the meaning and content of the encoded message may be used by the communication server.

In some embodiments, based on the first message request, the communication server identifies (714) a user of the user account as an additional message target among the one or more message targets of the first message request. For example, the lighting control device optionally generates a first message request that includes multiple portions, and each portion representing a respective message with a respective target. In addition to the encoded instruction targeting the climate control device, the first message request optionally includes another message targeting the user Red207. In some embodiments, the communication server generates (716) a second instant message for the user of the user account based on content of the first message request, and sends (718) the second instant message to the first user device, wherein the second instant message is presented in the group chat interface as an instant message from the respective social network contact representing the first peripheral device to the user of the user account. For example, the second instant message may be a message from the lighting control device saying "Red207, the light over the stove is still on, do you want to turn it off?" This second instant message is generated based on the portion of the first message request that includes an encoded message targeting the user. For example, the portion of the first message request that includes the encoded message targeting the user may be a message with an exception code representing an unattended light ("E01") and a location code of the unattended light (e.g. "K5").

In some embodiments, in response to sending the first encoded message (e.g., the encoded message for changing the air conditioning upstairs and downstairs) to the second peripheral device via the first user device, the communication server receives (720) a first encoded response (e.g., "+1", meaning "OK".) from the second peripheral device via the first user device. In response to sending the second instant message (e.g., "Red207, the light over the stove is still on, do you want to turn it off?") to the first user device, the communication server receives (722) a first instant message response (e.g., "@Red's Lighting Master: Turn that light off.") from the user of the user account via the first user device.

In some embodiments, the communication server obtains (724) a second encoded message for the first peripheral device, the second encoded message being generated based on information in the first encoded response from the second peripheral device and information in the first instant message response from the user of the user account. The communication server sends (726) the second encoded message to the first peripheral device via the first user device. For example, the communication server obtains a second encoded message for the lighting control device, where the second encoded instruction can an encoded instruction for the lighting control device to enter a suspended mode after turning off the downstairs light over the oven.

In some embodiments, the communication server registers (728) a third peripheral device coupled to a second user device as respective social network contact of a user account associated with the second user device; and enables (730) communication between the first peripheral device and the third peripheral device via the social networking client application executing at the first user device and a social networking client application executing at the second user device. For example, in addition to the climate control device and the lighting control device connected to Red207's user device, a third peripheral device (e.g., a security monitoring device) controlled by another user "Reddog" through Reddog's tablet device can be added to the group chat session, and communicate with the climate control device and/or the lighting control device.

In some embodiments, based on the first message request, the communication server identifies (732) the third peripheral device as another additional message target among the one or more message targets of the first message request. For example, the first message request can include an additional portion that includes an encoded message targeting the security monitoring device coupled to the second user device operated by the first user's social network contact "Reddog." The communication server obtains (734) a third encoded message (e.g., "EXESFG001", meaning "Turn on security monitoring of all gates.") for the third peripheral device (e.g., the security monitoring system), where the third encoded message has been generated based on content of the first message request. The communication server sends (736) the third encoded message to the third peripheral device via the second user device (e.g., Reddog's tablet device).

In some embodiments, in response to sending the third encoded message to the third peripheral device via the second user device, the communication server receives (738) a second encoded response from the third peripheral device via the second user device. For example, the security monitoring device, after receiving the encoded instruction to turn on security monitoring for all gates, sends an acknowledgement of the instruction to the lighting control device. In some embodiments, the communication server obtains (740) a fourth encoded message for the first peripheral device, the fourth encoded message has been generated based on content of the second encoded response. The communication server sends (742) the fourth encoded response for the first peripheral device to the first peripheral device via the first user device. For example, since the native message formats of the lighting control device and the security monitoring device may be different, the second encoded response received from the third peripheral device needs to be converted to a format that is accepted by the first peripheral device. Thus, the communication server obtains the fourth encoded message for the first peripheral device, where the fourth encoded message is a translation of the second encoded response into the message format of the first peripheral device.

In some embodiments, in response to sending the third encoded message to the third peripheral device via the second user device, the communication server receives (744) a second encoded response from the third peripheral device via the second user device; and the communication server includes (746) the second encoded response in the second encoded message before sending the second encoded message to the first peripheral device via the first user device. For example, the second encoded message is a message for the lighting control device to enter a suspended mode after turning off the downstairs light over the oven. The second encoded response is a response from the security monitoring system indicating that all gates have been secured, thus, the combined message sent to the light control device is simply to go into the sleep mode after turning off the oven light, since all other tasks (e.g., change air conditioning and activate security monitoring of the gates) have been taken care of by the climate control device and the security monitoring device, respectively.

Other features and aspects for the above exemplary process are provided in other parts of the present disclosure.

Figure 8:
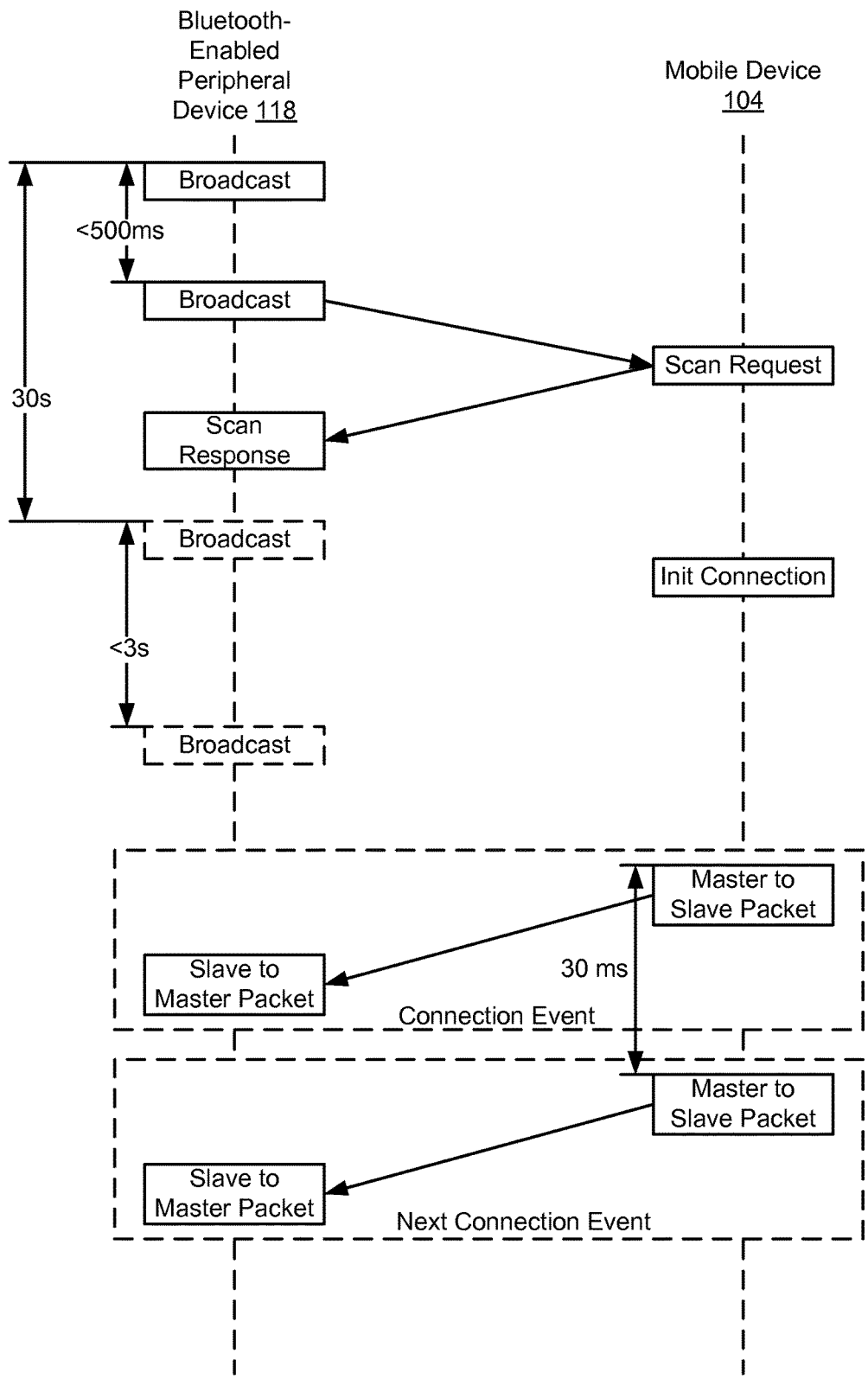
FIG. 8 is a block diagram illustrating timing requirements for an exemplary device discovery process and a subsequent communication process implemented by a peripheral device and a user device in accordance with some embodiments.

FIG. 8 is a block diagram illustrating timing requirements for an exemplary device discovery process and a subsequent communication process implemented by a peripheral device and a user device in accordance with some embodiments.

As described above, the access and control of a peripheral device via a social network platform requires the peripheral device to be connected to a user device through a social network client application executing on the device. The user device communicates with a communication server of the social network platform through the social network client application as well. Between the user device and the peripheral device, a connection (e.g., a WiFi connection, a USB connection, a Bluetooth connection, a Bluetooth Low Energy connection, an ultrasound connection, a Thunderbolt connection, etc.) is used to transfer data (e.g., encoded instructions targeting the peripheral device, and encoded responses originated from the peripheral device) to and from the peripheral device.

Bluetooth and Bluetooth Low Energy protocols are easy to use and implement for connecting the peripheral device and the user device. The general Bluetooth design guidelines (e.g., Bluetooth™ 4.0 design guideline, Apple™'s Bluetooth Design Guideline for use with Apple™ products) are not tailored to the context of controlling the peripheral device via a social networking platform. FIG. 8 illustrate some refinement of the general Bluetooth device discovery process that aims to improve user experience.

As shown in FIG. 8, a Bluetooth-enabled peripheral device serves as a Slave that advertises (e.g., by broadcasting device discovery messages) and waits for connection requests. The user device serves as a Master which scans for other devices and sends connection requests to a discovered peripheral device.

As shown in FIG. 8, to improve the connection efficiency, the broadcasting period of the peripheral device is divided into an initial broadcasting period (e.g., the first 30 seconds of the broadcasting period), and a subsequent broadcasting period (e.g., the portion of the broadcasting period after the initial broadcasting period). During the initial broadcasting period, the peripheral device broadcasts a device discovery message repeatedly with a respective interval between adjacent device discovery messages (e.g., between the starting edges of the adjacent device discovery message broadcast time slots) no more than 500 ms. After the initial broadcasting period, if no connection request has been received, the peripheral device slows down the broadcast, and the device discovery messages are repeatedly with a respective interval between adjacent device discovery messages of no more than 3 s. In some embodiments, the peripheral device starts the broadcasting period when it is powered on. In some embodiments, the user can provide a signal to the peripheral device to start the broadcasting period.

During the broadcasting period, the user device scans for the device discovery messages, and when the user device detects a device discovery message from the peripheral device, the user device determines if the peripheral device is a device that has implemented the methods described herein. For example, in some embodiments, the peripheral device includes a predetermined identifier designated for a social networking service associated with a social networking client application executing on the user device. For example, this predetermined identifier can be released to the manufacturers of the peripheral devices beforehand, such that the manufacturers preset their peripheral devices to broadcast this identifier as a UUID in the device discovery messages. This identifier allows the user device to quickly determine if a peripheral device that can communicate with the social networking client application to implements the methods described herein is present.

FIG. 8 also shows that, in some embodiments, the timing gap between two consecutive connection events after the connection has been established is preset to 30 ms. This allows the transmission protocol to comply with industry standards, and at the same time achieve relatively high transmission speed. In some embodiments, the timeout window for a connection event is 2 s, which is relatively short compared to other standards and ensures a faster discovery of delayed connection.

Figure 9A:
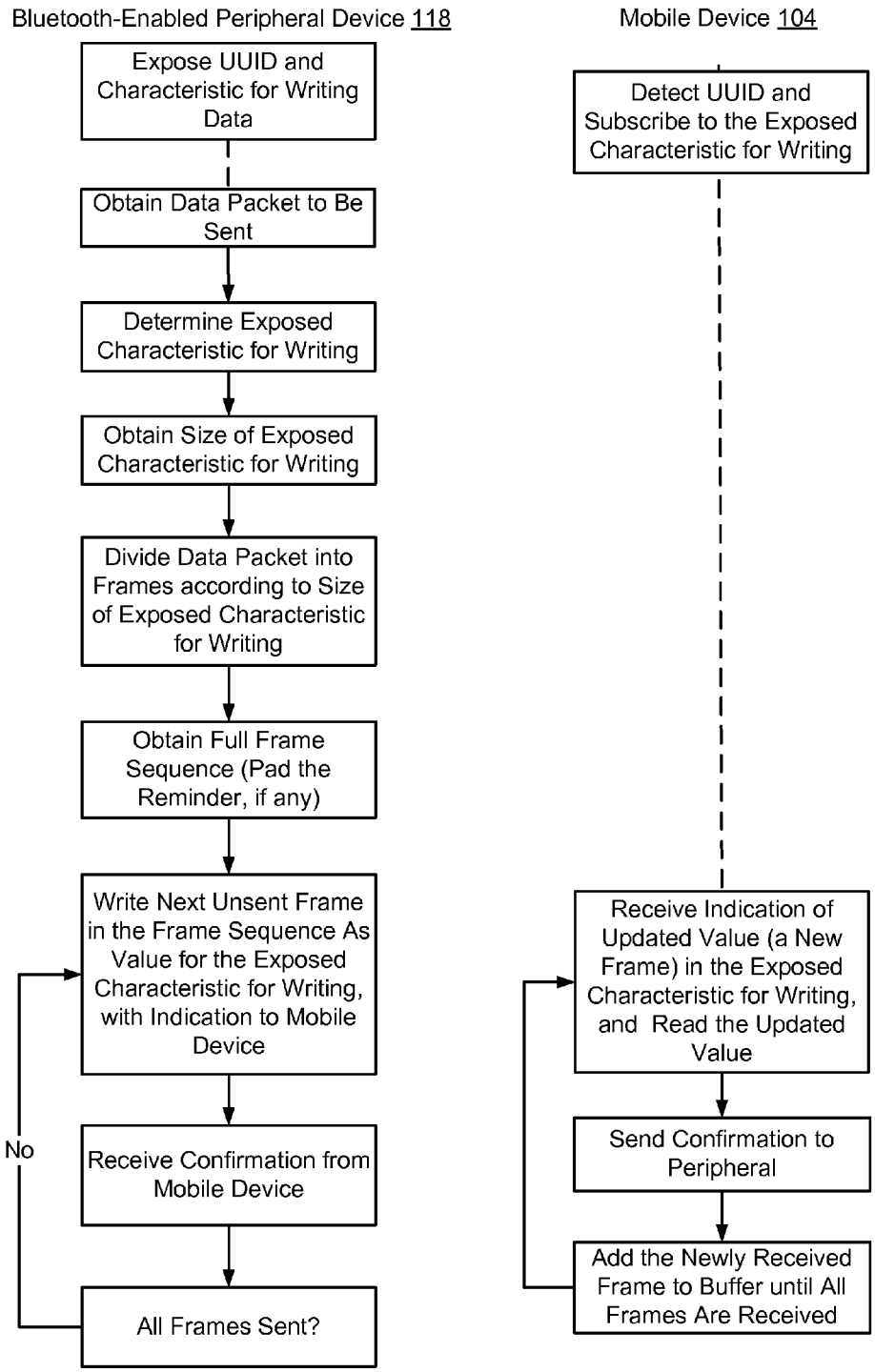
FIGS. 9A-9B are simplified flow charts for an exemplary data transfer process implemented by a peripheral device and a user device in accordance with some embodiments.
Figure 9B:
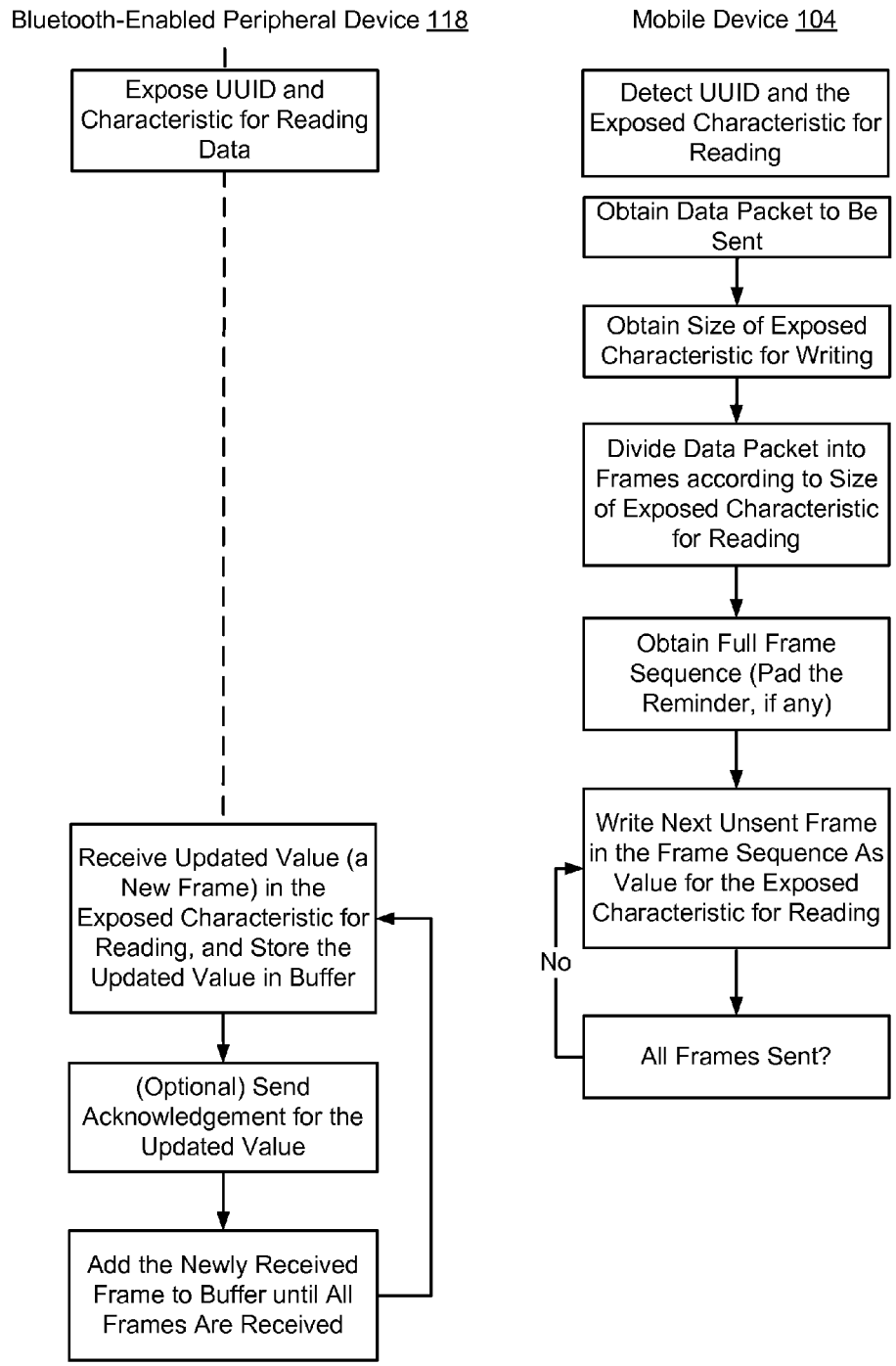

FIGS. 9A-9B are simplified flow charts for an exemplary data transfer process implemented by a peripheral device and a user device in accordance with some embodiments.

When transferring data between devices, the format of the data packets transmitted between the social network client application (user device) and the communication server of the social network platform follow predetermined format protocols, such that the communication server can identify the nature of the data packets, and its original source and final destination, and the payload of the data packet that is to be forwarded to the destination party. Since the payload of the data packet likely contain variable length data (e.g., instant messages, images, speech, encoded instructions from different types of peripheral devices, etc.), depending on the connection type used between the user device and the peripheral device, and depending on the connection type used between the user device and the communication server, a single data packet may be divided and sent in multiple chunks over the connection.

Using the connection between the user device and the peripheral device as an example, if the connection is a classic Bluetooth connection, the data transmission can be done in a data stream with no fixed length. However, if the connection is a Bluetooth Low Energy connection, the data length has a maximum limit (e.g., 20 Byte) for each data transfer operation (e.g., read, write, indicate, or notify operation). Therefore, to transmit a variable length data packet, the data packet needs to be divided into chunks and stored as or written to the value for an exposed characteristic in sequence, and the user device and the peripheral device needs to interpret each detected value as part of a continuous stream of data and reassembles the data packet after the values for all chunks have been obtained. In other words, a process for simulating a continuous data stream needs to be performed to transfer variable length data over a Bluetooth Low Energy connection (or other types of connection that only allow short bursts of data transfer operations).

In some embodiments, when a classic Bluetooth connection is used, a predetermined UUID (e.g., 0xFEC6) for a predetermined rfcomm service (e.g., designating the service associated with the social network client application) is exposed by the peripheral device. The user device scans for this predetermined UUID when performing the device discovery process, e.g., as the process shown in FIG. 2F and accompany descriptions. Once the connection is established, the data is transmitted over the Bluetooth connection in a data stream. Each data packet includes one of a Request, a Response to the Request, or a Push Request. A push request data packet includes a Push Request, the Push Request does not require a response. A Push Request is used for sending an instruction or message from a support server or communication server, and targeting a user device or peripheral device. A Request is used for sending a request or message from a user device or peripheral device, and targeting a support server or the communication server. Each Request requires a corresponding Response. The Request and its corresponding Response are matched by sharing the same sequence number. Each data packet includes a single Request, Response, or Push Request, and each data packet is sent over the connection as a respective data stream.

In some embodiments, each data packet includes a fixed length header portion and a variable length body portion. For example, in some embodiments, the header portion can include different fixed fields, e.g., respective fields for entering a magic number representing the social networking service (e.g., bMagicNumber=0xFE), a protocol version number (e.g., bVer=1); a packet total length (e.g., header+body=45 Bytes), a command ID (e.g., a command ID for an authentication request=3, or a command ID for sending data to the support server=5, etc.), a packet sequence number (e.g., sequence number for a Request=non-zero number, sequence number for a Push Request=0).

The following is an example data packet format:

```
//DataPacket//
    //Fixed Length Header//
    Struct BpFixHead
    {
        unsigned char bMagicNumber;
        unsigned char bVer;
        unsigned short nLength;
        unsigned short nCmdId;
        unsigned short shortnSeq;
    };
    //Variable Length Body//
        Protoalbuf    //data in binary//
```

Each data packet includes a Request, Response, or Push Request, and each Request, Response, and Push Request includes a respective command ID that corresponds to a respective function (e.g., authentication, get contact list, start chat session, set up a group chat session, send a message, send an image, playback a voice message etc.) provided by the social network application.

When the data packet is transmitted over a connection that supports variable length data packet, the data packet length field allows the recipient to determine when the end of a whole data packet has been reached. The other fields of the header information allows the recipient to know how to process the data contained with the body of the data packet, e.g., to forward it further, to unpack and execute a command contained within, to executed a requested function using the parameters contained within, or to translate or convert the data within to a different format, etc.

If the connection is a Bluetooth Low Energy connection, the data are sent through exposed characteristics which means only small portions of data can be sent through each data transfer operation. In order to transmit variable length data packets that are larger than the data size limit set by the characteristics, a method for simulating a continuous data stream using the data transfer operation(s) through exposed characteristics is needed.

FIG. 9A shows the simplified flow of operations performed by a peripheral device and a user device when a data packet (e.g., a Request) is sent from the peripheral device to the user device. FIG. 9B shows the simplified flow of operations performed by the peripheral device and the user device when a data packet (e.g., a Push Request or a Response) is sent from the user device to the peripheral device. Since the Bluetooth Low Energy connection allows data transmission and receipt to be done in a duplex manner, the process shown in FIGS. 9A and 9B may be performed in a multiplex fashion without interference with one another.

In some embodiments, when a peripheral device is connected to a user device via a Bluetooth Low Energy connection, the peripheral device exposes the preset UUID (e.g., 0xFEC6) for the service of the social networking client application, and two preset characteristics (e.g., UUID: 0xFEC7 and UUID:xFEC8). One characteristic (e.g., 0xFEC7) is for accepting data from the user device (i.e., the characteristic for reading data), it has the "write" property enabled. The other characteristic (e.g., 0xFEC8) is for sending data to the user device (i.e., the characteristic for writing data), and it has the "indicate" property enabled. The user device detects and subscribes to these two exposed characteristics when establishing the connection to the peripheral device. This is illustrated as the first steps in FIGS. 9A and 9B, respectively.

As shown in FIG. 9A, the process for sending data from the peripheral device to the user device includes the following:

(1) The peripheral device obtains the data packet (e.g., a Request) to be sent to another party (e.g., a user, the communication server, the support server, or another peripheral device) via the user device. The data packet follows the format described above.

(2) The peripheral determines the characteristic (e.g., the characteristic 0xFEC8 for writing data) that has been exposed to the user device for sending data to the user device.

(3) The peripheral device obtains the size limit of the value contained in exposed characteristic for writing and divides the data packets into one or more frames plus any remainder. The maximum size limit of the value contained in the characteristic is referred to as a frame size. Different characteristics have different maximum size limit for its value. Typically, the size limit for a frame is 20 bytes, while a data packet can be hundreds and thousands of bytes in size.

(4) The peripheral device divides the data packet into a sequence of frames according to the size limit of the exposed characteristic for writing. For example, if a health monitoring wrist band needs to send 1 kilobytes of data to the user device, the data packet has a size of 1024 bytes, the size limit of the value for the characteristic for writing is 20 bytes, then the data packet is divided into a sequence of 51 frames, with a 20 byte frame size, plus a 4 byte remainder at the end.

(4) The peripheral device pads the remainder, if any, to make a full frame.

(5) To send the sequence of full frames (including the padded remainder), the peripheral device writes each frame one by one as the value of the exposed characteristic for writing, and then notify the user device of the updated value. In some embodiments, the characteristic has the "indicate" property enabled, thus, each time, the peripheral device writes a new value (e.g., the next unsent frame in the full frame sequence) to the characteristic for writing, the new value is pushed to the user device. In some embodiments, it is also possible to use "notify" instead of "indicate" as the enabled property for the characteristic for writing. However, "indicate" mode requires a confirmation, and the confirmation allows the peripheral device to know when to send the next unsent frame in the sequence.

(6) On the side of the user device, the user device receives the indication of the updated value in the exposed characteristic for writing.

(7) Once the user device obtains the current value in the exposed characteristic for writing, the user device sends a respective confirmation for the receipt of the value (i.e., the current frame).

(8) Once the peripheral device receives the confirmation that a current frame in the exposed characteristic for writing has been received, the peripheral device writes the next unsent frame as the value for the characteristic for writing, and push the updated value to the user device via the indication mode.

(9) Steps 6-8 are repeated until the peripheral device has finished sending all frames in the full frame sequence.

(10) When the user device receives all of the frames in the full frame sequence, the user device can reassemble the data packet (e.g., the Request).

FIG. 9B shows how a data packet (e.g., a Push Request or a Response) can be transmitted from the user device to the peripheral device via the Bluetooth Low Energy connection.

(1) The user device obtains the data packet (e.g., a Push Request or Response) to be sent to the peripheral device. The data packet follows the format described above.

(2) The user device determines the characteristic (e.g., the characteristic 0xFEC7 for reading data) that has been exposed to the user device for receiving data from the user device. The user device obtains the size limit of the value contained in exposed characteristic for reading.

(4) The peripheral device divides the data packet into a sequence of frames according to the size limit of the exposed characteristic for reading.

(5) If there is any remainder from the frame division above, the peripheral device pads the remainder to make a full frame. The full frames from the frame division and the padding of the remainder forms the full frame sequence for the data packet to be sent to the peripheral device.

(5) To send the sequence of full frames (including the padded remainder), the user device writes each frame one by one as the value of the exposed characteristic for reading. When the current value in the exposed characteristic for reading is acknowledge by the peripheral device, the user device can proceed with writing the next unsent frame to the characteristic.

(6) On the side of the peripheral device, the peripheral device receives a notification that the value of the characteristic has been updated, reads the value and stores it in a read buffer. The peripheral device also optionally sends an acknowledgement for the updated value.

(9) Steps 5-6 are repeated until the user device has finished sending all frames in the full frame sequence.

(10) When the peripheral device receives all of the frames in the full frame sequence, the peripheral device can reassemble the data packet (e.g., the Push Request or Response).

In some embodiments, when data packets (e.g., data packets containing Requests, Responses, and Push Requests) are transmitted between different parties (e.g., peripheral devices, user devices, the communication server, and support servers) of the social network environment, the data packet may be sent in sequence and may also be sent out of order depending on the particular implementations. In some embodiments, sending and receiving data packets can be done in a duplex fashion. When a device is in the process of sending a data packet, the device may receive a data packet at any time.

In some embodiments, it is required that a peripheral device can only send the next data packet to the user device when the immediate proceeding data packet has been received. Correspondingly, it is required that the user device can only send the next data packet to the peripheral device when the immediate proceeding data packet has been received by the peripheral device. On the peripheral device, there is a sequence for outgoing data packets, and there is also a sequence for incoming data packets. The sequence for the outgoing data packets includes the packets containing Requests, and the sequence for the incoming data packets includes the packets containing Push Requests and Responses.

In some embodiments, the data packet transmission between the user device and the communication server is also duplex. In other words, when the user device is sending a packet to the communication server, the user device may also receive a data packet from the communication server at any time. The user device can send multiple data packets at the same time. For example, the user device may send a data packet with a request for downloading an image, but before the data packet containing the response for the request, the user device can also send another data packet with a request for downloading a speech message. As such, it is common to have data packets that are out of order. In some embodiments, sequential data transmission is optionally implemented, where when a data packet containing a Request is sent, the user device waits for the data packet containing the corresponding Response. The transmission of the data packet for the next Request is not started until the Response for the immediate proceeding Request has been received.

In some embodiments, the sequence number for a data packet containing a Push Request is always set to zero, while the sequence numbers for data packets containing Requests and Responses are never zero.

In some embodiments, the communication server and the support server can send out a Push Request at any time. In some embodiments, if the support server needs a response for a particular Push Request, the support server can includes the request for response in the body of the Push Request, such that the peripheral device receiving the Push Request can send the requested response in a subsequent Request. The body of the Request can reference the previously received Push Request from the support server.

Figure 10A:
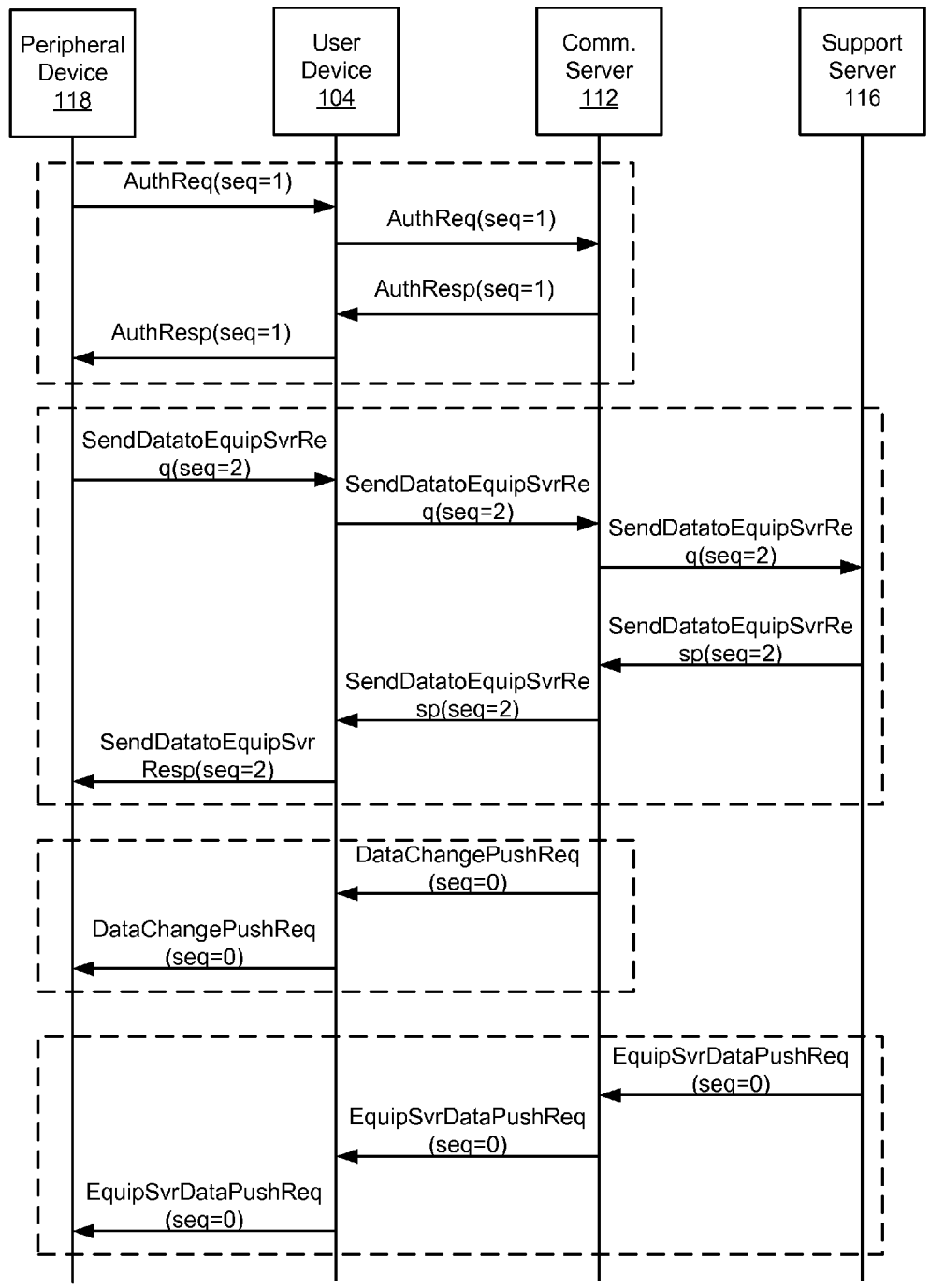
FIGS. 10A-10C are block diagrams illustrating an exemplary message transmission processes between a peripheral device, a user device, a communication server, and a support server in accordance with some embodiments.
Figure 10B:
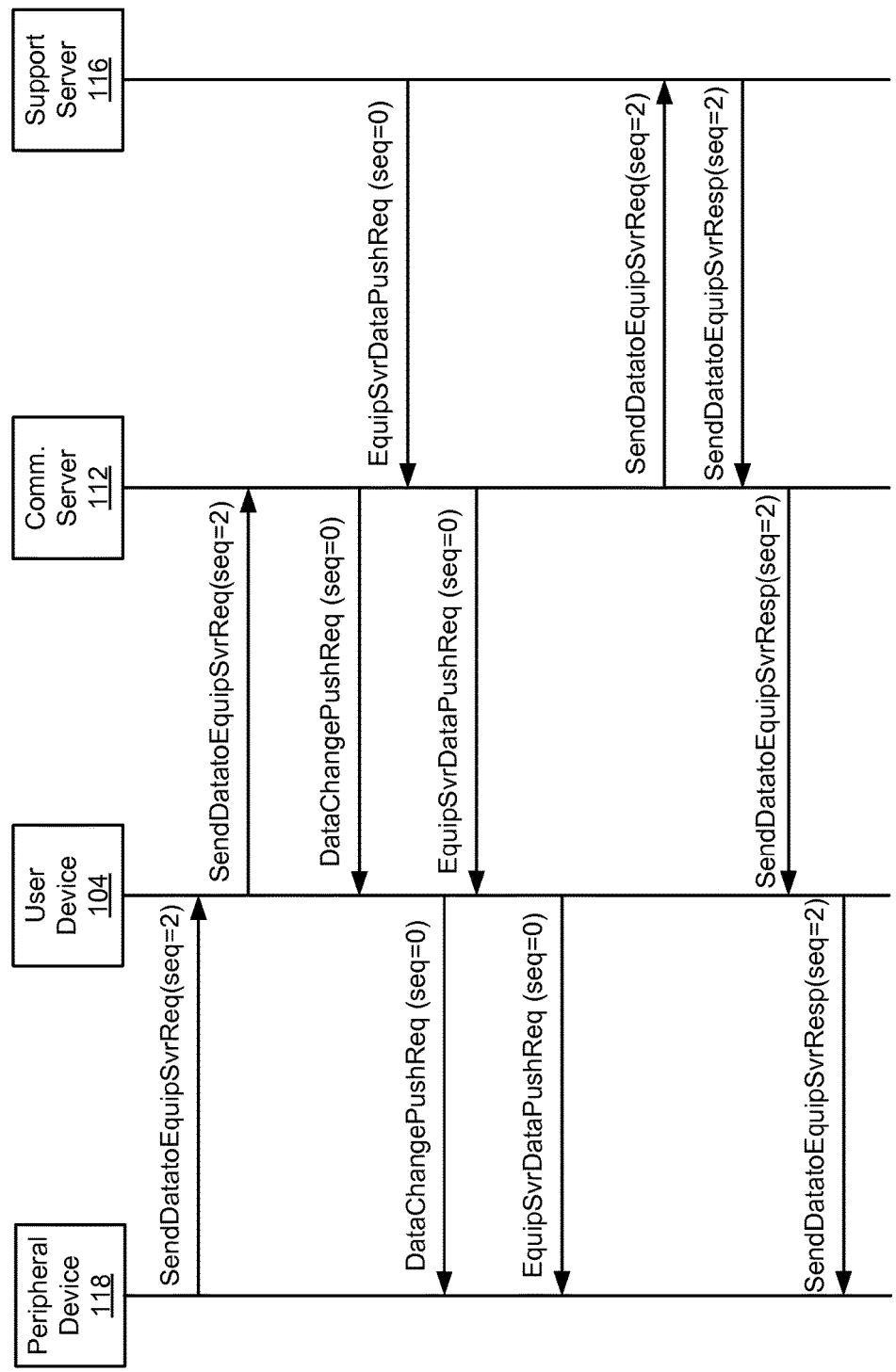
Figure 10C:
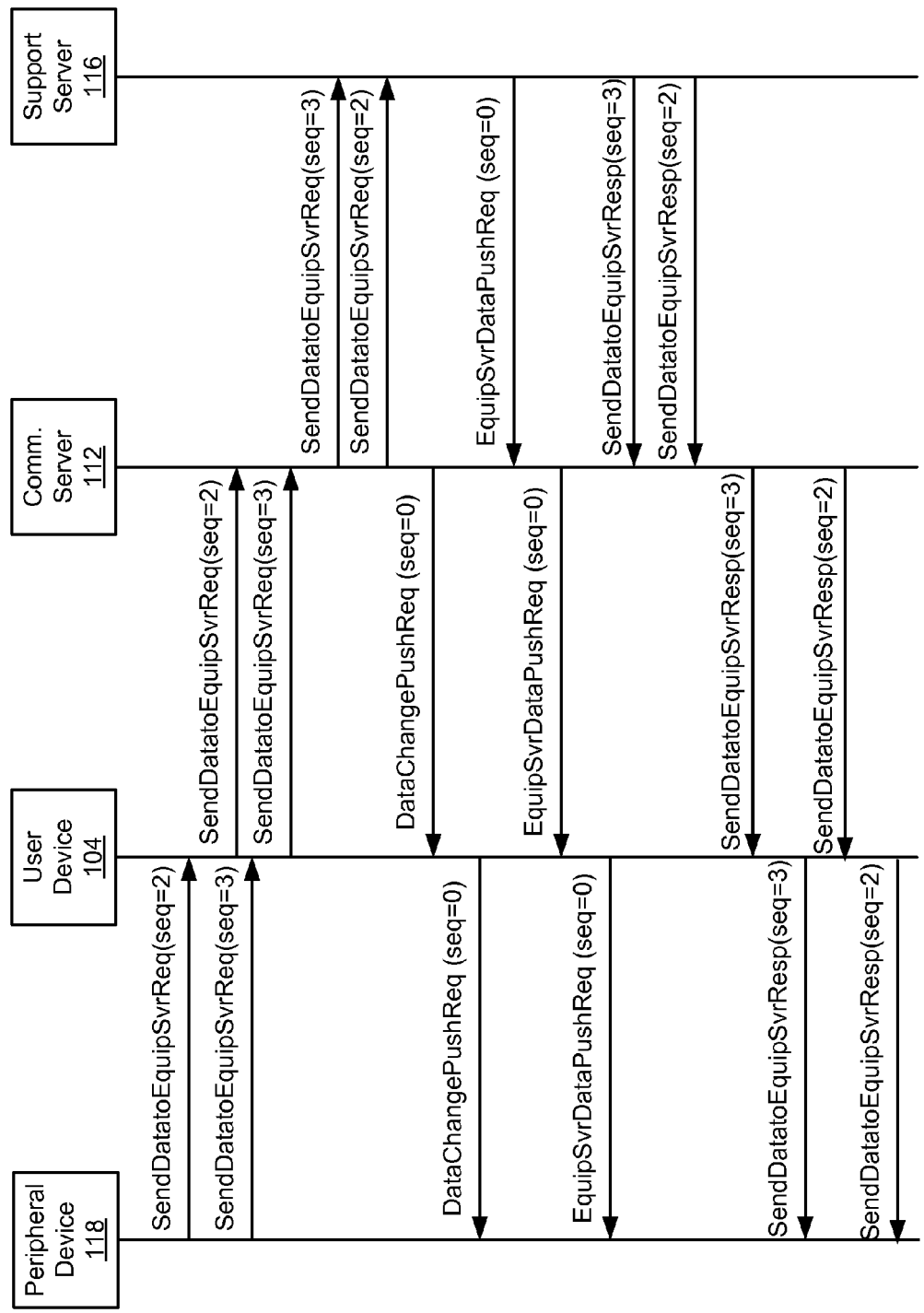

FIGS. 10A-10C are block diagrams illustrating an exemplary data transmission processes between a peripheral device, a user device, a communication server, and a support server in accordance with some embodiments.

As shown in FIG. 10A, a Request (AuthReq(seq=1)) is sent from the peripheral device to the user device, and forwarded by the user device to the communication server. A Response to the Request (AuthResp(seq=1)) is send back by the communication server to the user device, and forwarded from the user device to the peripheral device.

Also shown in FIG. 10A, another Request (SendDataEquipSvrReq(seq=2)) is sent from the peripheral device, and forwarded to the support server through the user device and the communication server. The Response for this second Request (SendDatatoEquipSvrResp(seq=2)) is sent back by the support server to the peripheral device through the communication server and the user device.

Also shown in FIG. 10A, the communication server can send a Push Request (DataChangePushReq(seq=0)) to the peripheral device through the user device at any time.

Similarly, the support server can also send a Push Request (EquipSvrDataPushReq(seq=0)) to the peripheral device through the communication server and the user device at any time.

FIG. 10B shows that the communication server may insert a Push Request (e.g., DataChangePushReq(seq=0)) at any time, and the Push Request (e.g., DataChangePushReq (seq=0)) may be sent to the peripheral device (via the user device) before a Response (e.g., SendDatatoEquipSvrResp (seq=2)) for a previously received Request (SendDataEquipSvr(seq=2)) has been sent back to the peripheral device.

FIG. 10B also shows that the communication server may insert a Push Request (e.g., EquipSvrDataPushReq(seq=0)) at any time. The Push Request (e.g., Equip SvrDataPushReq (seq=0)) may be a Push Request received from the communication server, and the communication server may optionally send it to the peripheral device (via the user device) before a Response (e.g., SendDatatoEquipSvrResp(seq=2)) for a previously received Request (SendDataEquipSvr (seq=2)) has been sent back to the peripheral device.

FIG. 10C illustrates that, when there are multiple data packets containing Requests being sent from the peripheral device to the communication server and the support server, these data packets may arrive at the support server out of order (e.g., "SendDatatoEquipSvrReq(seq=3) arrives at the support server before "SendDatatoEquipSvrReq(seq=2))." Consequently, the Responses for the out-of-order Requests may also be out of order (e.g., "SendDatatoEquipSvrResp (seq=3) arrives at the communication server, the user device, and the peripheral device before "SendDatatoEquipSvrResp (seq=2)).

Figure 11A:
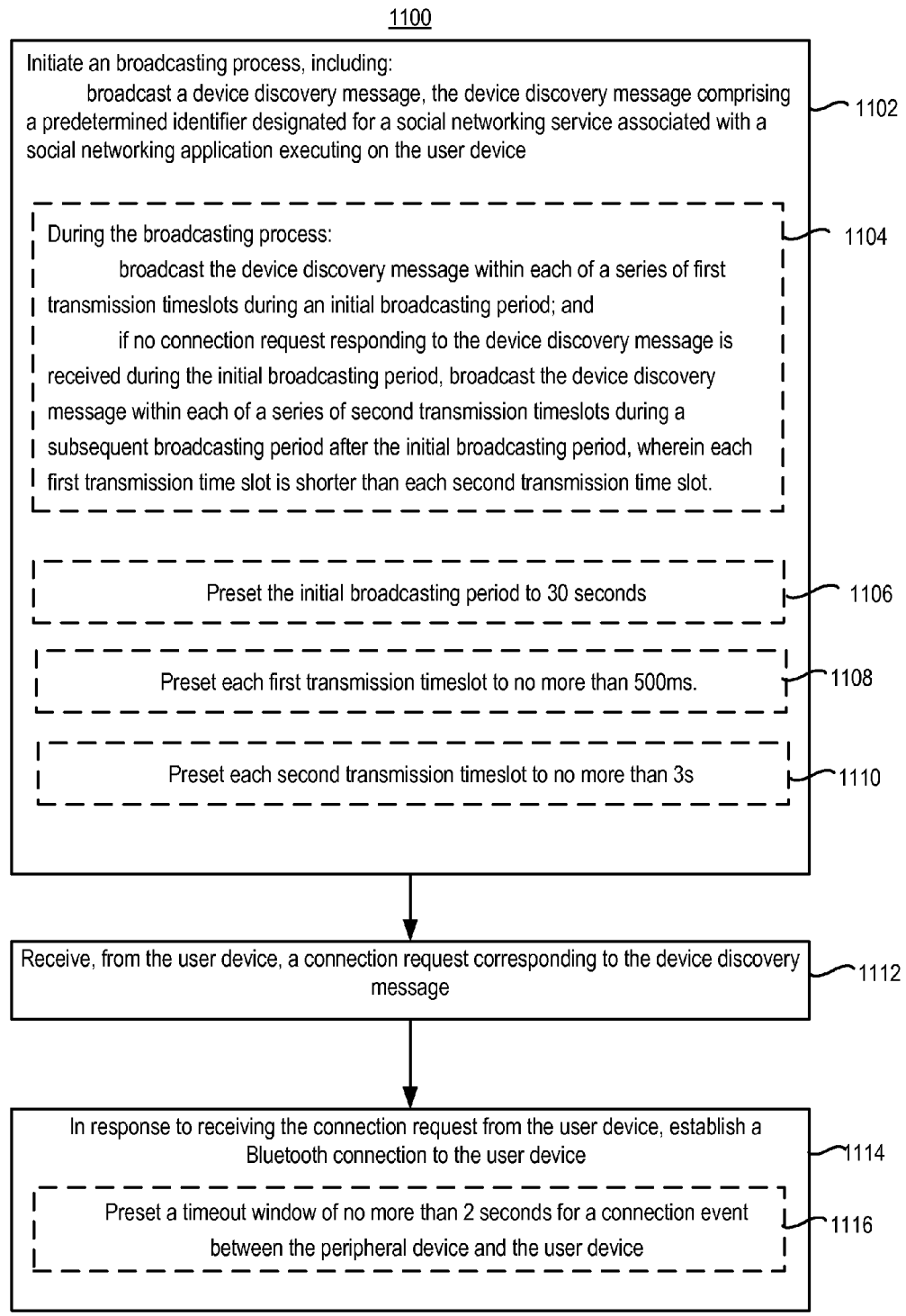
FIGS. 11A-11B are flow charts for an exemplary Bluetooth connection process performed by a peripheral device in accordance with some embodiments.
Figure 11B:
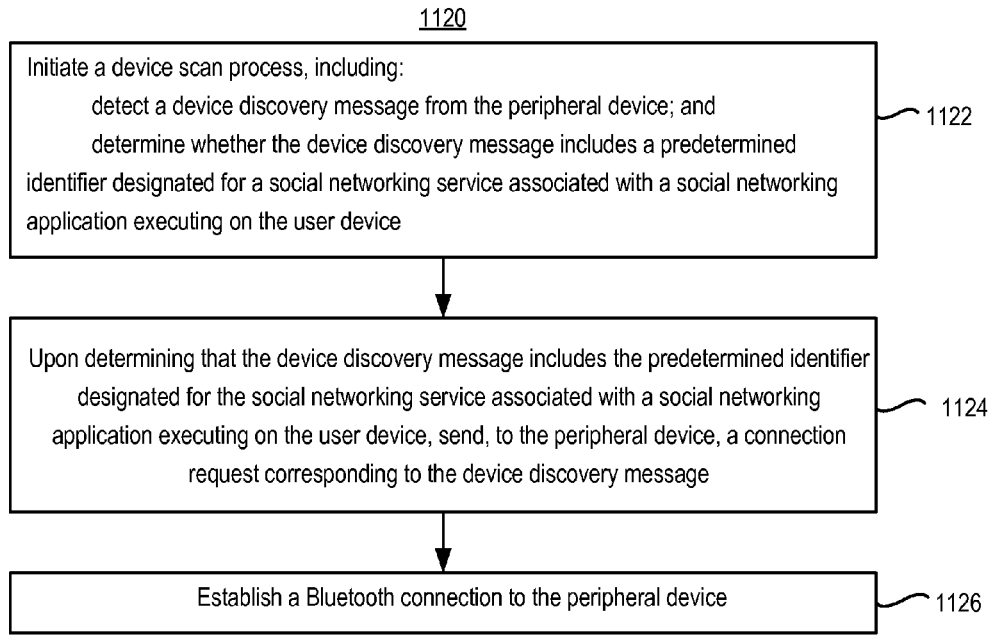

FIG. 11A is a flow chart for an exemplary Bluetooth connection process 1100 performed by a peripheral device in accordance with some embodiments.

In some embodiments, the method for connecting a peripheral device to a user device via a Bluetooth connection is performed by the peripheral device. In some embodiments, the peripheral device initiates (1102) an broadcasting process, including: broadcasting a device discovery message, the device discovery message comprising a predetermined identifier designated for a social networking service associated with a social networking application executing on the user device. The peripheral device receives (1112), from the user device, a connection request corresponding to the device discovery message. In response to receiving the connection request from the user device, the peripheral device establishes (1114) a Bluetooth connection to the user device.

In some embodiments, during the broadcasting process: the peripheral device broadcasts (1104) the device discovery message within each of a series of first transmission timeslots during an initial broadcasting period; and if no connection request responding to the device discovery message is received during the initial broadcasting period, broadcasting the device discovery message within each of a series of second transmission timeslots during a subsequent broadcasting period after the initial broadcasting period, wherein each first transmission time slot is shorter than each second transmission time slot. In some embodiments, the peripheral device presets (1106) the initial broadcasting period to 30 seconds. In some embodiments, the peripheral device presets (1108) each first transmission timeslot to no more than 500 ms. In some embodiments, the peripheral device presets (1110) each second transmission timeslot to no more than 3 s. In some embodiments, the peripheral device presets each first transmission timeslot to 500 ms. In some embodiments, the peripheral device presets each second transmission timeslot to 3 s.

In some embodiments, the peripheral device presets (1116) a timeout window of no more than 2 seconds for a connection event between the peripheral device and the user device. In some embodiments, the peripheral device presets a timing gap of 30 ms between two consecutive connection events.

In some embodiments, the predetermined identifier is designated by a supplier of the social networking application for a primary service of the social networking application.

FIG. 11A is a flow chart for an exemplary Bluetooth connection process 1120 performed by a user device in accordance with some embodiments. The process 1120 corresponds to the process 1100. Therefore, the features described with respect to the various timing parameters also apply to the process 1120.

In some embodiments, the user device initiates (1122) a device scan process, including: detecting a device discovery message from the peripheral device; and determining whether the device discovery message includes a predetermined identifier designated for a social networking service associated with a social networking application executing on the user device. Upon determining that the device discovery message includes the predetermined identifier designated for the social networking service associated with a social networking application executing on the user device, the user device sends (1124), to the peripheral device, a connection request corresponding to the device discovery message, and establishes (1126) a Bluetooth connection to the peripheral device.

Other features and aspects for the above exemplary process are provided in other parts of the present disclosure.

Figure 12A:
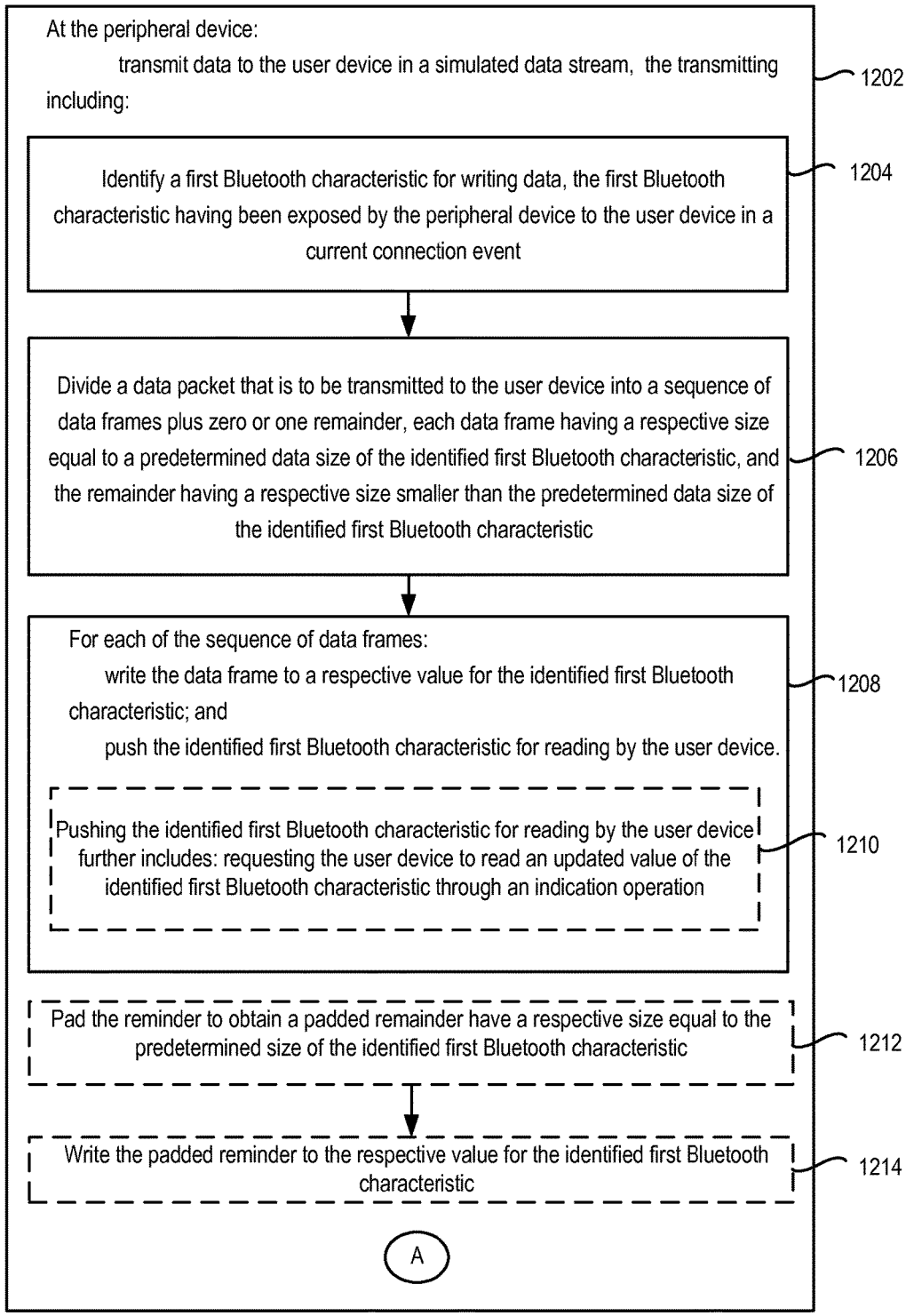
FIGS. 12A-12B are flow charts for an exemplary process for transmitting a data packet between a peripheral device and a user device in accordance with some embodiments.
Figure 12B:
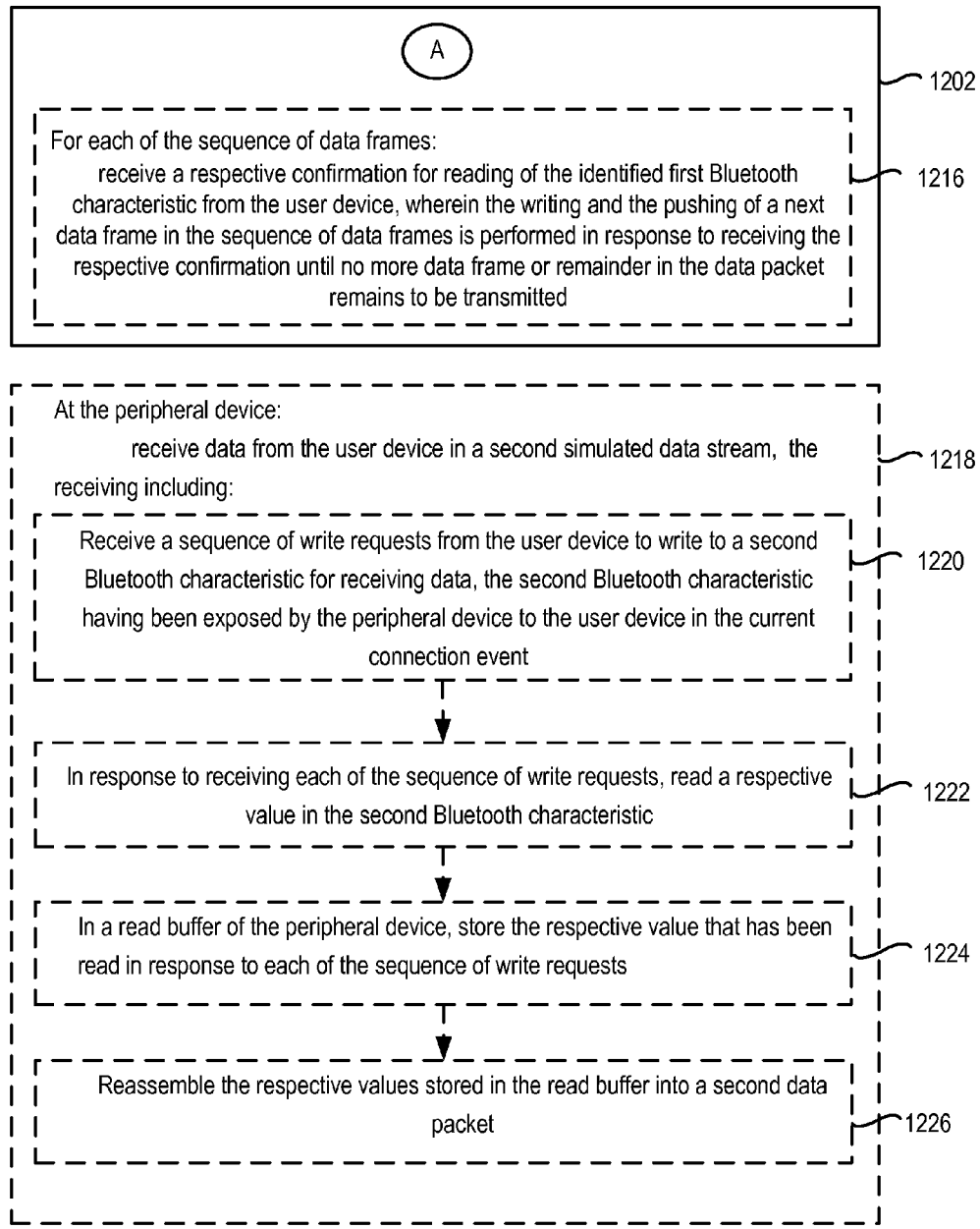

FIGS. 12A-12B are flow charts for an exemplary process 1200 for transmitting data packets between a peripheral device and a user device in accordance with some embodiments. The process 1200 is performed by the peripheral device that has been connected to the user device via a Bluetooth Low Energy connection.

In some embodiments, the peripheral device transmits (1202) data (e.g., a data packet containing a Request) to the user device in a simulated data stream. To transmit the data in the simulated data stream: the peripheral device identifies (1204) a first Bluetooth characteristic for writing data (e.g., a Bluetooth characteristic with the "indicate" property enabled), the first Bluetooth characteristic having been exposed by the peripheral device to the user device in a current connection event. The peripheral device divides (1206) a data packet (e.g., a total of 1024 bytes) that is to be transmitted to the user device into a sequence of data frames (e.g., 51 frames) plus zero or one remainder, each data frame having a respective size (e.g., 20 bytes) equal to a predetermined data size (e.g., 20 bytes) of the identified first Bluetooth characteristic, and the remainder (e.g., 4 bytes) having a respective size smaller than the predetermined data size of the identified first Bluetooth characteristic.

In some embodiments, for each of the sequence of data frames: the peripheral device writes (1028) the data frame to a respective value for the identified first Bluetooth characteristic; and pushes the identified first Bluetooth characteristic for reading by the user device. In some embodiments, pushing the identified first Bluetooth characteristic for reading by the user device further includes (1210) requesting the user device to read an updated value of the identified first Bluetooth characteristic through an indication operation.

In some embodiments, the peripheral device pads (1212) the reminder (if any) to obtain a padded remainder have a respective size (e.g., 20 bytes) equal to the predetermined size (e.g., 20 bytes) of the identified first Bluetooth characteristic. The peripheral device writes (1214) the padded reminder to the respective value for the identified first Bluetooth characteristic. The peripheral device pushes the identified first Bluetooth characteristic for reading by the user device.

In some embodiments, for each of the sequence of data frames: the peripheral device receives (1216) a respective confirmation for reading of the identified first Bluetooth characteristic from the user device, wherein the writing and the pushing of a next data frame in the sequence of data frames is performed in response to receiving the respective confirmation until no more data frame or remainder in the data packet remains to be transmitted.

In some embodiments, the user device reassembles the respective values read from the identified first Bluetooth characteristic into the data packet.

In some embodiments, the data packet includes a message originated from the peripheral device and targeting a support service provider of the peripheral device. In some embodiments, the data packet includes a message originated from the peripheral device and targeting a user of the user device. In some embodiments, the data packet includes a message originated from the peripheral device and targeting a social network contact of a user of the user device. In some embodiments, the social network contact of the user of the user device is another user. In some embodiments, the social network contact of the user of the user device is another peripheral device.

In some embodiments, the peripheral device receives (1218) data from the user device in a second simulated data stream. To receive the data from the user device in the second simulated data stream, the peripheral device receives (1220) a sequence of write requests from the user device to write to a second Bluetooth characteristic for receiving data, the second Bluetooth characteristic having been exposed by the peripheral device to the user device in the current connection event. In response to receiving each of the sequence of write requests, the peripheral device reads (1222) a respective value in the second Bluetooth characteristic. In a read buffer of the peripheral device, the peripheral device stores (1224) the respective value that has been read in response to each of the sequence of write requests. The peripheral device reassembles (1226) the respective values stored in the read buffer into a second data packet.

In some embodiments, the second data packet is an instruction originated from a support service provider of the peripheral device and targeting the peripheral device. In some embodiments, the second data packet is an instruction originated from a communication server of a social network client application executing on the user device, and targeting the peripheral device. In some embodiments, the second data packet is a response for a previous request sent by the peripheral device.

Figure 13A:
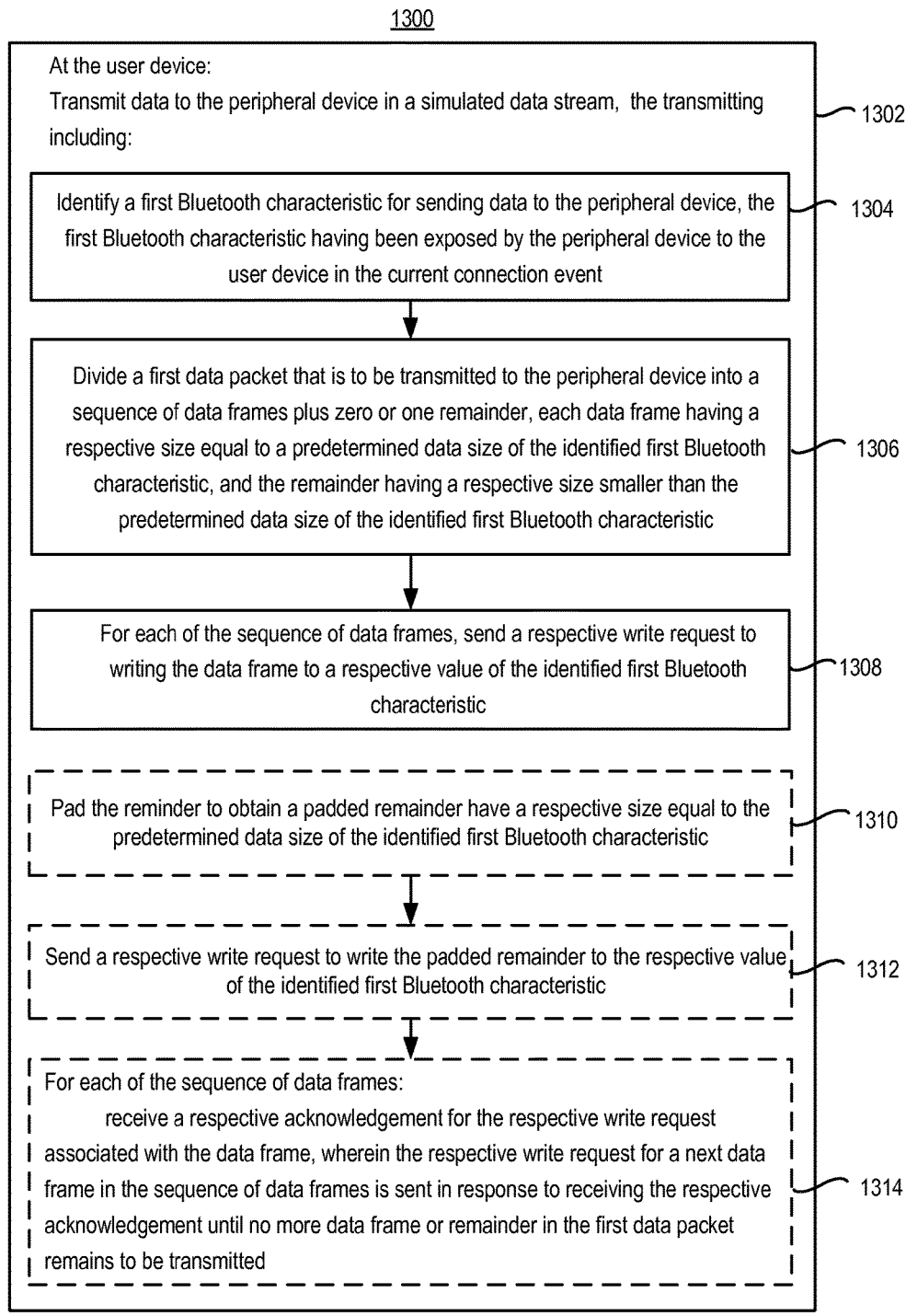
FIGS. 13A-13B are flow charts for an exemplary process for transmitting a data packet between a peripheral device and a user device in accordance with some embodiments.
Figure 13B:
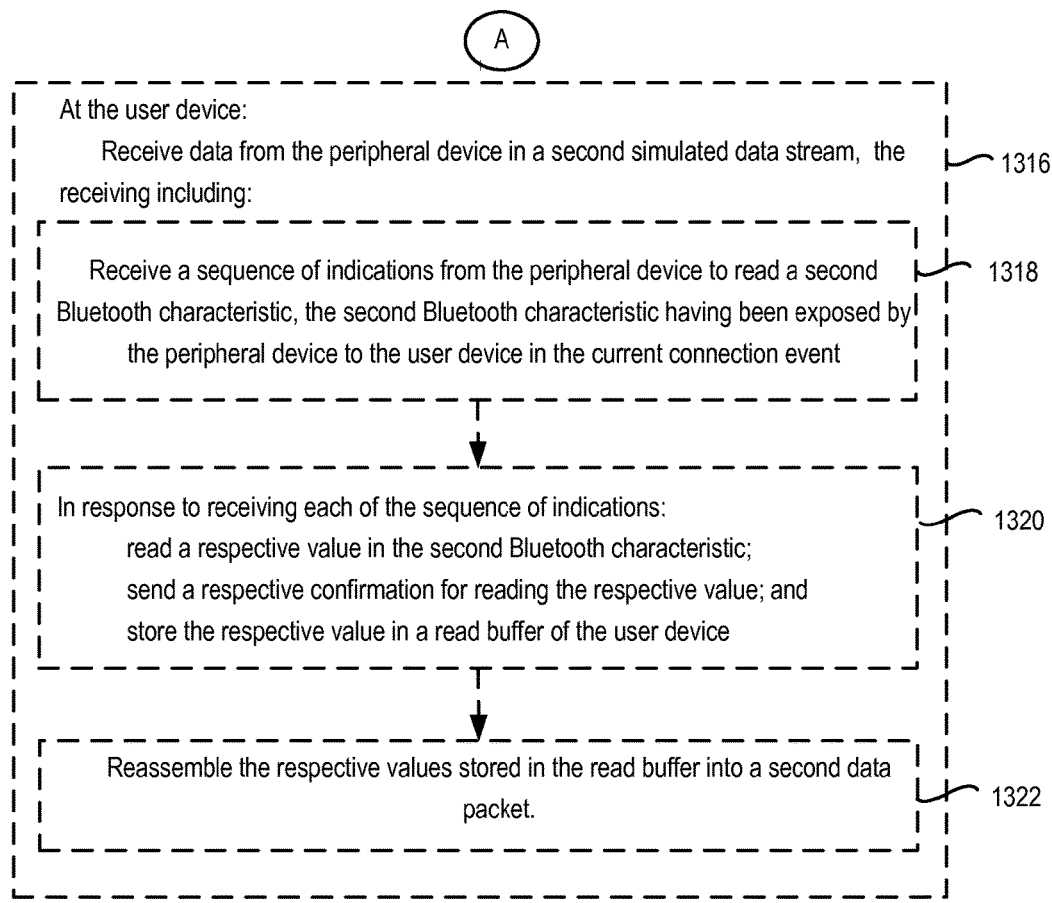

FIGS. 13A-13B are flow charts for an exemplary process 1300 for transmitting data packets between a peripheral device and a user device in accordance with some embodiments. The process 1300 is performed by the user device that has been connected to the peripheral device via a Bluetooth Low Energy connection.

In some embodiments, the user device transmits (1302) data to the peripheral device in a simulated data stream. To transmit the data in the simulated data stream, the user device identifies (1304) a first Bluetooth characteristic (e.g., the characteristic with the writing property enabled) for sending data to the peripheral device, the first Bluetooth characteristic having been exposed by the peripheral device to the user device in the current connection event. The user device divides (1306) a first data packet that is to be transmitted to the peripheral device into a sequence of data frames plus zero or one remainder, each data frame having a respective size equal to a predetermined data size of the identified first Bluetooth characteristic, and the remainder having a respective size smaller than the predetermined data size of the identified first Bluetooth characteristic. For each of the sequence of data frames, the user device sends (1308) a respective write request to writing the data frame to a respective value of the identified first Bluetooth characteristic.

In some embodiments, if there is a remainder after the frame division, the user device pads (1310) the reminder to obtain a padded remainder have a respective size equal to the predetermined data size of the identified first Bluetooth characteristic. The user device also sends (312) a respective write request to write the padded remainder to the respective value of the identified first Bluetooth characteristic.

In some embodiments, for each of the sequence of data frames: the user device receives (1314) a respective acknowledgement for the respective write request associated with the data frame, wherein the respective write request for a next data frame in the sequence of data frames is sent in response to receiving the respective acknowledgement until no more data frame or remainder in the first data packet remains to be transmitted.

In some embodiments, the peripheral device reassembles the respective data values written to the identified first Bluetooth characteristic into the first data packet. In some embodiments, the first data packet includes an instruction originated from a support service provider of the peripheral device and targeting the peripheral device. In some embodiments, the first data packet includes an instruction originated from a communication server of a social networking client application executing on the peripheral device.

In some embodiments, the user device receives (1316) data from the peripheral device in a second simulated data stream. To receive the data in the second simulated data stream: the user device receives (1318) a sequence of indications from the peripheral device to read a second Bluetooth characteristic (e.g., the characteristic with the indicate property enabled), the second Bluetooth characteristic having been exposed by the peripheral device to the user device in the current connection event. In response to receiving each of the sequence of indications: the user device reads (1320) a respective value in the second Bluetooth characteristic, sends a respective confirmation for reading the respective value; and stores the respective value in a read buffer of the user device. The user device reassembles (1322) the respective values stored in the read buffer into a second data packet.

In some embodiments, the second data packet includes a message originated from the peripheral device and targeting a support service provider of the peripheral device. In some embodiments, the second data packet includes a message originated from the peripheral device targeting a user of the user device. In some embodiments, the second data packet is a message originated from the peripheral device and targeting a social network contact of a user of the user device.

Other aspects and features of the processes shown in FIGS. 12A-12B, and 13A-13B are described in other parts of the present disclosure.

FIGS. 14A-14B are flow charts for an exemplary process 1400 for transmitting messages (e.g., data packets containing respective Requests, Response, and Push Requests) for access and controlling a peripheral device over a social networking platform in accordance with some embodiments.

In some embodiments, the process 1400 is performed at a server (e.g., a support server) of a support service provider for a type of peripheral devices including the peripheral device.

In some embodiments, the support server registers (1402) with a server of the social network platform as the support service provider for the peripheral device. The support server initiates (1404) a communication event to send an instruction to the peripheral device, initiating the communication event including: generating a push request data packet for the instruction, wherein the push request data packet identifies the peripheral device as a target of the instruction; and sending the push request data packet to the peripheral device via the server of the social networking platform and a user device coupled to the peripheral device. In some embodiments, the push request data packet does not require a response from the target of the instruction and the method further includes concluding the communication event after sending the request data packet without receiving any response for the push request data packet from the peripheral device.

In some embodiments, the support server receives (1406) a request data packet from the peripheral device via the user device coupled to the peripheral device and the server of the social networking platform. In response to receiving the request data packet from the peripheral device, the support server sends (1408) a response data packet to the peripheral device via the server of the social networking platform and the user device coupled to the peripheral device.

In some embodiments, the push request data packet, the request data packet, and the response data packet have (1410) a fixed-length packet header, and a variable-length packet body. In some embodiments, the fixed-length packet header includes a predetermined command identifier and a respective packet sequence number. In some embodiments, the response data packet includes a first packet sequence number that matches a second packet sequence number included in the request data packet, and the push request data packet includes a third packet sequence number different from the first and the second packet sequence number.

In some embodiments, the predetermined command identifier corresponds to a command for accessing a respective function of a social network platform. In some embodiments, the command is for accessing a user authentication function of the social network platform, and the packet body specifying a type of user identity assigned to the peripheral device on the social network platform. In some embodiments, the command is for accessing a contact listing for the peripheral device on the social network platform, and the packet body specifying at least one contact representing a user, a support service provider, or another peripheral device. In some embodiments, the command is for accessing a messaging function on the social network platform, and the packet body specifying a message targeting at least one contact representing a user, a support service provider, or another peripheral device. In some embodiments, the command is for accessing a messaging function on the social network platform, and the packet body specifying a message originated from at least one contact representing a user, a support service provider, or another peripheral device. In some embodiments, the command is for accessing a messaging function on the social network platform, and the packet body specifying a message targeting at least one contact representing a user, a support service provider, or another peripheral device. In some embodiments, the command is for accessing a group chat function on the social network platform, and the packet body specifying a group chat session between the peripheral device and two or more respective social network contacts of the peripheral device, including two or more of a plurality of users, a support service provider, and a plurality of other peripheral devices. In some embodiments, the command is for accessing a conversation log function on the social network platform, and the packet body specifying a conversation log for a chat session between the peripheral device and one or more respective social network contacts of the peripheral device, including one or more of a plurality of users, a support service provider, and a plurality of other peripheral devices. Other types of commands are described in other parts of the present disclosure or may be apparent in light of the usage examples provided in the present disclosure.

Other aspects and features of the processes shown in FIGS. 14A-14B are described in other parts of the present disclosure.

Figure 15A:
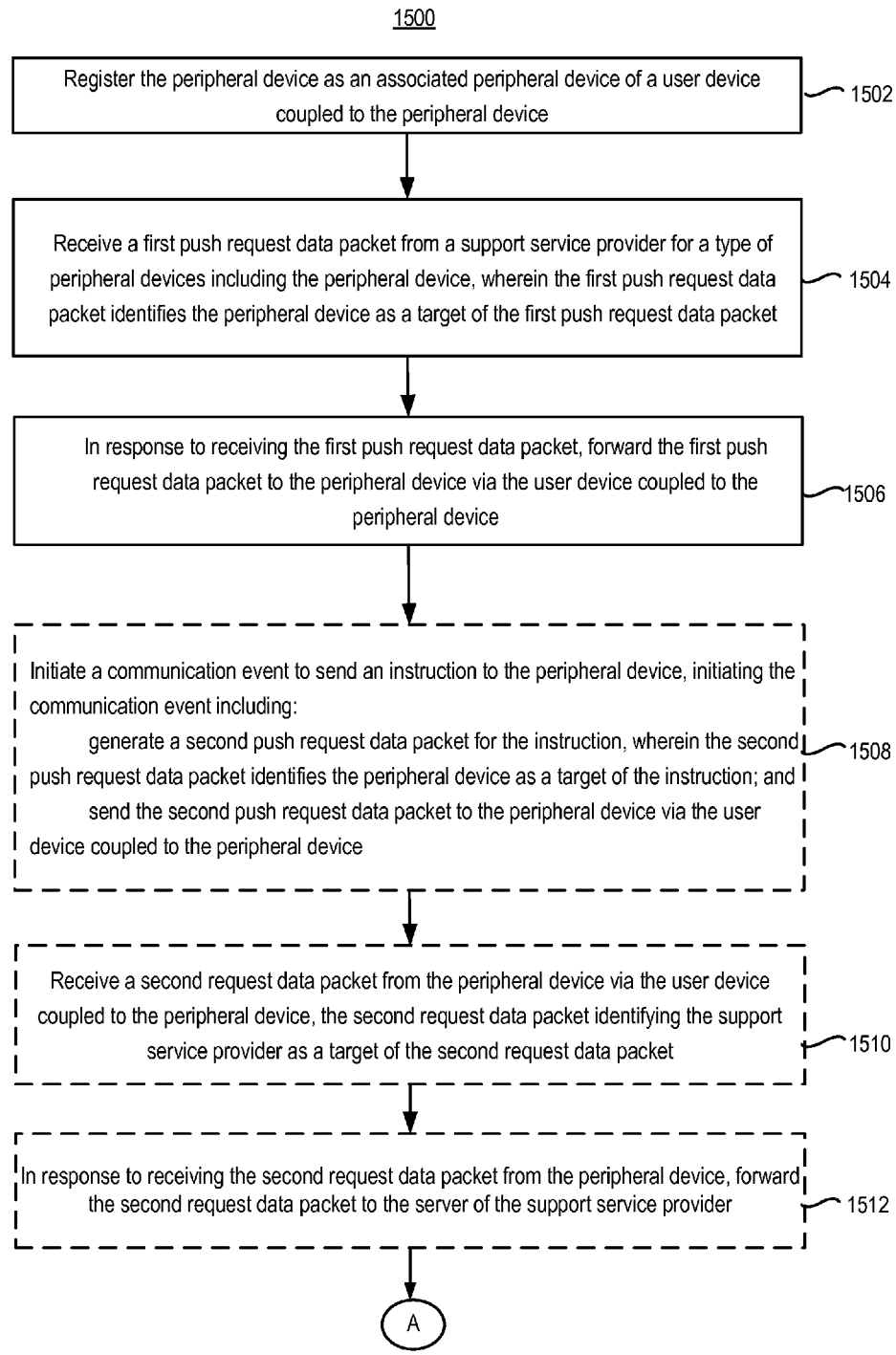
FIGS. 15A-15B are flow charts for an exemplary process for transmitting messages for access and controlling a peripheral device over a social networking platform in accordance with some embodiments.
Figure 15B:
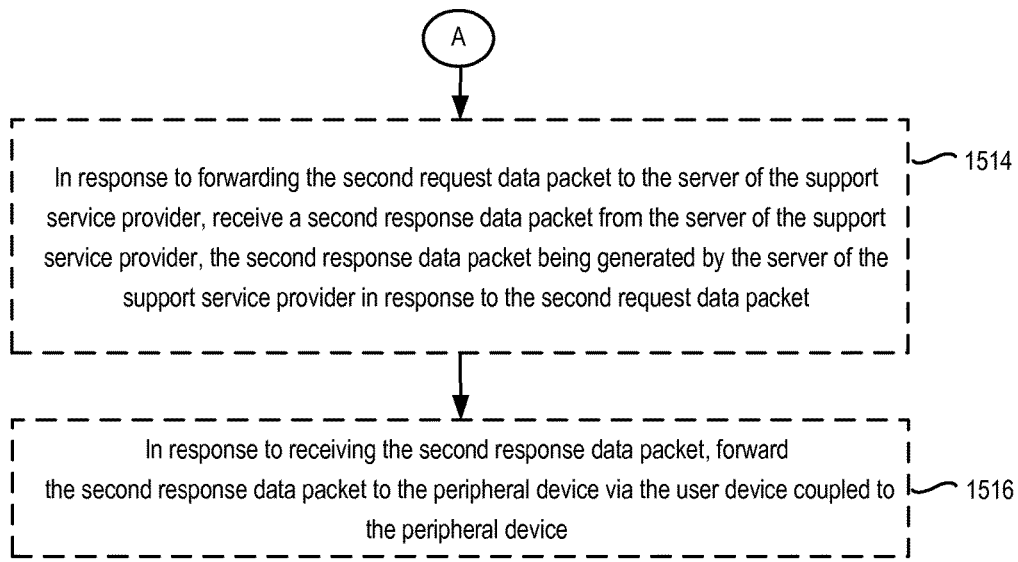

FIGS. 15A-15B are flow charts for an exemplary process 1500 for transmitting messages (e.g., data packets containing respective Requests, Response, and Push Requests) for access and controlling a peripheral device over a social networking platform in accordance with some embodiments.

In some embodiments, the process 1500 is performed at a server (e.g., a communication server) of a social network platform.

In some embodiments, the communication server registers (1502) the peripheral device as an associated peripheral device of a user device coupled to the peripheral device. The communication server receives (1504) a first push request data packet from a support service provider for a type of peripheral devices including the peripheral device, wherein the first push request data packet identifies the peripheral device as a target of the first push request data packet. In response to receiving the first push request data packet, the communication server forwards (1506) the first push request data packet to the peripheral device via the user device coupled to the peripheral device. In some embodiments, the first push request data packet does not require a response from the target of the instruction.

In some embodiments, the communication server initiates (1508) a communication event to send an instruction to the peripheral device, initiating the communication event comprising: generating a second push request data packet for the instruction, wherein the second push request data packet identifies the peripheral device as a target of the instruction; and sending the second push request data packet to the peripheral device via the user device coupled to the peripheral device. In some embodiments, the second push request data packet does not require a response from the target of the instruction, and the method further includes concluding the communication event after sending the second push request data packet without receiving any response for the second push request data packet from the peripheral device.

In some embodiments, the communication server receives (1510) a second request data packet from the peripheral device via the user device coupled to the peripheral device, the second request data packet identifying the support service provider as a target of the second request data packet. In response to receiving the second request data packet from the peripheral device, the communication server forwards (1512) the second request data packet to the server of the support service provider. In some embodiments, in response to forwarding the second request data packet to the server of the support service provider, the communication server receives a second response data packet from the server of the support service provider, the second response data packet being generated by the server of the support service provider in response to the second request data packet. In response to receiving the second response data packet, the communication server forwards (1516) the second response data packet to the peripheral device via the user device coupled to the peripheral device.

In some embodiments, the push request data packet, the request data packet, and the response data packet have (1410) a fixed-length packet header, and a variable-length packet body. In some embodiments, the fixed-length packet header includes a predetermined command identifier and a respective packet sequence number. In some embodiments, the response data packet includes a first packet sequence number that matches a second packet sequence number included in the request data packet, and the push request data packet includes a third packet sequence number different from the first and the second packet sequence number.

In some embodiments, the predetermined command identifier corresponds to a command for accessing a respective function of a social network platform. In some embodiments, the command is for accessing a user authentication function of the social network platform, and the packet body specifying a type of user identity assigned to the peripheral device on the social network platform. In some embodiments, the command is for accessing a contact listing for the peripheral device on the social network platform, and the packet body specifying at least one contact representing a user, a support service provider, or another peripheral device. In some embodiments, the command is for accessing a messaging function on the social network platform, and the packet body specifying a message targeting at least one contact representing a user, a support service provider, or another peripheral device. In some embodiments, the command is for accessing a messaging function on the social network platform, and the packet body specifying a message originated from at least one contact representing a user, a support service provider, or another peripheral device. In some embodiments, the command is for accessing a messaging function on the social network platform, and the packet body specifying a message targeting at least one contact representing a user, a support service provider, or another peripheral device. In some embodiments, the command is for accessing a group chat function on the social network platform, and the packet body specifying a group chat session between the peripheral device and two or more respective social network contacts of the peripheral device, including two or more of a plurality of users, a support service provider, and a plurality of other peripheral devices. In some embodiments, the command is for accessing a conversation log function on the social network platform, and the packet body specifying a conversation log for a chat session between the peripheral device and one or more respective social network contacts of the peripheral device, including one or more of a plurality of users, a support service provider, and a plurality of other peripheral devices. Other types of commands are described in other parts of the present disclosure or may be apparent in light of the usage examples provided in the present disclosure.

Figure 16:
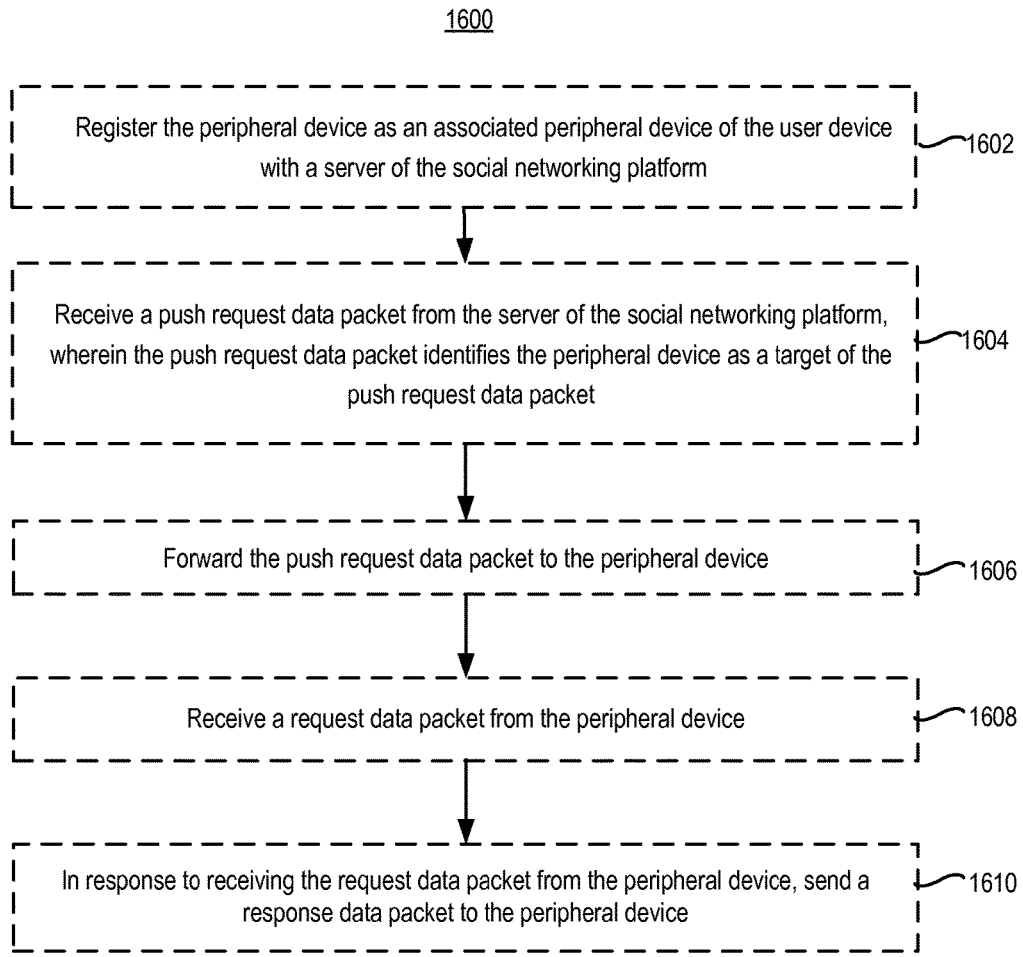
FIG. 16 is a flow chart for an exemplary process for transmitting messages for access and controlling a peripheral device over a social networking platform in accordance with some embodiments.

Other aspects and features of the processes shown in FIGS. 15A-15B are described in other parts of the present disclosure FIG. 16 is a flow chart for an exemplary process 1600 for transmitting messages (e.g., data packets containing respective Requests, Response, and Push Requests) for access and controlling a peripheral device over a social networking platform in accordance with some embodiments.

In some embodiments, the process 1600 is performed by a user device coupled to the peripheral device.

In some embodiments, the user device registers (1602) the peripheral device as an associated peripheral device of the user device with a server of the social networking platform. The device receives (1604) a push request data packet from the server of the social networking platform, wherein the push request data packet identifies the peripheral device as a target of the push request data packet. In some embodiments, the push request data packet does not require a response from the target of the push request data packet. The user device forwards (1606) the push request data packet to the peripheral device. In some embodiments, the user device receives (1608) a request data packet from the peripheral device; and in response to receiving the request data packet from the peripheral device, the user device sends (1610) a response data packet to the peripheral device.

Other aspects and features of the processes shown in FIGS. 14A-14B are described in other parts of the present disclosure.

FIGS. 17-20 are block diagrams of various devices and systems operating in the social networking platform in accordance with some embodiments.

Figure 17:
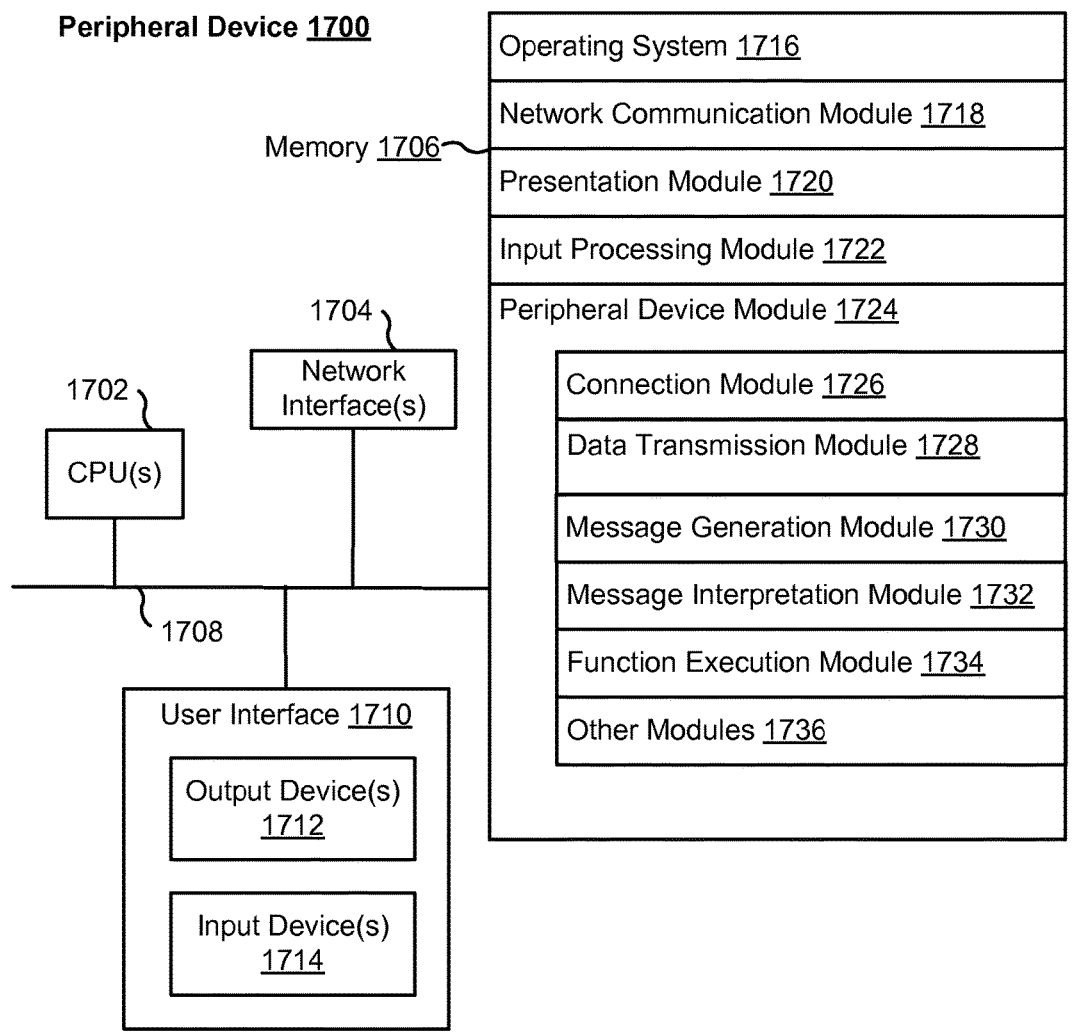
FIGS. 17-20 are block diagrams of various devices and systems operating in the social networking platform in accordance with some embodiments.

FIG. 17 is a block diagram illustrating a representative peripheral device 1700 associated with a user in accordance with some embodiments. Peripheral device 1700 can serve as the peripheral device (e.g., peripheral devices 118 shown in FIGS. 1B, 2K-2T, 8, 9A-9B, 10A-10C, and peripheral device 200 shown in FIG. 2A) that can be controlled and accessed via a social network platform in accordance with the embodiments described in the present disclosure. Examples of the peripheral devices include, but are not limited to, smart watches, health monitors (e.g., heart rate or blood pressure monitors, pacemakers, lifestyle monitoring wristbands, etc.), music players, climate controls (e.g., weather monitors, temperature control, heaters, air conditioners, humidity controls, etc.), lighting controls, security monitoring systems, smart coffee makers, charging stations (e.g., charging station for electric cars or electronic equipments, etc.), navigation systems (e.g., GPS systems), sports equipment (e.g., smart golf clubs, smart fishing poles, smart basketballs, etc.), set-top boxes (e.g., online streaming set-top boxes, online gaming devices, etc.).

Peripheral device 1700, typically, includes one or more processing units (CPUs) 1702, one or more network interfaces 1704, memory 1706, and one or more communication buses 1708 for interconnecting these components (sometimes called a chipset). Peripheral device 1700 also optionally includes a user interface 1710. User interface 1710 includes one or more output devices 1712 that enable presentation of media content, including one or more speakers and/or one or more visual displays. User interface 1710 also includes one or more input devices 1714, including user interface components that facilitate user input such as a keyboard, a mouse, a voice-command input unit or microphone, a touch-screen display, a touch-sensitive input pad, a gesture capturing camera, or other input buttons or controls, etc.

Memory 1706 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 1706, optionally, includes one or more storage devices remotely located from CPU(s) 1702. Memory 1706, or alternately the non-volatile memory device(s) within memory 1706, includes a non-transitory computer readable storage medium. In some implementations, memory 1706, or the non-transitory computer readable storage medium of memory 1706, stores the following programs, modules, and data structures, or a subset or superset thereof:

- an operating system 1716 including procedures for handling various basic system services and for performing hardware dependent tasks;
- a network communication module 1718 for connecting the peripheral device 1700 to other computing devices (e.g., user device 104) via one or more network interfaces 1704 (wired or wireless) (e.g., Bluetooth interface, WiFi, Bluetooth Low Energy, USB, etc.);
- a presentation module 1720 for enabling presentation of information (e.g., a user interface for operating the peripheral device and displaying content and information) at the peripheral device 1700 via one or more output devices 1712 (e.g., displays, speakers, etc.) associated with user interface 1710; and an input processing module 1722 for detecting one or more user inputs or interactions from one of the one or more input devices 1714 and interpreting the detected input or interaction.

In some embodiments, memory 1706 also includes a peripheral device module 1724 for performing data processing for performing native operations of the peripheral device, as well as the operations needed to communicate with other devices and/or users over a social network platform as described herein. In some embodiments, peripheral device module 1724 includes, but is not limited to:

- a connection module 1726, configured to set up a connection with a user device executing a social network client application. The connection module for example, implements the connection protocols described herein for broadcasting a service ID for the social network application, and accepting connection requests from the user device;
- a data transmission module 1728, configured to generating the data packet to be send to the user device, and transmitting the data packet according to the data transmission protocol agreement between the user device and the peripheral device; and configured to receive and re-assemble the data packet from the user device according to the data transmission protocol agreement between the user device and the peripheral device;
- a message generation module 1730, configured to prepare requests (e.g., including encoded instructions and encoded messages) targeting other users, other peripheral devices, the communication server, the support server, etc.;
- a message interpretation module 1732, configured to parse received requests (e.g., including encoded instructions) into internal operations;
- a function execution module 1734, configured to carry out the functions or tasks requested in the received requests; and
- other modules 1736 configured to perform other functions described herein with respect to interaction on the social network platform.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1706, optionally, stores a subset of the modules and data structures identified above. Furthermore, memory 1706, optionally, stores additional modules and data structures not described above.

Figure 18:
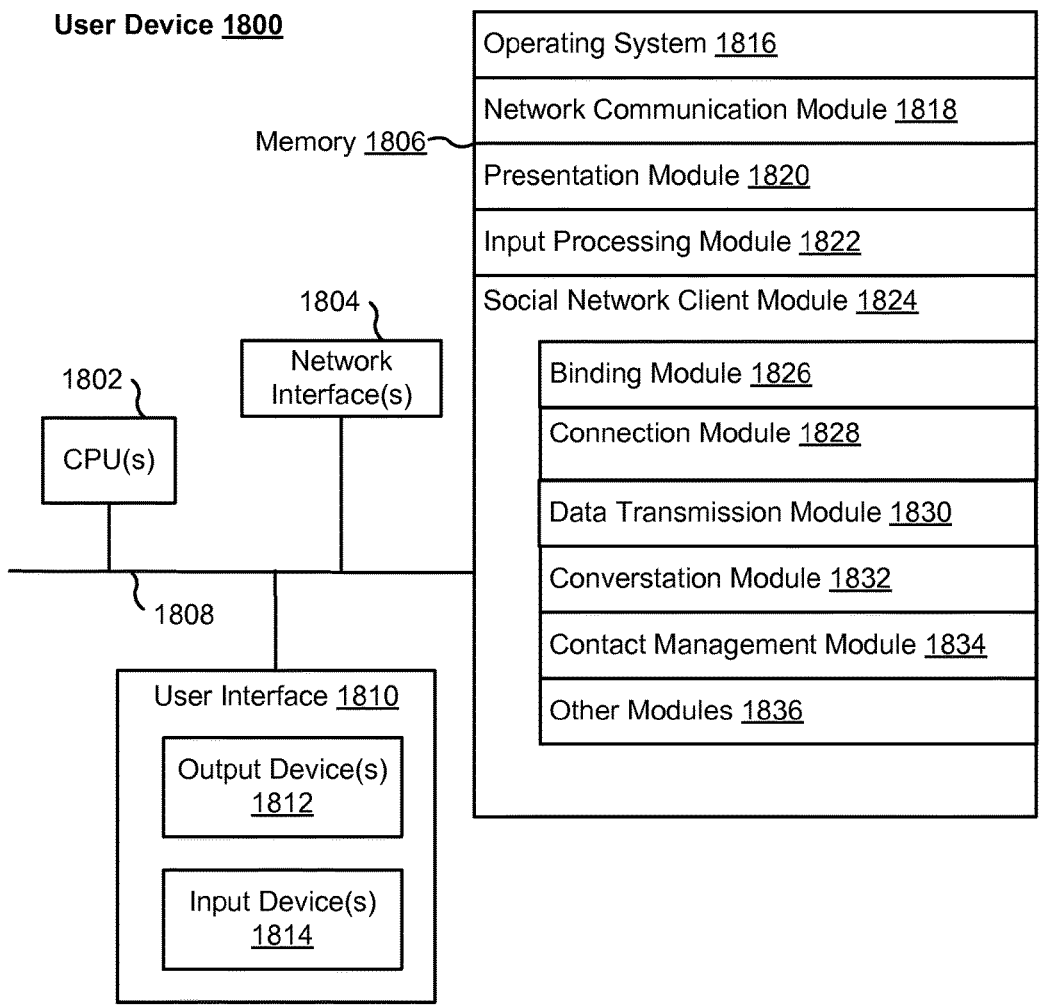

FIG. 18 is a block diagram illustrating a representative user device 1800 associated with a user in accordance with some embodiments. User device 1800 can serve as the user device (e.g., user devices 104 shown in FIGS. 1B, 2K-2T, 8, 9A-9B, 10A-10C, and user device 202 shown in FIGS. 2B-2H) that can be used to control and access a peripheral device (e.g., a locally connected peripheral device or a peripheral device connected to another user device) via a social network platform, in accordance with the embodiments described in the present disclosure. Examples of the user devices include, but are not limited to, a smart phone, a tablet device, a desktop computer, a laptop computer, a gaming device, etc.

User device 1800, typically, includes one or more processing units (CPUs) 1802, one or more network interfaces 1804, memory 1806, and one or more communication buses 1808 for interconnecting these components (sometimes called a chipset). User device 1800 also optionally includes a user interface 1810. User interface 1810 includes one or more output devices 1812 that enable presentation of media content, including one or more speakers and/or one or more visual displays. User interface 1810 also includes one or more input devices 1814, including user interface components that facilitate user input such as a keyboard, a mouse, a voice-command input unit or microphone, a touch-screen display, a touch-sensitive input pad, a gesture capturing camera, or other input buttons or controls, etc.

Memory 1806 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 1806, optionally, includes one or more storage devices remotely located from CPU(s) 1802. Memory 1806, or alternately the non-volatile memory device(s) within memory 1806, includes a non-transitory computer readable storage medium. In some implementations, memory 1806, or the non-transitory computer readable storage medium of memory 1806, stores the following programs, modules, and data structures, or a subset or superset thereof:

- an operating system 1816 including procedures for handling various basic system services and for performing hardware dependent tasks;
- a network communication module 1818 for connecting the user device 1800 to other computing devices (e.g., peripheral device 118 or communication server 112) via one or more network interfaces 1804 (wired or wireless) (e.g., Bluetooth interface, WiFi, Bluetooth Low Energy, USB, etc., Ethernet, LAN, WAN, etc.);
- a presentation module 1820 for enabling presentation of information (e.g., a user interface for operating the user device and displaying content and information) at the user device 1800 via one or more output devices 1812 (e.g., displays, speakers, etc.) associated with user interface 1810; and
- an input processing module 1822 for detecting one or more user inputs or interactions from one of the one or more input devices 1814 and interpreting the detected input or interaction.

In some embodiments, memory 1806 also includes a social network client module 1824 for performing data processing for performing various functions on the social network platform provided by a provider of the social network platform, including the operations needed to enable access and control of peripheral devices over the social network platform as described herein. In some embodiments, the social network client module 1824 includes, but is not limited to:

- a binding module 1826, configured to bind a peripheral device to the user device and a user account currently active within the social network client application executing on the user device;
- a connection module 1828, configured to set up a connection with a peripheral device that has been bound to the user device. The connection module for example, implements the connection protocols described herein for detecting the service ID for the social network application, and initiating connection requests to the peripheral device;

a data transmission module 1830, configured to transmit and receive data packets to and from the communication server according to the data transmission protocol agreement between the user device and the communication server; and configured to transmit and receive data packet to and from the peripheral device according to the data transmission protocol agreement between the user device and the peripheral device;

a conversation module 1832, configured to establish one-to-one conversations, and group chat sessions, and parse received messages (e.g., instant) and present the messages in a conversation log of the corresponding chat session;

a contact management module 1834, configured to manage contacts of the active user account, including contacts representing peripheral devices; and other modules 1836 configured to perform other functions described herein with respect to interaction on the social network platform.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1706, optionally, stores a subset of the modules and data structures identified above. Furthermore, memory 1706, optionally, stores additional modules and data structures not described above.

Figure 19:
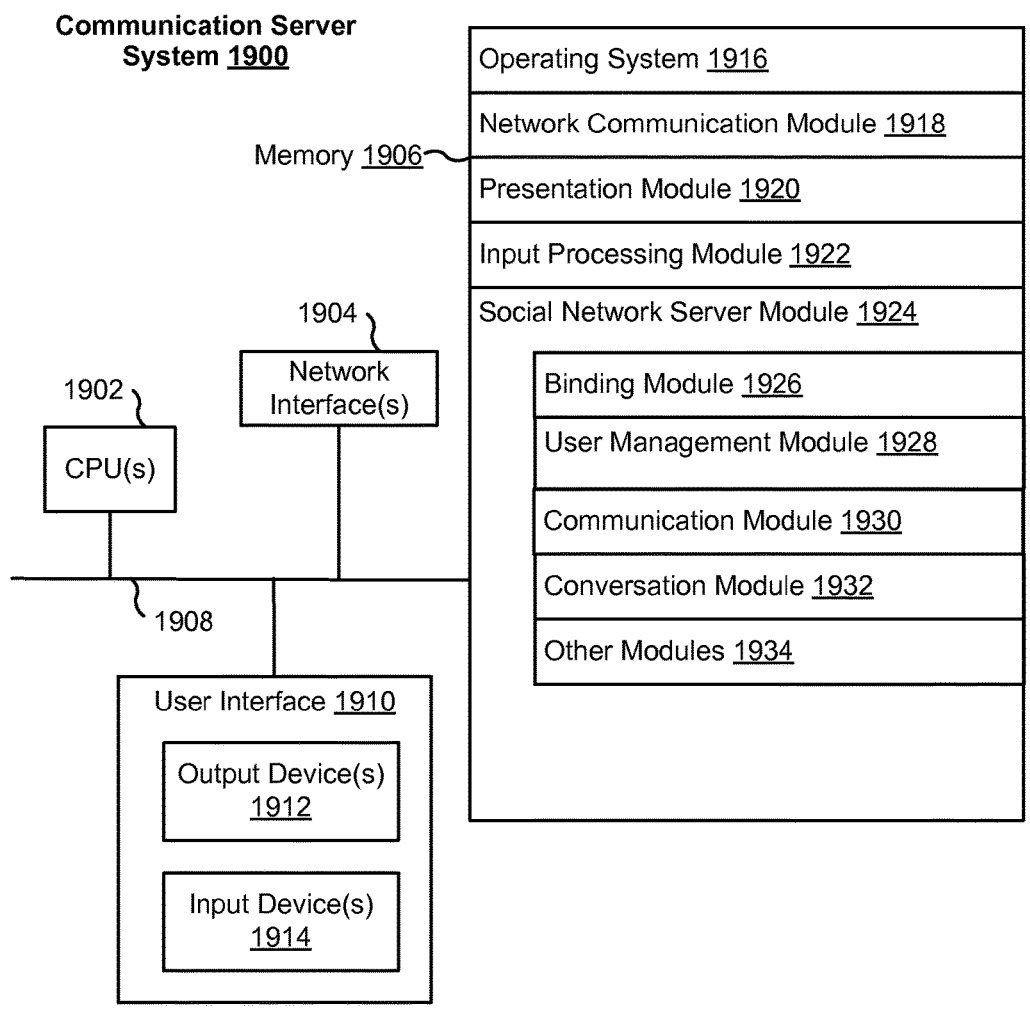

FIG. 19 is a block diagram illustrating a representative server system 1900 for an exemplary social network platform in accordance with some embodiments. Server system 1900 can serve as the communication server (e.g., communication server 112b shown in FIG. 1B, communication servers 112 shown in FIGS. 10A-10C) that provide the social networking services for users and peripheral devices in accordance with the embodiments described in the present disclosure. The server system 1900 may be provided by one or more computer systems including virtual and physical resources.

Server system 1900, typically, includes one or more processing units (CPUs) 1902, one or more network interfaces 1904, memory 1906, and one or more communication buses 1908 for interconnecting these components (sometimes called a chipset). Server system 1900 also optionally includes a user interface 1910. User interface 1910 includes one or more output devices 1912 that enable presentation of media content, including one or more speakers and/or one or more visual displays. User interface 1910 also includes one or more input devices 1914, including user interface components that facilitate user input such as a keyboard, a mouse, a voice-command input unit or microphone, a touch-screen display, a touch-sensitive input pad, a gesture capturing camera, or other input buttons or controls, etc.

Memory 1906 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 1906, optionally, includes one or more storage devices remotely located from CPU(s) 1902. Memory 1906, or alternately the non-volatile memory device(s) within memory 1906, includes a non-transitory computer readable storage medium. In some implementations, memory 1906, or the non-transitory computer readable storage medium of memory 1906, stores the following programs, modules, and data structures, or a subset or superset thereof:

an operating system 1916 including procedures for handling various basic system services and for performing hardware dependent tasks;

a network communication module 1918 for connecting to other computing devices (e.g., user device 104 or support servers 116) over the networks 106 via one or more network interfaces 1904 (wired or wireless) (e.g., WiFi, Ethernet, LAN, WAN, etc.);

a presentation module 1920 for enabling presentation of information (e.g., a user interface for operating the server system and displaying content and information) at the server system 1900 via one or more output devices 1912 (e.g., displays, speakers, etc.) associated with user interface 1910; and an input processing module 1922 for detecting one or more user inputs or interactions from one of the one or more input devices 1914 and interpreting the detected input or interaction.

In some embodiments, memory 1906 also includes a social network server module 1924 for performing data processing for supporting the various user and backend functions on the social network platform, including the operations needed to enable access and control of peripheral devices over the social network platform as described herein. In some embodiments, the social network server module 1924 includes, but is not limited to:

a binding module 1926, configured to bind a peripheral device to a corresponding user account;

a user management module 1920 configured to register users, support service providers, and peripheral devices, and assign respective social network identities to the registered users, support service providers, and peripheral devices;

a communication module 1930, configured to prepare messages (e.g., messages and instructions in Push Requests) to be sent to the user, and peripheral devices, and support servers; configured to interpret received requests, forward received requests to the support servers, forwarding received responses to the peripheral devices and/or user devices;

a conversation module 1932, configured to establish one-to-one conversations, and group chat sessions, and manage conversation logs for the corresponding chat sessions; and other modules 1934 configured to perform other functions described herein with respect to interaction on the social network platform.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1706, optionally, stores a subset of the modules and data structures identified above. Furthermore, memory 1706, optionally, stores additional modules and data structures not described above.

Figure 20:
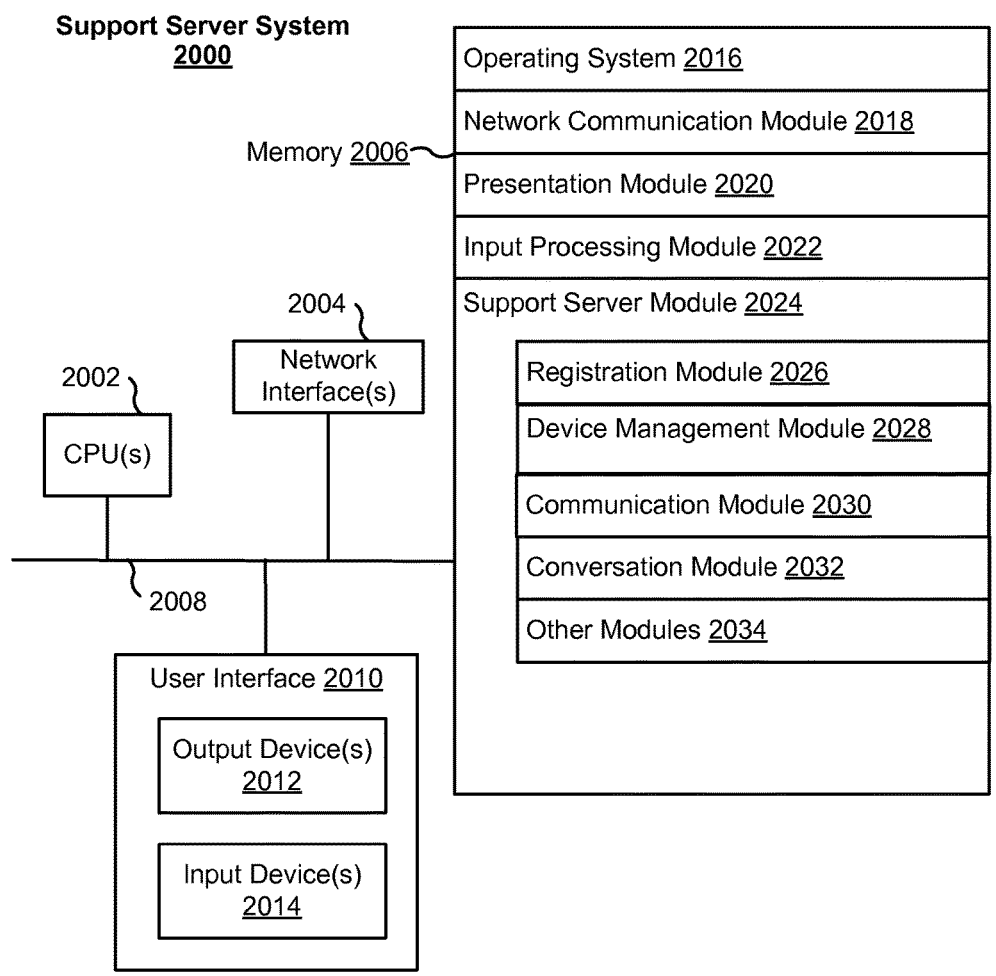

FIG. 20 is a block diagram illustrating a representative server system 2000 of a support service provider that provides support for one or more types of peripheral devices in accordance with some embodiments. Server system 2000 can serve as the support server (e.g., support server 116 shown in FIGS. 1B and 10A-10C) that provides the support services for users and peripheral devices in accordance with the embodiments described in the present disclosure. The support server also performs translations of encoded instructions and messages to and from regular instant messages for presentation to the human users. The server system 2000 may be provided by one or more computer systems including virtual and physical resources.

Server system 2000, typically, includes one or more processing units (CPUs) 2002, one or more network interfaces 2004, memory 2006, and one or more communication buses 2008 for interconnecting these components (sometimes called a chipset). Server system 2000 also optionally includes a user interface 2010. User interface 2010 includes one or more output devices 2012 that enable presentation of media content, including one or more speakers and/or one or more visual displays. User interface 2010 also includes one or more input devices 2014, including user interface components that facilitate user input such as a keyboard, a mouse, a voice-command input unit or microphone, a touch-screen display, a touch-sensitive input pad, a gesture capturing camera, or other input buttons or controls, etc.

Memory 2006 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 2006, optionally, includes one or more storage devices remotely located from CPU(s) 2002. Memory 2006, or alternately the non-volatile memory device(s) within memory 2006, includes a non-transitory computer readable storage medium. In some implementations, memory 2006, or the non-transitory computer readable storage medium of memory 2006, stores the following programs, modules, and data structures, or a subset or superset thereof:

- an operating system 2016 including procedures for handling various basic system services and for performing hardware dependent tasks;
- a network communication module 2018 for connecting to other computing devices (e.g., user device 104 or communication server 112) over the networks 106 via one or more network interfaces 2004 (wired or wireless) (e.g., WiFi, Ethernet, LAN, WAN, etc.);
- a presentation module 2020 for enabling presentation of information (e.g., a user interface for operating the server system and displaying content and information) at the server system 2000 via one or more output devices 2012 (e.g., displays, speakers, etc.) associated with user interface 2010; and
- an input processing module 2022 for detecting one or more user inputs or interactions from one of the one or more input devices 2014 and interpreting the detected input or interaction.

In some embodiments, memory 2006 also includes a support server module 2024 for performing data processing for supporting the various support functions (e.g., performing equipment diagnostics, providing customer support, etc.) on the social network platform, including providing the encoded instructions for controlling the peripheral devices, and providing the translations of the encoded messages to instant messages for presentation to the human users as described herein. In some embodiments, the support server module 2024 includes, but is not limited to:

- a registration module 2026, configured to register a service account with the communication module;
- a device management module 2020 configured to manage social network relationships with register users and peripheral devices using the functions of the social network platform;
- a communication module 2030, configured to prepare messages (e.g., messages and instructions in Push Requests) to be sent to the user, and peripheral devices, and support servers; configured to interpret received requests, forward received requests to the support servers, forwarding received responses to the peripheral devices and/or user devices;
- a conversation module 2032, configured to establish one-to-one conversations, and group chat sessions with users and peripheral devices; and
- other modules 2034 configured to perform other functions described herein with respect to interaction on the social network platform.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1706, optionally, stores a subset of the modules and data structures identified above. Furthermore, memory 1706, optionally, stores additional modules and data structures not described above.

FIGS. 21-24 are block diagrams of various devices and systems operating in the social networking platform in accordance with some embodiments.

Figure 21:
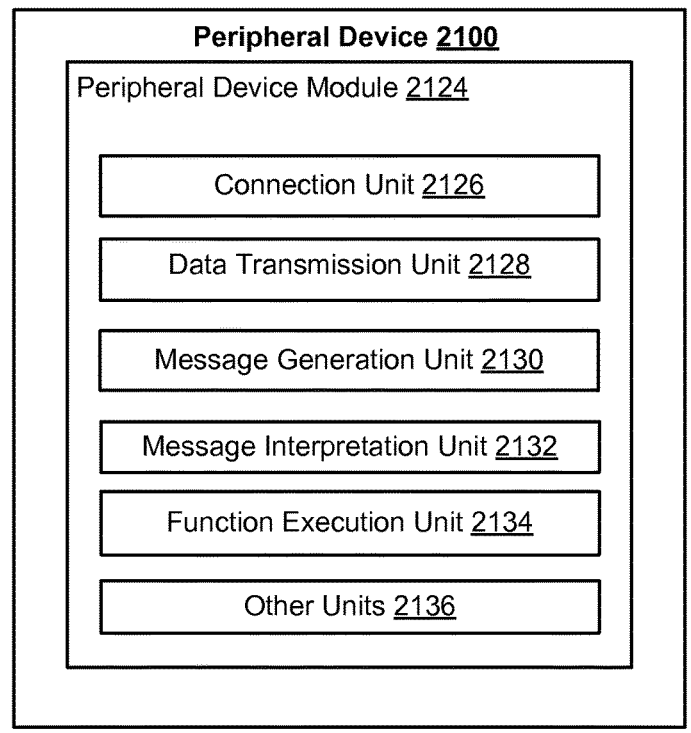
FIGS. 21-24 are block diagrams of various devices and systems operating in the social networking platform in accordance with some embodiments.

FIG. 21 is a block diagram illustrating a representative peripheral device 1700 associated with a user in accordance with some embodiments. Peripheral device 1700 can serve as the peripheral device (e.g., peripheral devices 118 shown in FIGS. 1B, 2K-2T, 8, 9A-9B, 10A-10C, and peripheral device 200 shown in FIG. 2A) that can be controlled and accessed via a social network platform in accordance with the embodiments described in the present disclosure. Examples of the peripheral devices include, but are not limited to, smart watches, health monitors (e.g., heart rate or blood pressure monitors, pacemakers, lifestyle monitoring wristbands, etc.), music players, climate controls (e.g., weather monitors, temperature control, heaters, air conditioners, humidity controls, etc.), lighting controls, security monitoring systems, smart coffee makers, charging stations (e.g., charging station for electric cars or electronic equipments, etc.), navigation systems (e.g., GPS systems), sports equipment (e.g., smart golf clubs, smart fishing poles, smart basketballs, etc.), set-top boxes (e.g., online streaming set-top boxes, online gaming devices, etc.).

In some embodiments, peripheral device also includes a peripheral device module 1724 for performing data processing for performing native operations of the peripheral device, as well as the operations needed to communicate with other devices and/or users over a social network platform as described herein. In some embodiments, peripheral device module 1724 includes, but is not limited to: a connection unit 1726, configured to set up a connection with a user device executing a social network client application. The connection module for example, implements the connection protocols described herein for broadcasting a service ID for the social network application, and accepting connection requests from the user device; a data transmission unit 1728, configured to generating the data packet to be send to the user device, and transmitting the data packet according to the data transmission protocol agreement between the user device and the peripheral device; and configured to receive and re-assemble the data packet from the user device according to the data transmission protocol agreement between the user device and the peripheral device; a message generation unit 1730, configured to prepare requests (e.g., including encoded instructions and encoded messages) targeting other users, other peripheral devices, the communication server, the support server, etc.; a message interpretation unit 1732, configured to parse received requests (e.g., including encoded instructions) into internal operations; a function execution unit 1734, configured to carry out the functions or tasks requested in the received requests; and other modules unit configured to perform other functions described herein with respect to interaction on the social network platform.

Figure 22:
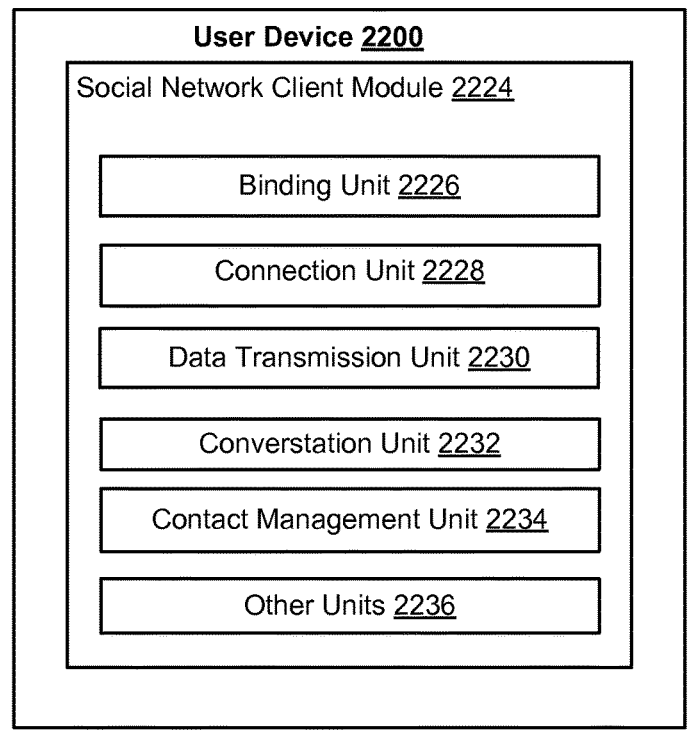

FIG. 22 is a block diagram illustrating a representative user device 2200 associated with a user in accordance with some embodiments. User device 2200 can serve as the user device (e.g., user devices 104 shown in FIGS. 1B, 2K-2T, 8, 9A-9B, 10A-10C, and user device 202 shown in FIGS. 2B-2H) that can be used to control and access a peripheral device (e.g., a locally connected peripheral device or a peripheral device connected to another user device) via a social network platform, in accordance with the embodiments described in the present disclosure. Examples of the user devices include, but are not limited to, a smart phone, a tablet device, a desktop computer, a laptop computer, a gaming device, etc.

In some embodiments, user device 2200 also includes a social network client module 2224 for performing data processing for performing various functions on the social network platform provided by a provider of the social network platform, including the operations needed to enable access and control of peripheral devices over the social network platform as described herein. In some embodiments, the social network client module 2224 includes, but is not limited to: a binding unit 2226, configured to bind a peripheral device to the user device and a user account currently active within the social network client application executing on the user device; a connection unit 2228, configured to set up a connection with a peripheral device that has been bound to the user device. The connection module for example, implements the connection protocols described herein for detecting the service ID for the social network application, and initiating connection requests to the peripheral device; a data transmission unit 2230, configured to transmit and receive data packets to and from the communication server according to the data transmission protocol agreement between the user device and the communication server; and configured to transmit and receive data packet to and from the peripheral device according to the data transmission protocol agreement between the user device and the peripheral device; a conversation unit 2232, configured to establish one-to-one conversations, and group chat sessions, and parse received messages (e.g., instant) and present the messages in a conversation log of the corresponding chat session; a contact management unit 2234, configured to manage contacts of the active user account, including contacts representing peripheral devices; and other units 2236 configured to perform other functions described herein with respect to interaction on the social network platform.

Figure 23:
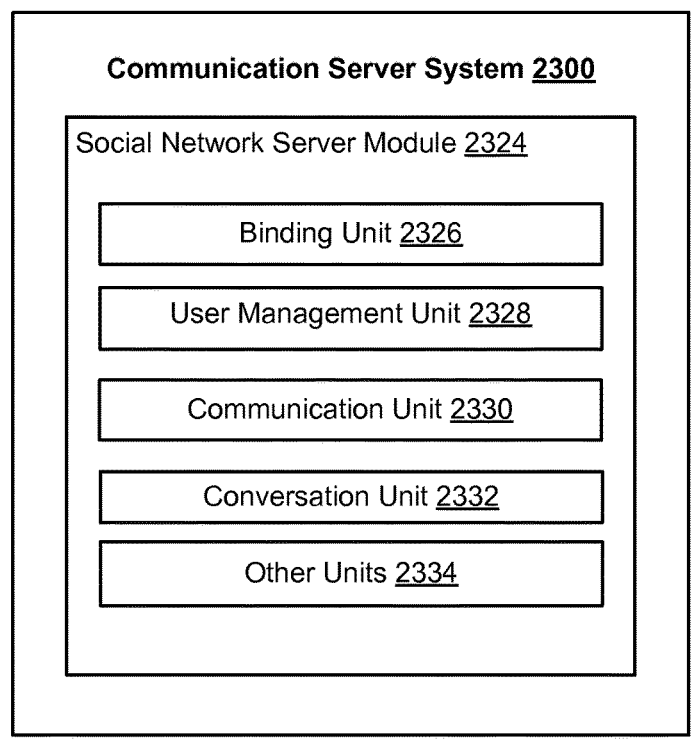

FIG. 23 is a block diagram illustrating a representative server system 2300 for an exemplary social network platform in accordance with some embodiments. Server system 2300 can serve as the communication server (e.g., communication server 112b shown in FIG. 1B, communication servers 112 shown in FIGS. 10A-10C) that provide the social networking services for users and peripheral devices in accordance with the embodiments described in the present disclosure. The server system 2300 may be provided by one or more computer systems including virtual and physical resources.

In some embodiments, the server system 2300 includes a social network server module 2324 for performing data processing for supporting the various user and backend functions on the social network platform, including the operations needed to enable access and control of peripheral devices over the social network platform as described herein. In some embodiments, the social network server module 2324 includes, but is not limited to: a binding unit 2326, configured to bind a peripheral device to a corresponding user account; a user management unit 2320 configured to register users, support service providers, and peripheral devices, and assign respective social network identities to the registered users, support service providers, and peripheral devices; a communication unit 2330, configured to prepare messages (e.g., messages and instructions in Push Requests) to be sent to the user, and peripheral devices, and support servers; configured to interpret received requests, forward received requests to the support servers, forwarding received responses to the peripheral devices and/or user devices; a conversation unit 2332, configured to establish one-to-one conversations, and group chat sessions, and manage conversation logs for the corresponding chat sessions; and other units 2334 configured to perform other functions described herein with respect to interaction on the social network platform.

Figure 24:
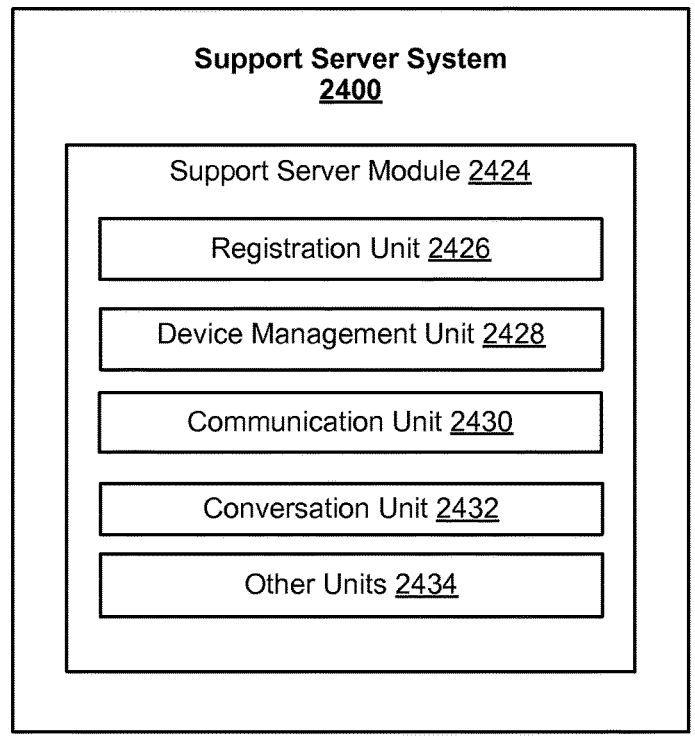

FIG. 24 is a block diagram illustrating a representative server system 2400 of a support service provider that provides support for one or more types of peripheral devices in accordance with some embodiments. Server system 2400 can serve as the support server (e.g., support server 116 shown in FIGS. 1B and 10A-10C) that provides the support services for users and peripheral devices in accordance with the embodiments described in the present disclosure. The support server also performs translations of encoded instructions and messages to and from regular instant messages for presentation to the human users. The server system 2400 may be provided by one or more computer systems including virtual and physical resources.

In some embodiments, the server system 2400 includes a support server module 2424 for performing data processing for supporting the various support functions (e.g., performing equipment diagnostics, providing customer support, etc.) on the social network platform, including providing the encoded instructions for controlling the peripheral devices, and providing the translations of the encoded messages to instant messages for presentation to the human users as described herein. In some embodiments, the support server module 2424 includes, but is not limited to: a registration unit 2426, configured to register a service account with the communication module; a device management unit 2420 configured to manage social network relationships with register users and peripheral devices using the functions of the social network platform; a communication unit 2430, configured to prepare messages (e.g., messages and instructions in Push Requests) to be sent to the user, and peripheral devices, and support servers; configured to interpret received requests, forward received requests to the support servers, forwarding received responses to the peripheral devices and/or user devices; a conversation module unit, configured to establish one-to-one conversations, and group chat sessions with users and peripheral devices; and other units 2434 configured to perform other functions described herein with respect to interaction on the social network platform.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of communicating with a peripheral device over a social networking platform, comprising:
    at a server of a support service provider for a type of peripheral devices including the peripheral device:
        registering with a server of the social network platform as the support service provider for the peripheral device;
    initiating a communication event to send an instruction to the peripheral device, initiating the communication event comprising:
        generating a push request data packet for the instruction, wherein the push request data packet identifies the peripheral device as a target of the instruction; and
        sending the push request data packet to the peripheral device via the server of the social networking platform and a user device coupled to the peripheral device;
    receiving a request data packet from the peripheral device via the user device coupled to the peripheral device and the server of the social networking platform; and
    in response to receiving the request data packet from the peripheral device, sending a response data packet to the peripheral device via the server of the social networking platform and the user device coupled to the peripheral device,
    wherein:
        the push request data packet, the request data packet, and the response data packet each have a respective fixed-length packet header, and a respective variable-length packet body, the respective fixed-length packet header includes a respective predetermined command identifier and a respective packet sequence number, and the predetermined command identifier corresponds to a command for accessing a respective function of the social network platform,
        the response data packet includes a first packet sequence number that matches a second packet sequence number included in the request data packet, and the push request data packet includes a third packet sequence number different from the first and the second packet sequence number, and the respective predetermined command identifier and the respective packet body of at least one of the push request data packet, the request data packet, and the response data packet are characterized by one of the following:
        (1) the command corresponding to the respective predetermined command identifier is for accessing a contact listing for the peripheral device on the social network platform, and the respective packet body specifies at least one contact representing a user, a support service provider, or another peripheral device;
        (2) the command corresponding to the respective predetermined command identifier is for accessing a group chat function on the social network platform, and the respective packet body specifies a group chat session between the peripheral device and two or more respective social network contacts of the peripheral device, including two or more of a plurality of users, a support service provider, and a plurality of other peripheral devices; and
        (3) the command corresponding to the respective predetermined command identifier is for accessing a conversation log function on the social network platform, and the respective packet body specifies a conversation log for a chat session between the peripheral device and one or more respective social network contacts of the peripheral device, including one or more of a plurality of users, a support service provider, and a plurality of other peripheral devices.

2. The method of claim 1, wherein the respective predetermined command identifier and the respective packet body of at least one of the push request data packet, the request data packet, and the response data packet are characterized by the following: (4) the command corresponding to the respective predetermined command identifier is for accessing a user authentication function of the social network platform, and the respective packet body specifies a type of user identity assigned to the peripheral device on the social network platform.

3. The method of claim 1, wherein the command is for accessing a contact listing for the peripheral device on the social network platform, and the respective packet body specifies at least one contact representing a user, a support service provider, or another peripheral device.

4. The method of claim 1, wherein the respective predetermined command identifier and the respective packet body of at least one of the push request data packet, the request data packet, and the response data packet are characterized by the following: (5) the command corresponding to the respective predetermined command identifier is for accessing a messaging function on the social network platform, and the respective packet body specifies a message targeting at least one contact representing a user, a support service provider, or another peripheral device.

5. The method of claim 1, wherein the respective predetermined command identifier and the respective packet body of at least one of the push request data packet, the request data packet, and the response data packet are characterized by the following: (5) the command corresponding to the respective predetermined command identifier is for accessing a messaging function on the social network platform, and the respective packet body specifies a message originated from at least one contact representing a user, a support service provider, or another peripheral device.

6. The method of claim 1, wherein the respective predetermined command identifier and the respective packet body of at least one of the push request data packet, the request data packet, and the response data packet are characterized by the following: (6) the command corresponding to the respective predetermined command identifier is for accessing a messaging function on the social network platform, and the respective packet body specifies a message targeting at least one contact representing a user, a support service provider, or another peripheral device.

7. The method of claim 1, wherein the command corresponding to the respective predetermined command identifier is for accessing a group chat function on the social network platform, and the respective packet body specifies a group chat session between the peripheral device and two or more respective social network contacts of the peripheral device, including two or more of a plurality of users, a support service provider, and a plurality of other peripheral devices.

8. The method of claim 1, wherein the command corresponding to the respective predetermined command identifier is for accessing a conversation log function on the social network platform, and the respective packet body specifies a conversation log for a chat session between the peripheral device and one or more respective social network contacts of the peripheral device, including one or more of a plurality of users, a support service provider, and a plurality of other peripheral devices.

9. The method of claim 1, wherein the push request data packet does not require a response from the target of the instruction and the method further comprises:
concluding the communication event after sending the push request data packet without receiving any response for the push request data packet from the peripheral device.

10. A system for communicating with a peripheral device over a social networking platform, the system comprising:
one or more processors; and
memory having instructions stored thereon, the instructions, when executed by the one or more processors, cause the processors to perform operations comprising:
registering with a server of the social network platform as a support service provider for a type of peripheral devices including the peripheral device;
initiating a communication event to send an instruction to the peripheral device, initiating the communication event comprising:
generating a push request data packet for the instruction, wherein the push request data packet identifies the peripheral device as a target of the instruction; and
sending the push request data packet to the peripheral device via the server of the social networking platform and a user device coupled to the peripheral device;
receiving a request data packet from the peripheral device via the user device coupled to the peripheral device and the server of the social networking platform; and
in response to receiving the request data packet from the peripheral device, sending a response data packet to the peripheral device via the server of the social networking platform and the user device coupled to the peripheral device,
wherein:
the push request data packet, the request data packet, and the response data packet each have a respective fixed-length packet header, and a respective variable-length packet body, the respective fixed-length packet header includes a respective predetermined command identifier and a respective packet sequence number, and the predetermined command identifier corresponds to a command for accessing a respective function of a social network platform,
the response data packet includes a first packet sequence number that matches a second packet sequence number included in the request data packet, and the push request data packet includes a third packet sequence number different from the first and the second packet sequence number, and
the respective predetermined command identifier and the respective packet body of at least one of the push request data packet, the request data packet, and the response data packet are characterized by one of the following:
(1) the command corresponding to the respective predetermined command identifier is for accessing a contact listing for the peripheral device on the social network platform, and the respective packet body specifies at least one contact representing a user, a support service provider, or another peripheral device;
(2) the command corresponding to the respective predetermined command identifier is for accessing a group chat function on the social network platform, and the respective packet body specifies a group chat session between the peripheral device and two or more respective social network contacts of the peripheral device, including two or more of a plurality of users, a support service provider, and a plurality of other peripheral devices; and
(3) the command corresponding to the respective predetermined command identifier is for accessing a conversation log function on the social network platform, and the respective packet body specifies a conversation log for a chat session between the peripheral device and one or more respective social network contacts of the peripheral device, including one or more of a plurality of users, a support service provider, and a plurality of other peripheral devices.

11. The system of claim 10, wherein the push request data packet does not require a response from the target of the instruction and the operations further comprise:
concluding the communication event after sending the push request data packet without receiving any response for the push request data packet from the peripheral device.

12. A non-transitory computer-readable medium having instructions stored thereon, the instructions, when executed by one or more processors, cause the processors to perform operations comprising:
registering with a server of the social network platform as a support service provider for a type of peripheral devices including the peripheral device;
initiating a communication event to send an instruction to the peripheral device, initiating the communication event comprising:

generating a push request data packet for the instruction, wherein the push request data packet identifies the peripheral device as a target of the instruction; and sending the push request data packet to the peripheral device via the server of the social networking platform and a user device coupled to the peripheral device;

receiving a request data packet from the peripheral device via the user device coupled to the peripheral device and the server of the social networking platform; and in response to receiving the request data packet from the peripheral device, sending a response data packet to the peripheral device via the server of the social networking platform and the user device coupled to the peripheral device, wherein:

the push request data packet, the request data packet, and the response data packet each have a respective fixed-length packet header, and a respective variable-length packet body, the respective fixed-length packet header includes a respective predetermined command identifier and a respective packet sequence number, and the predetermined command identifier corresponds to a command for accessing a respective function of a social network platform, the response data packet includes a first packet sequence number that matches a second packet sequence number included in the request data packet, and the push request data packet includes a third packet sequence number different from the first and the second packet sequence number, and the respective predetermined command identifier and the respective packet body of at least one of the push request data packet, the request data packet, and the response data packet are characterized by one of the following:

(1) the command corresponding to the respective predetermined command identifier is for accessing a contact listing for the peripheral device on the social network platform, and the respective packet body specifies at least one contact representing a user, a support service provider, or another peripheral device;

(2) the command corresponding to the respective predetermined command identifier is for accessing a group chat function on the social network platform, and the respective packet body specifies a group chat session between the peripheral device and two or more respective social network contacts of the peripheral device, including two or more of a plurality of users, a support service provider, and a plurality of other peripheral devices; and (3) the command corresponding to the respective predetermined command identifier is for accessing a conversation log function on the social network platform, and the respective packet body specifies a conversation log for a chat session between the peripheral device and one or more respective social network contacts of the peripheral device, including one or more of a plurality of users, a support service provider, and a plurality of other peripheral devices.

13. The non-transitory computer-readable medium of claim 12, wherein the push request data packet does not require a response from the target of the instruction and the operations further comprise:

concluding the communication event after sending the push request data packet without receiving any response for the push request data packet from the peripheral device.

14. The system of claim 10, wherein the respective predetermined command identifier and the respective packet body of at least one of the push request data packet, the request data packet, and the response data packet are characterized by the following: (4) the command corresponding to the respective predetermined command identifier is for accessing a user authentication function of the social network platform, and the respective packet body specifies a type of user identity assigned to the peripheral device on the social network platform.

15. The system of claim 10, wherein the command is for accessing a contact listing for the peripheral device on the social network platform, and the respective packet body specifies at least one contact representing a user, a support service provider, or another peripheral device.

16. The system of claim 10, wherein the respective predetermined command identifier and the respective packet body of at least one of the push request data packet, the request data packet, and the response data packet are characterized by the following: (5) the command corresponding to the respective predetermined command identifier is for accessing a messaging function on the social network platform, and the respective packet body specifies a message targeting at least one contact representing a user, a support service provider, or another peripheral device.

17. The system of claim 10, wherein the respective predetermined command identifier and the respective packet body of at least one of the push request data packet, the request data packet, and the response data packet are characterized by the following: (6) the command corresponding to the respective predetermined command identifier is for accessing a messaging function on the social network platform, and the respective packet body specifies a message originated from at least one contact representing a user, a support service provider, or another peripheral device.

18. The system of claim 10, wherein the respective predetermined command identifier and the respective packet body of at least one of the push request data packet, the request data packet, and the response data packet are characterized by the following: (7) the command corresponding to the respective predetermined command identifier is for accessing a messaging function on the social network platform, and the respective packet body specifies a message targeting at least one contact representing a user, a support service provider, or another peripheral device.

19. The system of claim 10, wherein the command corresponding to the respective predetermined command identifier is for accessing a group chat function on the social network platform, and the respective packet body specifies a group chat session between the peripheral device and two or more respective social network contacts of the peripheral device, including two or more of a plurality of users, a support service provider, and a plurality of other peripheral devices.

20. The system of claim 10, wherein the command corresponding to the respective predetermined command identifier is for accessing a conversation log function on the social network platform, and the respective packet body specifies a conversation log for a chat session between the peripheral device and one or more respective social network contacts of the peripheral device, including one or more of a plurality of users, a support service provider, and a plurality of other peripheral devices.

* * * * *